(12) United States Patent
Ueyama et al.

(10) Patent No.: US 6,467,911 B1
(45) Date of Patent: Oct. 22, 2002

(54) PROJECTOR AND LAMP UNIT

(75) Inventors: Masayuki Ueyama, Takarazuka; Yasumasa Sawai, Yamatotakada; Hideki Nagata, Kobe; Akira Kawabata, Ikoma, all of (JP)

(73) Assignee: Minolta Co., Ltd., Osaka (JP)

( * ) Notice: Subject to any disclaimer, the term of this patent is extended or adjusted under 35 U.S.C. 154(b) by 0 days.

(21) Appl. No.: 09/413,311

(22) Filed: Oct. 6, 1999

(30) Foreign Application Priority Data

| Oct. 8, 1998 | (JP) | 10-286152 |
|---|---|---|
| Oct. 8, 1998 | (JP) | 10-286153 |
| Oct. 8, 1998 | (JP) | 10-286154 |
| Oct. 8, 1998 | (JP) | 10-286179 |
| Oct. 8, 1998 | (JP) | 10-286181 |
| Oct. 8, 1998 | (JP) | 10-286183 |
| Oct. 26, 1998 | (JP) | 10-303659 |
| Oct. 26, 1998 | (JP) | 10-303715 |
| Oct. 26, 1998 | (JP) | 10-303726 |
| Oct. 26, 1998 | (JP) | 10-303730 |
| Oct. 26, 1998 | (JP) | 10-303733 |

(51) Int. Cl.$^7$ ............................... G03B 21/00
(52) U.S. Cl. .......................... 353/87; 353/122
(58) Field of Search .................... 353/87, 85, 72, 353/122; 362/226, 254, 285, 287

(56) References Cited

U.S. PATENT DOCUMENTS 4,061,911 A * 12/1977 Krasin .................. 362/20
5,135,301 A * 8/1992 Dreyer, Jr. et al. ........... 353/85
5,658,062 A * 8/1997 Lee et al. ..................... 353/85
5,860,720 A * 1/1999 Negishi et al. ............... 353/74
6,082,864 A * 7/2000 Rodriguez, Jr. et al. ...... 353/87

FOREIGN PATENT DOCUMENTS

JP 09-096786 A 4/1997

* cited by examiner

*Primary Examiner*—William Dowling
(74) *Attorney, Agent, or Firm*—Sidley Austin Brown & Wood LLP

(57) ABSTRACT

A projector has a liquid crystal display panel for displaying an image, a lamp for illuminating the liquid crystal display panel, and a projection optical system for projecting light modulated by the image displayed. The lamp is held by a member whose position is variable to allow fitting of different types of lamp. The projector acquires data related to the lamp currently fitted and controls the light emission of the lamp on the basis of that data. The data includes the life of the lamp, so that the projector prevents the lamp to be lit longer than its remaining life. The remaining life is updated in accordance with how long the lamp has been lit. In addition to the lamp that is lit, an auxiliary lamp may be fitted so that the lamp that is lit can be switched to the auxiliary lamp as required. The lamp is formed into a single lamp unit together with a reflector or a casing to prevent the user from touching the lamp. The lamp is accessible for replacement only when it is in a predetermined position, where the lamp is never allowed when hot.

22 Claims, 53 Drawing Sheets

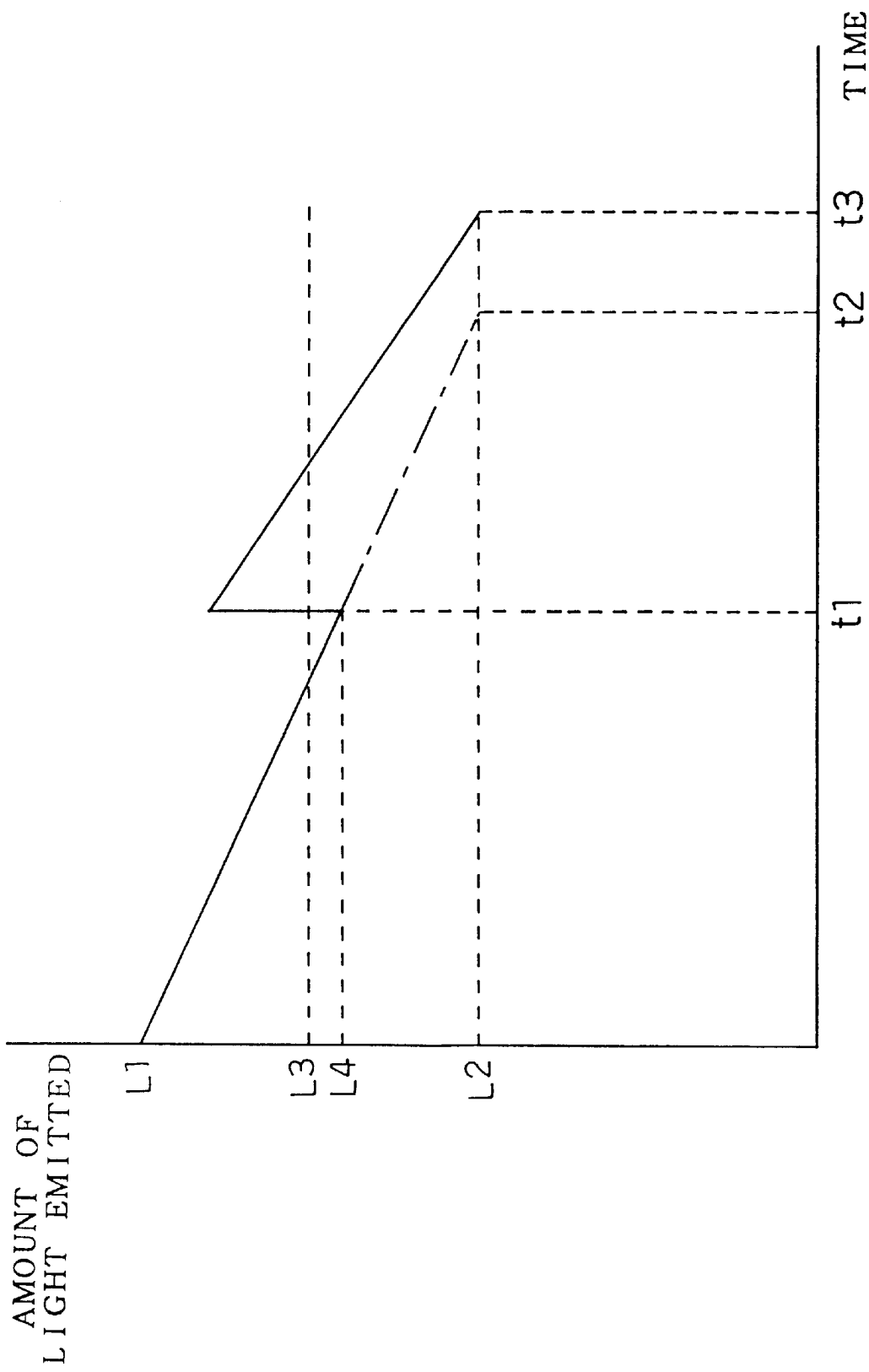

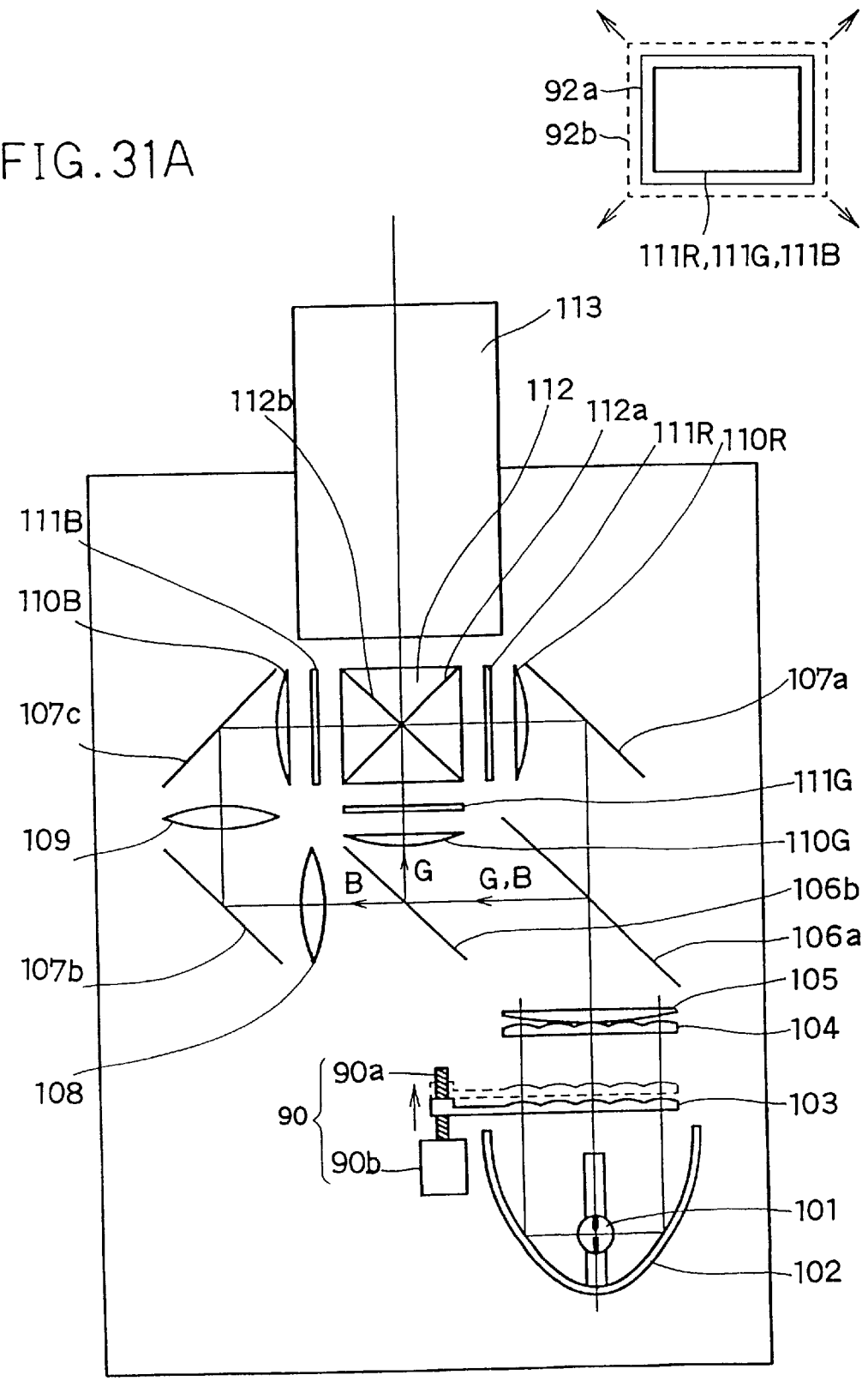

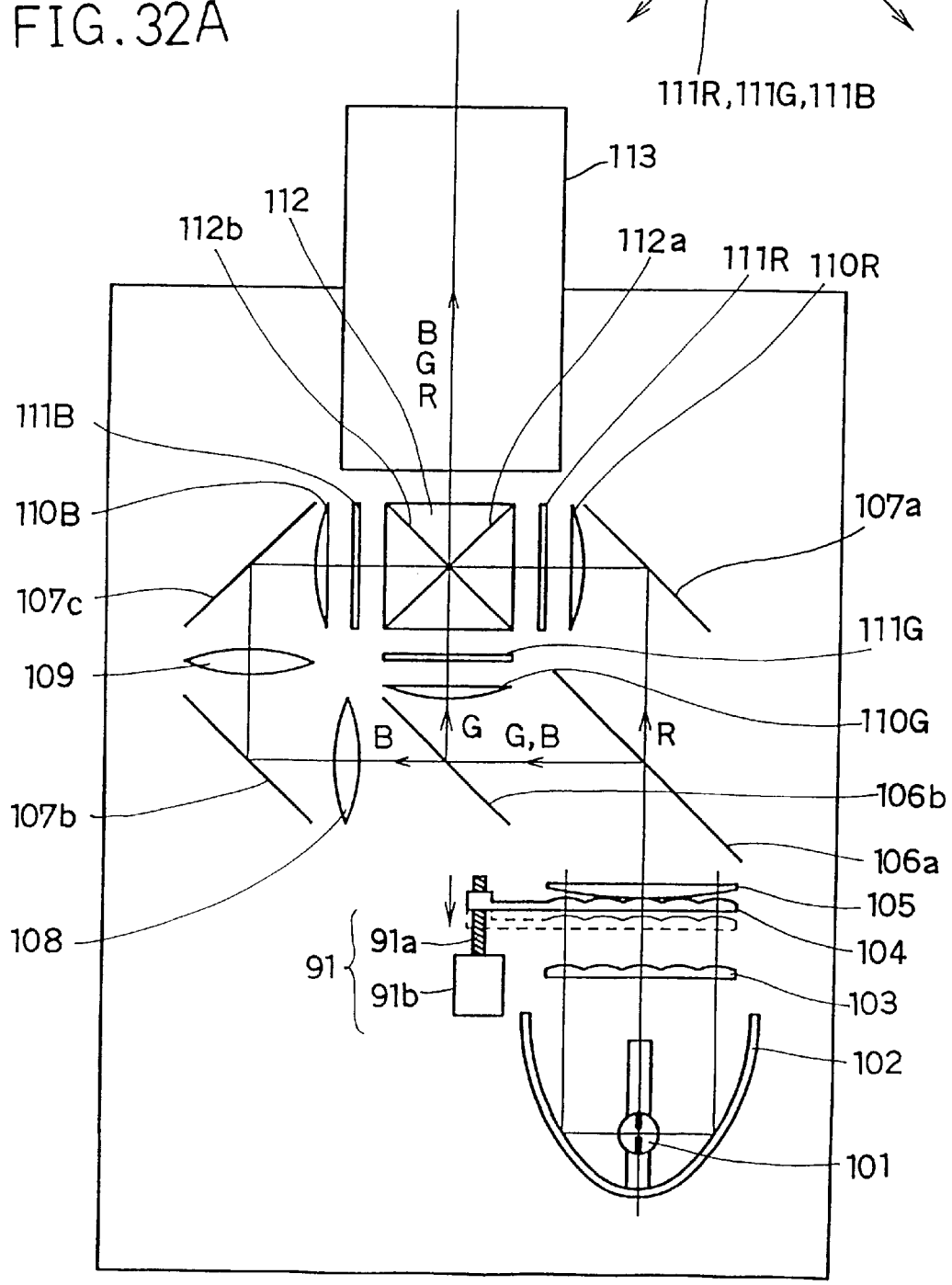
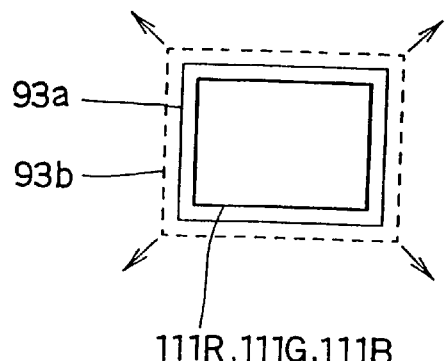

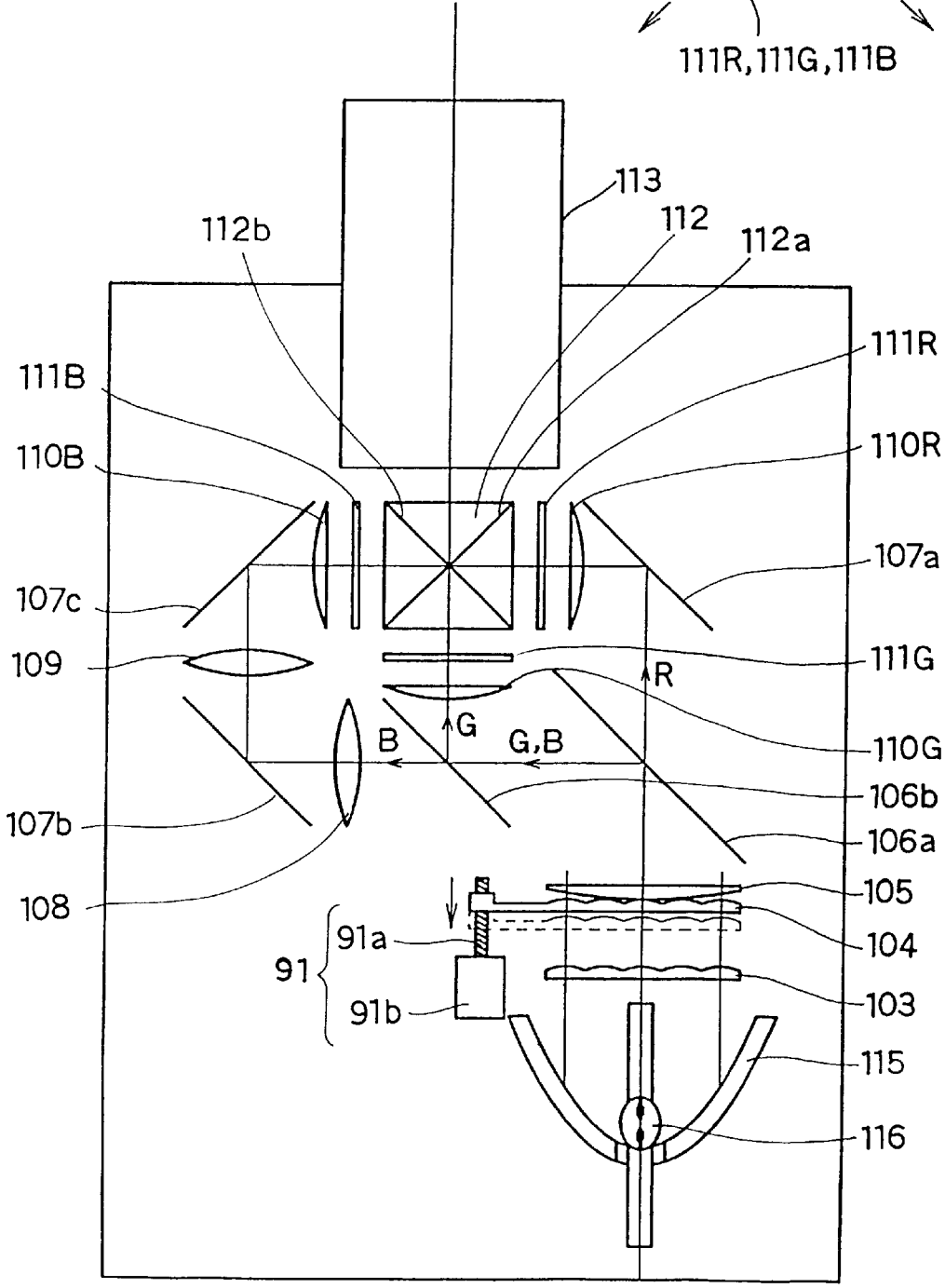

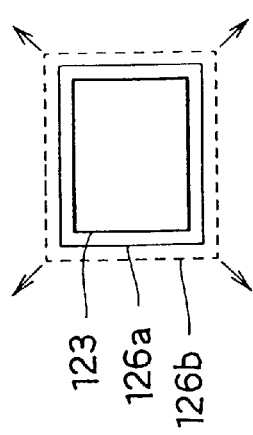
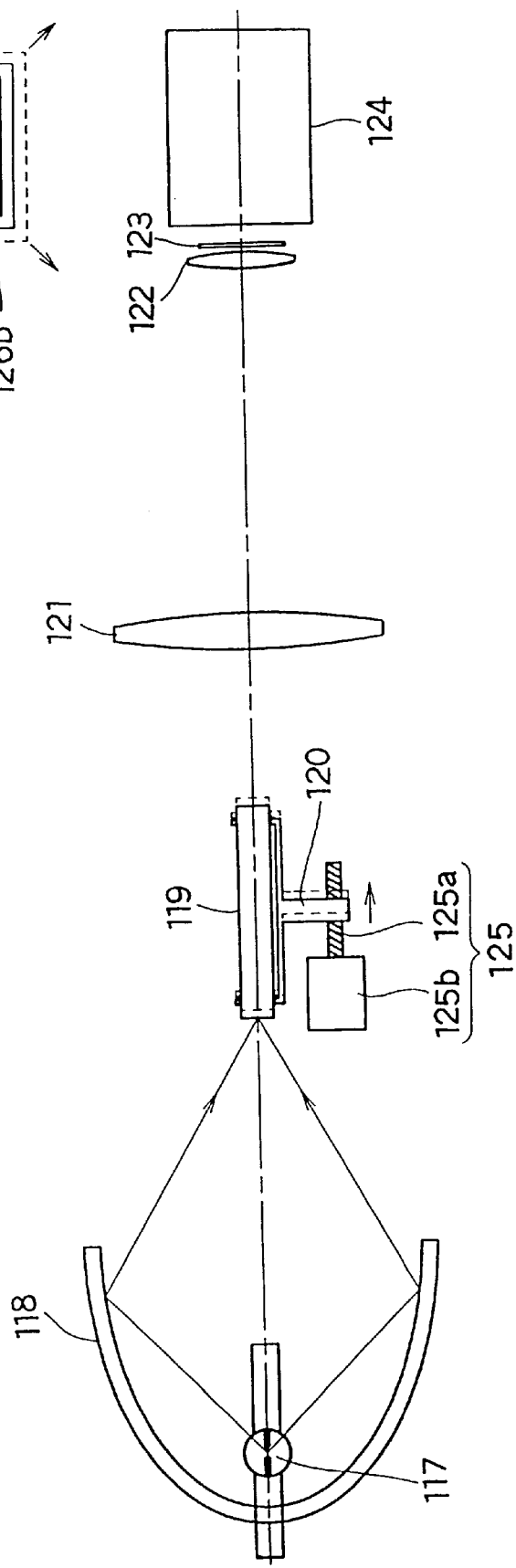
FIG. 34A
FIG. 34B

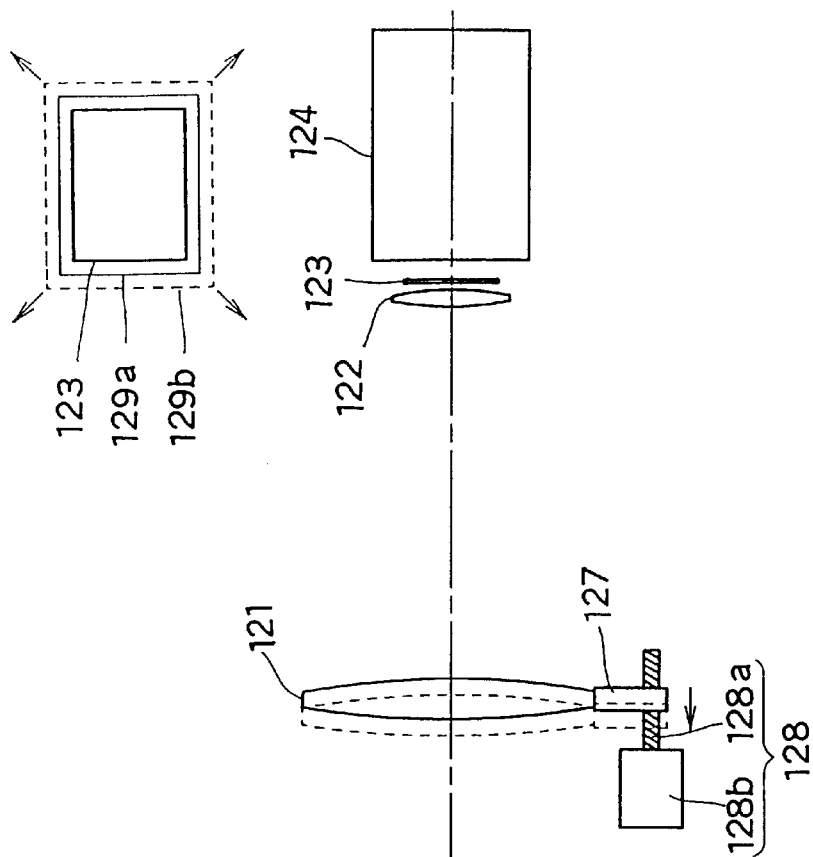
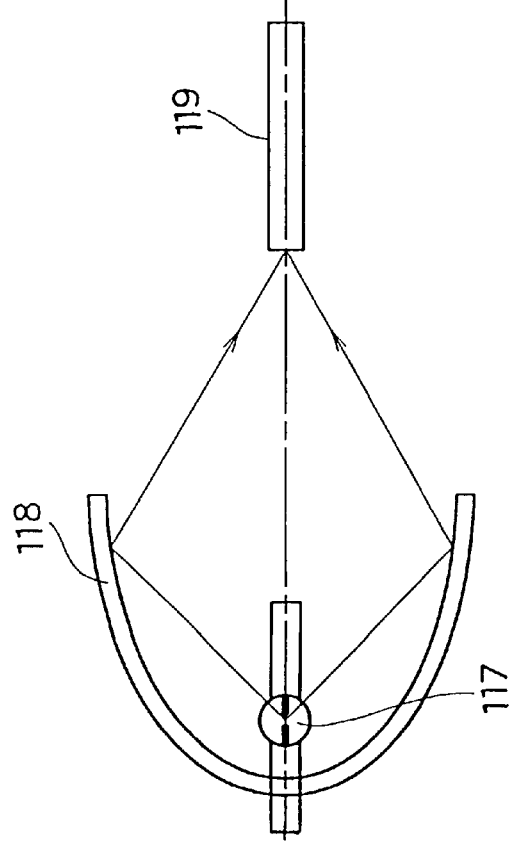
FIG. 35A
FIG. 35B

PROJECTOR AND LAMP UNIT

This application is based on applications Nos. H10-286152, H10-286153, H10-286154, H10-286179, H10-286181, and H10-286183 filed in Japan on Oct. 8, 1998, and Nos. H10-303659, H10-303715, H10-303726, H10-303730, and H10-303733 filed in Japan on Oct. 26, 1998, the entire content of which is hereby incorporated by reference.

BACKGROUND OF THE INVENTION

1. Field of the Invention

The present invention relates to a projector, i.e. a projection-type image display apparatus, and to a light source unit for a projector.

2. Description of the Prior Art

A projector modulates light in accordance with an image, and projects the modulated light on a screen to display the image thereon. A projector is used to present an image to a number of people at a time, and is nowadays used even as a television monitor having a comparatively large screen.

FIG. 51 shows an example of the construction of a conventional projector, in the form of a horizontal cross section including the optical axis of the projection lens thereof. The projector 114 is composed of an illumination section, a display section, and a projection section. The illumination section illuminates the display section uniformly. The display section separates the illumination light into illumination light of three colors, i.e. red (R), green (G), and blue (B), then converts the illumination light of three colors individually into optical images of the corresponding colors, and then integrates the optical images of three colors together. The projection section projects the resulting integrated optical image.

The illumination section is provided with a light source 101 composed of a metal-halide lamp, a reflector 1OZ formed as a reflecting mirror having the shape of a paraboloid of revolution so as to reflect the light emitted from the light source 101 and thereby form the light into a substantially parallel beam of light, a first lens array 103 and a second lens array 104 each having a plurality of lens cells arranged in a matrix, and a superimposing lens 105.

The first lens array 103 is so arranged as to be optically conjugate with the three liquid crystal display panels 111R, 111G, and 111B, which constitute the display section. The individual lens cells of the second lens array 104 are so arranged as to be optically conjugate with the light source 101.

The white light emitted from the light source 101 is reflected by the reflector 102 so as to enter the first lens array 103, which then separates the light into a plurality of light beams. These light beams enter the second lens array 104, and then form a plurality of light source images. That is, the individual lens cells of the second lens array 104 serve as a secondary light source. The plurality of light beams exiting from the second lens array 104 are superimposed on one another by the superimposing lens 105, and are led to the individual liquid crystal display panels 111R, 111G, and 111B of the display section.

Next, the display section will be described. The display section is provided with, in addition to the liquid crystal display panels 111R, 111G, and 111B that convert illumination light of three colors individually into optical images, field lenses 110R, 110G, and 110B provided in front of the liquid crystal display panels 111R, 111G, and 111B respectively, dichroic mirrors 106a and 106b that each transmit light of a specific wavelength range, turning mirrors 107a, 107b, and 107c, a condenser lens 108, a relay lens 109, and a cross dichroic prism 112.

The dichroic mirror 106a transmits only R-color light. The dichroic mirror 106b transmits only B-color light. The R-color light transmitted through the dichroic mirror 106a is then reflected by the turning mirror 107a so as to pass through the field lens 110R and then illuminate the liquid crystal display panel 111R. The G-color light reflected from the dichroic mirrors 106a and 106b passes through the field lens 110G and then illuminates the liquid crystal display panel 111G. The B-color light reflected from the dichroic mirror 106a and transmitted through the dichroic mirror 106b travels via the condenser lens 108, the turning mirror 107b, the relay lens 109, the turning mirror 107c, and the field lens 110B, and then illuminates the liquid crystal display panel 111B.

The distance from the light source to the liquid crystal display panel 111B is different from the distance from the light source to the liquid crystal display panel 111R or 111G. This is the reason that the condenser lens 108 and the relay lens 109 are used, which serve to make the illumination condition of the liquid crystal display panel 111B identical with that of the liquid crystal display panel 111R or 111G. The field lenses 110R, 110G, and 110B serve to achieve telecentric illumination of the liquid crystal display panels 111R, 111G, and 111B.

The cross dichroic prism 112 has a cementing surface 112a to which a dichroic coating that reflects only B-color light is applied and a cementing surface 112b to which a dichroic coating that reflects only R-color light is applied. On the liquid crystal display panels 111R, 111G, and 111B are formed optical images of the R, G, and B colors respectively. The light beams conveying these optical images enter the cross dichroic prism 112, where they are integrated together as a result of the R-color light being reflected by the cementing surface 112b and the B-color light being reflected by the cementing surface 112a. The resulting integrated light beam is then led to the projection lens 113, which constitutes the projection section. The projection lens 113 projects the light beam led thereto on a screen (not shown).

As described previously, the plurality of light beams exiting from the second lens array 104 of the illumination section are superimposed on one another when illuminating the liquid crystal display panels 111R, 111G, and 111B. This makes it possible to illuminate the liquid crystal display panels 111R, 111G, and 111B with an uniformly distributed amount of light, and thereby form a color image with uniformly distributed brightness on the screen.

A projector is expected to project a bright image efficiently. To achieve this, various projectors have conventionally been proposed that are provided with some means that serves the purpose. For example, in the conventional projector shown in FIG. 51 and described above, uniform illumination is achieved by an ingenious design of the illumination section to make it possible to use the light from the light source efficiently and thereby project a bright image.

Moreover, in recent years, developments have been made also in technologies related to lamps for use as a light source. By the use of a bright lamp, it is possible to obtain bright illumination easily. As an example of recently developed lamps, an ultra-high-pressure lamp (UHP lamp) is known. A UHP lamp offers higher efficiency than a metal-halide lamp as is used as the light source in the conventional projector described above. FIG. 52 shows a graph representing the relationship between brightness and electric power consumption for these two types of lamp.

In FIG. 52, the horizontal axis represents brightness, and the vertical axis represents electric power consumption; the dash-and-dot line 150 indicates the relationship observed in a metal-halide lamp, and the solid line 151 indicates the relationship observed in a UHP lamp. For example, to obtain brightness I1, whereas a metal-halide lamp requires electric power consumption W1, a UHP lamp requires W2, which is lower than W1. In other words, with the same electric power consumption W1, a UHP lamp offers brightness I2 higher than the brightness I1 that a metal-halide lamp offers.

That is, in comparison with a metal-halide lamp, a UHP lamp offers given brightness with less electric power consumption, and thus permits brighter display without extra electric power consumption. The higher the electric power consumption, the higher the running costs. Moreover, the higher the electric power consumption, the shorter the life of the lamp, and therefore, quite disadvantageously, it is difficult to maintain stably bright display of images for a satisfactorily long period.

In general, a projector is designed to adopt a lamp that is considered to be the best available on the whole at the time of design. Today, projectors that adopt a UHP lamp are already commercially available. It is therefore very likely that future developments will bring about a new-technology lamp that offers higher efficiency, i.e. a superior brightness/electric power consumption relationship, as indicated by the broken line 152 in FIG. 52.

However, conventional projectors allow use of only one specified type of lamp, and light emission is controlled on the basis of the ratings set for that lamp. Thus, even if new developments are made in lamp technologies, it is not possible to use a lamp of the latest type in place of the specified type. In order to use a lamp of the latest type, quite uneconomically, the projector proper needs to be replaced with a new one that is compatible with a lamp of the latest type.

Every lamp has a life, and thus cannot be lit forever. Accordingly, the user of a lamp needs to replace the lamp when necessary. In so doing, the user is exposed to a risk of suffering a skin burn by touching the lamp that is hot after being lit. To prevent this, various measures have been proposed.

For example, projectors are known in which a door for lamp replacement is kept locked until the lamp has been cooled down, or a protective cover is provided around a lamp. A projector is also known that employs a turret-type lamp holder that can hold a plurality of lamps so that the lamp that is actually lit will be switched among them so as to prolong the substantial life of the lamp and thereby delay lamp replacement.

Locking a door until a lamp has been cooled down offers a high degree of safety, but, quite inconveniently, requires that the user wait for a while for the lamp to cool down before starting replacement with a new lamp he has prepared. Providing a protective cover around a lamp cannot be said to be the safest measure against a skin burn because heat is likely to conduct from the lamp to the cover, making the cover itself hot.

Employing a turret-type lamp holder so that the lamp that is actually lit will be switched among a plurality of lamps so as to prolong the life of the lamp helps lower the frequency of lamp replacement and thereby indirectly reduce the risk of a skin burn. However, in actual lamp replacement, there is as great a risk of a skin burn as where no measure has been taken, and thus some additional measure is required.

If the surface of the glass bulb of a lamp is stained with an inflammable greasy or similar substance, the lamp may burst when the lamp becomes hot by being lit. If the user directly touches a lamp, the glass bulb of the lamp is stained with seburn, which increases the risk of lamp bursting. Using a lamp unit having a lamp and a reflector integrated into a single unit somewhat reduces the risk, but there still remains a certain risk. In addition, it is uneconomical to replace the still usable reflector together with the lamp. The reflector is produced with high accuracy and thus at high cost to secure a satisfactory light-condensing ability, and therefore replacement of the reflector requires high cost.

Some lamps may burst if lit for a period longer than the life set therefor as a result of their glass bulb deteriorating as the lamps are kept lit. To prevent such lamp bursting and maintain safe display of images, it is necessary to manage the light-emission time of a lamp strictly.

To manage the light-emission time of a lamp, various methods have been proposed. A simple method is adding up the light-emission time of a lamp so that the lamp will cease to be lit when the added-up time has reached a predetermined period. There is a projector which displays the added-up light-emission time of a lamp. A projector is also known in which a label that changes the color thereof by reacting with ultraviolet rays is affixed in front of a lamp so that the user can visually check the light-emission time of the lamp.

However, according to the projector adding up the light-emission time, the light-emission time obtained is stored only on the part of the projector proper, and, every time a new lamp is fitted, the light-emission time stored until that time is erased and the light-emission time of the new lamp starts being measured. Thus, every time lamp replacement takes place, the data on the light-emission time of the older lamp is lost. Accordingly, if a lamp that has ever been lit for a while is fitted as a new lamp, the lamp is recognized as a lamp that has never been lit before. Thus, there is a risk that the lamp will be lit for a period far longer than the life thereof until the lamp eventually bursts.

Moreover, even though the lamp ceases to be lit when the light-emission time has reached a predetermined period, it is not possible to set the predetermined period differently for lamps having different ratings and thus different lives; that is, the predetermined period has to be a fixed value. Accordingly, with lamps having lives shorter than the fixed predetermined period, it is not possible to secure sufficient safety; by contrast, with lamps having lives longer than the fixed predetermined period, they cease to be lit with their lives partially left unused and thus quite uneconomically.

According to the projector employing the lamp provided with the color-variable label, the remaining life of the lamp is recorded on the part of the lamp itself. However, there is a possibility that, even while the lamp is not being lit, the label will change the color thereof by reacting with the light emitted from another lamp, and therefore a special measure is required for reliable recording of the remaining life. For example, in a construction that allows storage of a spare lamp inside the projector, light shielding is essential to prevent the light emitted from the lamp being lit from reaching the spare lamp.

In addition, to secure safety, the user is obliged to check visually the color of the label, and this can be a burden to the user. Usually, a member for modulating light is arranged in front of the lamp, and therefore it is not easy to conduct visual checking of the label directly. In particular, in a projector as is used as a television monitor in which leakage of light is undesirable, the lamp is housed inside a chassis, and thus cannot be observed from the outside. Accordingly, to check the remaining life of the lamp, quite inconveniently, the user needs to remove the lamp, which requires complicated handling.

Even a lamp that is unlikely to burst may become unable to be lit suddenly at the end of the life thereof. If the lamp being used becomes unable to be lit when no spare lamp is in stock, it is impossible to display images until a new lamp is procured.

To avoid this inconvenience, some projectors are furnished with a spare lamp in addition to a lamp that is actually lit so that the spare lamp will be lit when the lamp being lit becomes unable or unfit to be lit. For example, according to the abovementioned projector provided with the turret-type lamp holder, a lamp is lit in a predetermined position, and, when the current flowing through the lamp being lit drops below a predetermined value, the lamp holder is rotated so that a spare lamp will be moved to the predetermined position so as to be lit.

Some other projectors are so designed that, when the lamp being lit becomes unable to be lit, an indication will be displayed to request replacement of the lamp. For example, there is a projector provided with a sensor for detecting the amount of light emitted from the lamp so that, when the detected amount of emitted light drops below a predetermined value, an indication will be displayed on the screen to indicate that it is time to replace the lamp.

However, in conventional projectors, whether by switching the lamp being lit to a spare lamp automatically or by displaying an indication requesting replacement of the lamp, the necessary judgment is made indirectly by monitoring the current or the amount of emitted light, and thus it is impossible to manage the light-emission time strictly.

Moreover, in conventional projectors, the checking of whether a lamp is able or fit to be lit or not is performed only with the lamp that is currently being lit, and thus not with the spare lamp. Accordingly, there is a possibility that the spare lamp will be lit even if the spare lamp is not in a state fit to be lit; or there is a possibility that, when the lamp being lit becomes unfit to be lit, there will be no spare lamp fitted that is in a state fit to be lit, and thus it is impossible to display images.

To allow comfortable image viewing with minimum electric power consumption, it is preferable that a projector be so designed that the brightness of the image projected thereby is variable according to the ambient brightness. This is achieved in a projector proposed in Japanese Laid-Open Patent Application No. H9-96786. This projector is provided with a plurality of lamps as a light source for image projection so that the brightness of the projected image can be varied by varying the number of lamps lit simultaneously.

However, this method requires an ample space in which to arrange a plurality of lamps, and also requires an optical system for mixing the light from those lamps, making the projector as a whole unduly large. Moreover, the brightness of the projected image can be varied only stepwise, and thus, where fine adjustment of the brightness is desired, a large number of lamps need to be provided, making the projector even larger. In addition, to obtain uniform brightness over the entire image irrespective of the brightness thereof, it is necessary to keep the mixed light uniform irrespective of whether the individual lamps are lit or not. This requires an ingenious arrangement of the lamps or a special optical system, and thus complicates the construction of the projector.

Some kinds of lamp, such as a metal-halide lamp, allow their output, i.e. the amount of light they emit, to be varied according to the voltage applied thereto. By using such a lamp as a light source for image projection, it is possible to allow, with a single lamp, the brightness of the image to be adjusted easily and continuously simply by varying the voltage applied to the lamp. However, switching the voltage applied to the lamp with excessive frequency or applying a high voltage to the lamp for a long period shortens the life of the lamp, and in addition leads to uneconomical electric power consumption.

Moreover, in a lamp that offers a variable output, the color temperature of the light varies according to the output of the lamp. Accordingly, simply varying the output of the lamp causes the white balance of the displayed image to vary according to the brightness of the image, and thus leads to another disadvantage that images cannot be displayed with well-balanced hues at all times.

To change the state of an arc discharge lamp, as exemplified by a metal-halide lamp, from an unlit state to a lit state, the gas filling the lamp needs to be ionized. To achieve this, a projector applies a predetermined ignition voltage to the lamp for about one second. The lamp thus lit generates heat and becomes hot, and then, when extinguished, cools down gradually to room temperature. Subsequently, to display an image, the projector applies the ignition voltage to the lamp again to light the lamp.

However, in an arc discharge lamp, the ease of ionization of the gas varies with temperature, and therefore the ignition voltage required to light the lamp differs in low and high temperatures. For example, lighting a typical metal-halide lamp requires application of a voltage of 5 to 20 kV at low temperatures, and requires application of a voltage as high as 20 to 45 kV at high temperatures.

For this reason, while an arc discharge lamp is hot, as immediately after completion of image display, i.e. immediately after extinction of the lamp, quite inconveniently, it is impossible to light the lamp again to restart image display. For example, with a projector designed as a television monitor, if the user erroneously touches a switch on the remote control device of the television set and thereby finishes image display, image display cannot be restarted for a while, and thus the user is left unable to watch television meanwhile.

To avoid this inconvenience, some proposals have been made. For example, a projector is known that is provided with two metal-halide lamps so that, immediately after extinction of one lamp, the other lamp will be lit so as to achieve quick restarting of image display. There is also a projector having a delay function that prevents extinction of the lamp for a predetermined period even if the user operates for extinction of the lamp. A projector is also known that is provided with a metal-halide lamp and in addition an auxiliary lamp such as a halogen lamp so that, when image display is restarted immediately after extinction of the metal-halide lamp, the auxiliary lamp will be lit for a predetermined period.

These projectors allow image display to be restarted immediately after extinction of the lamp, and thus do not impose the inconvenience of waiting on the user.

However, even if two lamps are provided so that, immediately after extinction of one, the other will be lit, unless the two lamps are kept ready to be lit at any time, or in other words if either of them is unable to be lit, quick restarting of image display is impossible. Even if extinction of the lamp is delayed, it is invariably impossible to light the lamp again immediately after extinction thereof that takes place a predetermined delay period after. Even if an auxiliary lamp that can be lit quickly is provided, such an auxiliary lamp does not emit a satisfactory amount of light, and thus it is impossible to display images with satisfactory brightness for a predetermined period after restarting of image display.

Some types of lamp can be lit without application of an ignition voltage thereto. With such lamps, a voltage that is required to keep them in a lit state is applied thereto from the beginning. However, every such lamp has a specific light-emission temperature; specifically, the lamp starts emitting light only when the temperature of the lamp has reached the light-emission temperature after application of a voltage thereto. Accordingly, the lamp takes a longer time to start emitting light after application of the voltage thereto. In particular, when the temperature of the atmosphere is low, the lamp takes a longer time to reach the light-emission temperature and thus to start emitting light, remarkably delaying the starting of image display.

To prevent a lamp from becoming too hot while being lit, a projector is usually provided with a fan for air-cooling the lamp. Some projectors keep the fan rotating even after extinction of the lamp so as to promote cooling of the lamp and thereby shorten the time that the lamp takes to become able to be lit again. However, air-cooling promotes cooling of the lamp only in an indirect way, and therefore cannot satisfactorily shorten the time that the lamp takes to become cool enough to be lit again. Some lamps are structurally unfit for air-cooling, and therefore, in a projector employing such a lamp, it is impossible to quicken re-lighting of the lamp by fan-driven ventilation.

Moreover, a lamp should ideally be lit at the optimum temperature specific to the lamp. A lamp emits the maximum amount of light (i.e. offers the maximum brightness) at the optimum temperature, provided that the voltage applied thereto is fixed. The greater the deviation from the optimum temperature, the greater the negative deviation from the maximum brightness, and thus the lower the efficiency of light emission. However, to date, no consideration has been given to the optimum temperature in controlling the cooling of the lamp being lit even in a projector provided with a fan.

SUMMARY OF THE INVENTION

Broadly speaking, an object of the present invention is to provide a projector that achieves high-quality image display while offering excellent safety and user-friendliness. More specifically, principal objects of the present invention are as follows:

A first object is to provide a projector that makes the best use of a high-performance lamp.

A second object is to provide a projector that allows replacement of a lamp thereof without requiring any touch on the lamp.

A third object is to provide a projector and a light source that allow easy adjustment of the position of the light source.

A fourth object is to provide a projector and a light source that allow easy adjustment of the hues of the projected image.

To achieve the above objects individually or in combination, the present invention has the following aspects:

According to one aspect of the present invention, a projector is provided with: a light source; an image display device for performing spatial modulation on illumination light emitted from the light source on the basis of an image signal so as to form an optical image; and a projection optical system for projecting the optical image on a projection screen. Here, the light source is interchangeable with a light source of a different type.

According to another aspect of the present invention, a holding mechanism for holding a light source in a projector is provided with: a holding member for holding the light source; and an adjustment mechanism for adjusting the position of the light source by moving the holding member.

According to still another aspect of the present invention, a light source for use in an image projection apparatus is provided with: a light-emitting portion; a held portion that is held by the image projection apparatus when the light source is fitted in a predetermined position in the image projection apparatus; and data holding means for holding position-related data so as to allow the center of the light-emitting portion to be located at a previously specified position when the light source is fitted in the predetermined position.

According to still another aspect of the present invention, a projection-type image display apparatus is provided with: a lamp output varying device for varying the intensity of the light output from a lamp; a modulation device for performing modulation on the light output from the lamp in accordance with the color components of an image; and a controller for varying how the modulation device performs modulation in accordance with the intensity of the light output from the lamp so as to keep the white balance of the displayed image substantially constant irrespective of the intensity of the light output from the lamp.

According to still another aspect of the present invention, a projector is provided with: a light source; a reflector arranged around the light source; an image display device for performing spatial modulation on illumination light emitted from the light source on the basis of an image signal so as to form an optical image; and a projection optical system for projecting the optical image on a projection screen. Here, the light source is interchangeable with a light source of a different type. In addition, the projector is further provided with: an input section for inputting data in accordance with what type of light source is currently fitted; and a controller for performing a predetermined operation on the basis of the input data.

According to still another aspect of the present invention, a projector for projecting an image by using light from a light source is provided with: a holding member for holding the light source; and input means for inputting data in accordance with what type of light source is currently fitted.

BRIEF DESCRIPTION OF THE DRAWINGS

This and other objects and features of the present invention will become clear from the following description, taken in conjunction with the preferred embodiments with reference to the accompanying drawings in which:

FIG. 10 is a diagram showing how the amount of emitted light varies with respect to the duration of electric power supply under the control of the voltage switching mechanism;

FIG. 31A is a diagram schematically showing, in a sectional view, the construction of the projector of an eighth embodiment of the present invention;

FIG. 31B is a diagram showing different illumination conditions in the projector of the eighth embodiment;

FIG. 32A is a diagram schematically showing, in a sectional view, the construction of the projector of a ninth embodiment of the present invention;

FIG. 32B is a diagram showing different illumination conditions in the projector of the ninth embodiment;

FIG. 33A is a diagram schematically showing, in a sectional view, the construction of the projector of a tenth embodiment of the present invention;

FIG. 33B is a diagram showing different illumination conditions in the projector of the tenth embodiment;

FIG. 34A is a diagram schematically showing, in a sectional view, the construction of the projector of an eleventh embodiment of the present invention;

FIG. 34B is a diagram showing different illumination conditions in the projector of the eleventh embodiment;

FIG. 35A is a diagram schematically showing, in a sectional view, the construction of the projector of a twelfth embodiment of the present invention;

FIG. 35B is a diagram showing different illumination conditions in the projector of the twelfth embodiment;

DESCRIPTION OF THE PREFERRED EMBODIMENTS

<First Embodiment>

Figure 1:
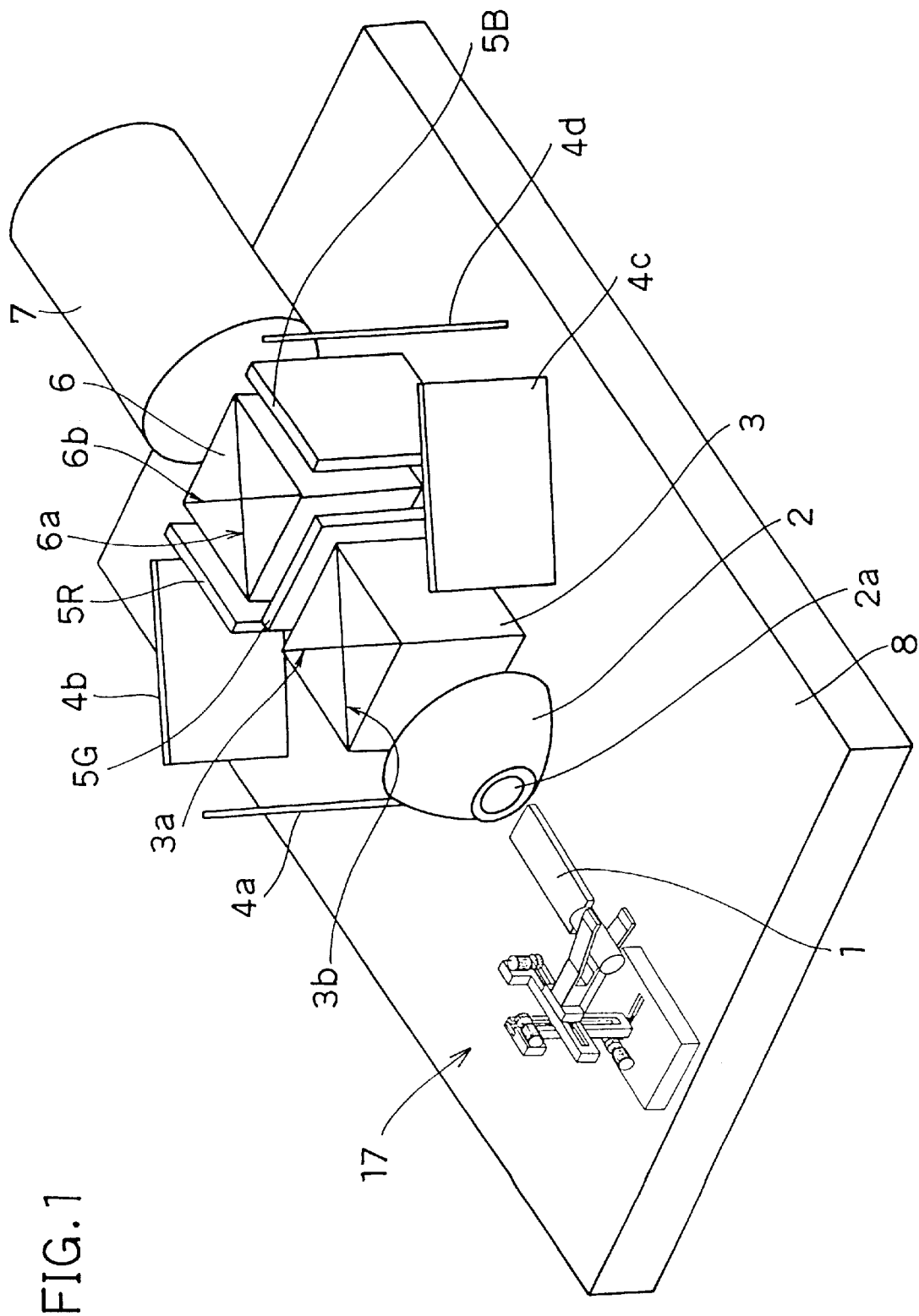
FIG. 1 is a diagram schematically showing the construction of the projector of a first embodiment of the present invention.

FIG. 1 schematically shows the overall construction of the projector of a first embodiment of the present invention. The constituent components of the projector are fixed on a base block 8. A lamp 1 is held by a lamp holder 17. The light emitted from the lamp 1 is first reflected by a reflector 2 formed as a reflecting mirror having the shape of an ellipsoid of revolution, and then enters a first cross dichroic prism 3. The reflector 2 has a cut 2a formed around the vertex thereof so that, in reality, the lamp 1 will be, in a state inserted into this cut 2a, held by the holder 17, with the result that the reflector 2 is so arranged as to enclose the lamp 1. Note that, in FIG. 1, for easy distinction of the individual constituent components, the reflector 2 is shown away from the lamp 1. The lamp 1, the reflector 2, and the holder 17 constitute an illumination section. In the illumination section, the lamp 1 is interchangeable with a lamp of a different type.

The cross dichroic prism 3 has a cementing surface 3a to which a dichroic coating is applied that reflects only light of the wavelength range of red (R), and a cementing surface 3b to which a dichroic coating is applied that reflects only light of the wavelength range of blue (B).

Accordingly, of the light that has entered the cross dichroic prism 3, the light of the R-color wavelength range is first reflected by the cementing surface 3a, is then reflected by reflecting mirrors 4a and 4b, and then illuminates a liquid crystal display panel 5R that forms an R-color optical image; the light of the B-color wavelength range is first reflected by the cementing surface 3b, is then reflected by reflecting mirrors 4c and 4d, and then illuminates a liquid crystal display panel 5B that forms a B-color optical image; the light of the wavelength range of green (G) is transmitted through the cross dichroic prism 3 without being reflected therein, and then illuminates a liquid crystal display panel 5G that forms a G-color optical image.

The liquid crystal display panels 5R, 5G, and 5B are transmission-type liquid crystal display panels. Thus, as illumination light passes through the liquid crystal display panels 5R, 5G, and 5B, on which the images of the R-, G-, and B-color components are displayed, the light is converted into optical images of the corresponding colors, and is then led to a second cross dichroic prism 6. The cross dichroic prism 6 has a cementing surface 6a to which a dichroic coating that reflects only light of the R-color wavelength range is applied and a cementing surface 6b to which a dichroic coating that reflects only light of the B-color wavelength range is applied.

Of the light that has entered the cross dichroic prism 6, the R-color light exiting from the liquid crystal display panel 5R is reflected by the cementing surface 6a, the B-color light exiting from the liquid crystal display panel 5B is reflected by the cementing surface 6B, and the G-color light exiting from the liquid crystal display panel 5G is not reflected by either of those cementing surfaces. Accordingly, the cross dichroic prism 6 integrates together the light of three colors, and then leads the light out as an ordinary color image. This light is then projected through a projection lens 7 on a screen (not shown).

Figure 2:
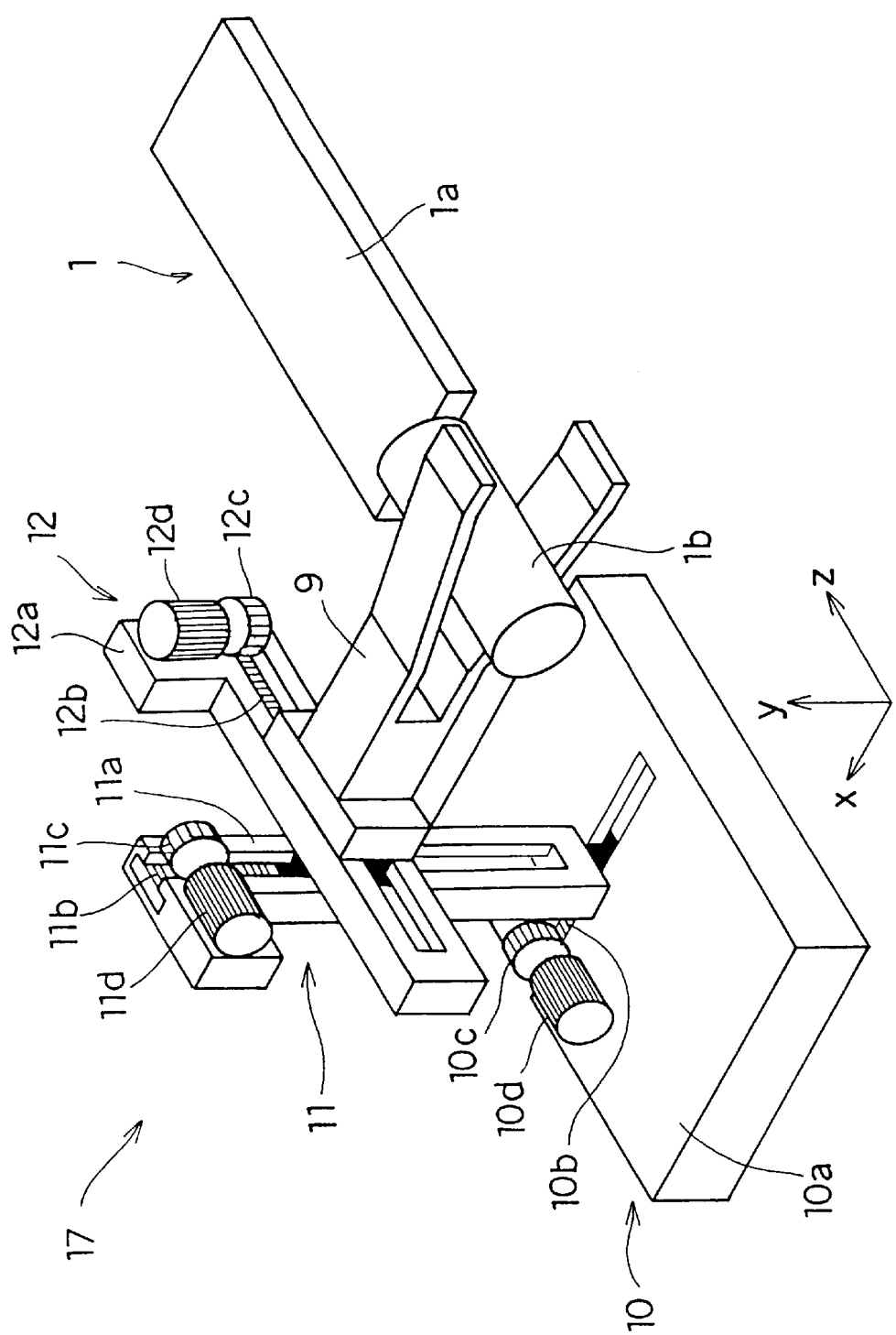
FIG. 2 is a diagram showing in detail the construction of the illumination section of the projector of the first embodiment.

FIG. 2 shows in detail the construction of the illumination section. In FIG. 2, the reflector 2 is omitted. As described above, in the projector of this embodiment, the lamp 1 is interchangeable with a lamp of a different type. To achieve this, the holder 17 has a holding member 9 that can hold lamps of different types, and a lamp position adjustment mechanism that can move the lamp to the optimum position in accordance with the type of the lamp fitted. The lamp position adjustment mechanism is composed of an x-direction adjuster 10, a y-direction adjuster 11, and a z-direction adjuster 12.

The lamp 1 is composed of a light-emitting portion 1a and a held portion 1b. The held portion 1b has a cylindrical shape, and is made of a magnetic material. When lamps of different types are manufactured in the future, if they are designed to have basically a construction as described above, they can be fitted to the projector of this embodiment.

The holding member 9 has one end thereof formed into a bifurcated shape so as to hold the lamp 1 by pinching the held portion 1b thereof in this bifurcated portion. The bifurcated portion of the holding member 9 is elastic, and the portion thereof that makes contact with the held portion is magnetized. Accordingly, the lamp is held at the held portion thereof, which is made of a magnetic material, by elastic and magnetic forces. As a result, a force sufficiently strong to hold the lamp acts on the held portion regardless of the diameter thereof.

In the lamp position adjustment mechanism, the x-, y-, and z-directions are directions that are perpendicular to one another. Here, it is assumed that the x-direction is the direction parallel to the base block 8 and perpendicular to the optical axis, that the y-direction is the direction perpendicular to both the base block 8 and the optical axis, and that the z-direction is the direction parallel to both the base block 8 and the optical axis.

The x-, y-, and z-direction adjusters 10, 11, and 12 are respectively composed of base blocks 10*a*, 11*a*, and 12*a* having grooves formed along the x-, y-, and z-directions, flat-bar-shaped moving members 10*b*, 11*b*, and 12*b* slidably fitted into those grooves, screw rollers 10*c*, 11*c*, and 12*c* fitted at one end of the base blocks 10*a*, 11*a*, and 12*a* so as to be kept in contact with the moving members 10*b*, 11*b* and 12*b*, and adjustment rollers 10*d*, 11*d*, and 12*d* joined to the screw rollers 10*c*, 11*c*, and 12*c* so as to give them rotational forces. The adjustment rollers 10*d*, 11*d*, and 12*d* are driven by motors (not shown).

The moving members 10*b*, 11*b* and 12*b* and the screw rollers 10*c*, 11*c*, and 12*c* have screw threads formed thereon in such a way that the former mesh with the latter respectively. Accordingly, as the screw rollers 10*c*, 11*c*, and 12*c* rotate, the moving members 10*b*, 11*b* and 12*b* move along the grooves respectively. The base block 11*a* of the y-direction adjuster 11 is so shaped as to extend along the y-direction, and has a projection formed at one end. This projection is firmly fitted to one end of the moving member 10*b* of the x-direction adjuster 10. In the x-direction adjuster 10, when the adjustment roller 10*d* rotates, the roller 10*d* gives a rotational force to the screw roller 10*c* and thereby makes the roller 10*c* rotate. As a result, the moving member 10*b*, which is meshed with the screw roller 10*c*, moves along the x-direction. As the moving member 10*b* moves, the y-direction adjuster 11, which is firmly fitted thereto, moves together.

Similarly, the base block 12*a* of the z-direction adjuster 12 is firmly fitted to the moving member 11*b* of the y-direction adjuster 11, and is thus moved thereby along the y-direction. The holding member 9 is, at one end, firmly fitted to the moving member 12*b* of the z-direction adjuster 12, and is thus moved thereby along the z-direction. The y- and z-direction adjusters 11 and 12 achieve the same movement mechanism as the x-direction adjuster 10, and therefore overlapping descriptions will not be repeated. The construction described above permits the holding member 9 to 10 move in three, i.e. x-, y-, and z-, directions.

According as the position of the lamp is adjusted by the adjustment mechanism described above, the amount of illumination light incident on the liquid crystal displays and the illuminated region thereon vary. When the lamp is at the optimum position, the center axis of the lamp coincides with the optical axis through the reflector and the projection lens of the projector, and in addition the center of light emission of the lamp lies at a predetermined position on the optical axis. The initial position of the lamp is set beforehand, at the time of design, to be the position in which, calculation predicts, the lamp illuminates the liquid crystal display panels most efficiently. Because different lamps have differently shaped light-emitting portions, their optimum light-emission-center positions do not always coincide. However, here, by averaging, by adopting the data corresponding to an ideal lamp, or by another method, the optimum light-emission-center position is set at a single value. Since the reflector is immovable, when the lamp is at the optimum position, the lamp and the reflector have the optimum positional relationship.

Figure 3:
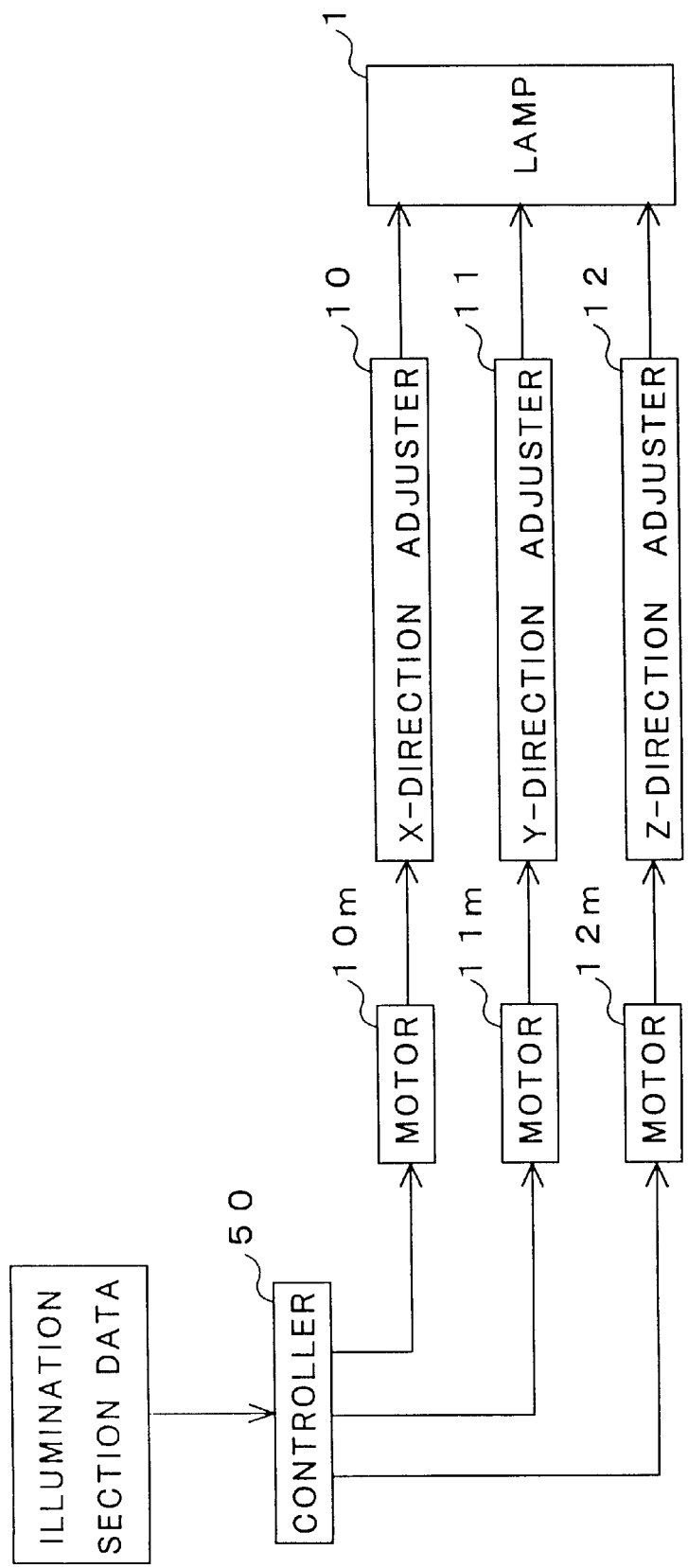
FIG. 3 is a circuit block diagram of a portion related to lamp position adjustment of the projector of the first embodiment.

FIG. 3 shows, in the form of a block diagram, the circuit configuration of a portion related to lamp position adjustment. The lamp position adjustment mechanism is provided with motors 10*m*, 11*m*, and 12*m* for driving the x-, y-, and z-direction adjusters 10, 11, and 12 respectively. These motors are controlled by a controller 50.

Figure 4A:
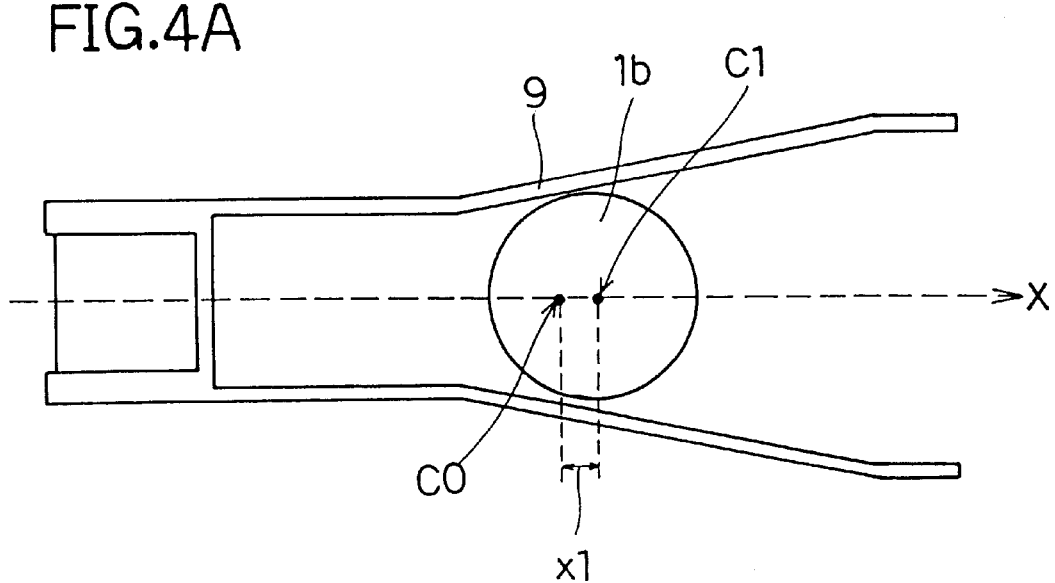
FIGS. 4A and 4B are diagrams showing x-y sections of a part of the illumination section including the holding member.
Figure 4B:
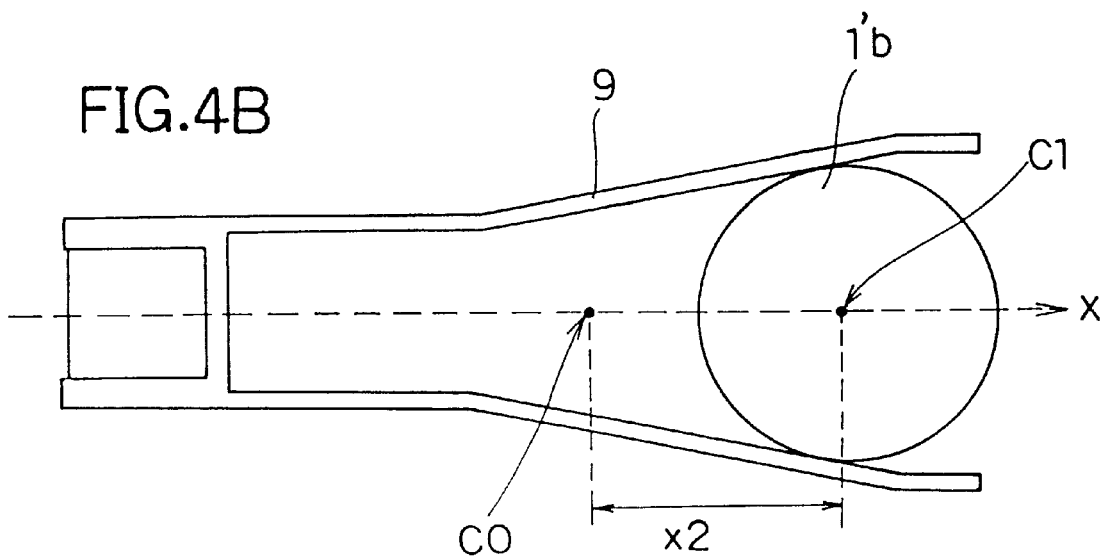

The controller 50 performs control such that the lamp fitted is located at the optimum position. First, how the position of the lamp is controlled in the x- and y-directions will be described. The controller 50 adjusts the position of the lamp in the x- and y-directions in such a way that the center axis of the lamp, connecting the light-emission center thereof and the center of the held portion, lies on the optical axis of the projector. FIGS. 4A and 4B show x-y sections of a portion including the holding member 9. The position at which the held portion of the lamp makes contact with the holding member 9 varies according to the diameter of the held portion of the lamp. FIG. 4A shows an example of a lamp whose held portion is small in diameter, and FIG. 4B shows an example of a lamp whose held portion is large in diameter. As will be understood from FIGS. 4A and 4B, the larger the diameter of the held portion of a lamp, the closer to the tip of the bifurcated portion of the holding member 9 the lamp is held.

As shown in FIG. 3, the controller 50 acquires, as part of the data related to the illumination section, the diameter of the held portion of the lamp fitted. Then, the controller 50 calculates the movement distances in the x- and y-directions in accordance with the diameter acquired, and actuates the x- and y-direction adjusters 10 and 11 to adjust the position of the lamp so that the lamp will be moved through the calculated movement distances. In FIGS. 4A and 4B, the optical axis of the projector is indicated by C0, and the center axis of the lamp is indicated by C1. The movement distances in the x- and y-directions are equal to the deviations of the center axis C1 of the lamp from the optical axis C0 of the projector, and thus, by moving the lamp through the distances equal to these deviations, the center axis C1 of the held portion is made to lie on the optical axis C0. The x-direction deviation is indicated by x1 in FIG. 4A and by x2 in FIG. 4B. Note that, with lamps having a common shape, no deviation is likely in the y-direction between the optical axis C0 and the center axis C1 of the lamp; therefore, no y-direction deviation is shown in FIG. 4A or 4B. Accordingly, to simplify the construction of the adjustment mechanism, the y-direction adjuster 11 may be omitted.

Figure 5A:
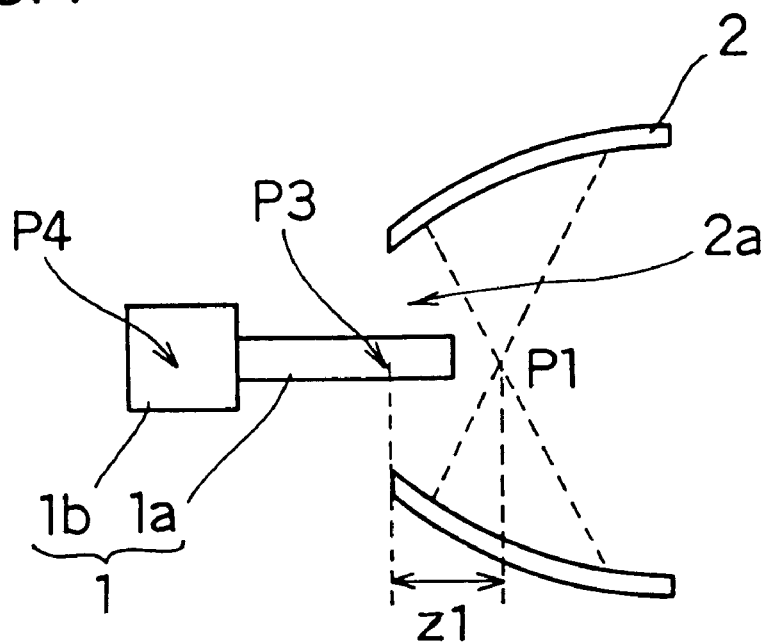
FIGS. 5A and 5B are diagrams showing y-z sections, including the optical axis of the projector, of the illumination section.
Figure 5B:
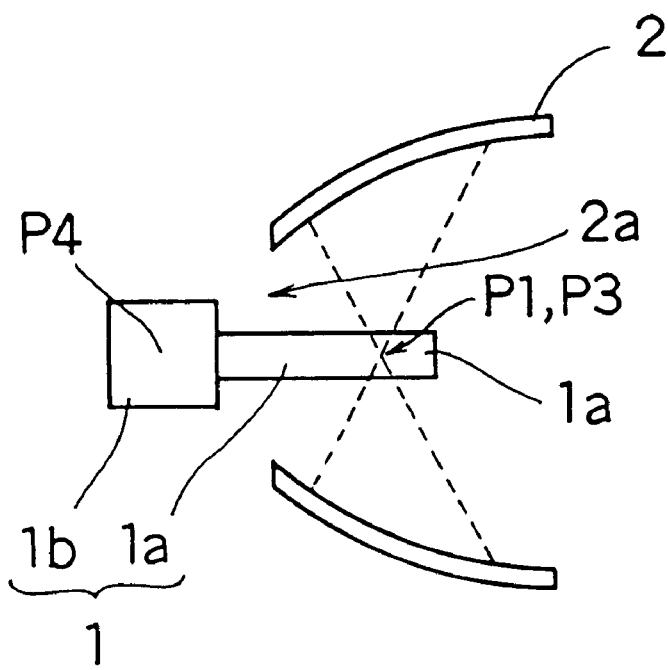

Next, how the position of the lamp is controlled in the z-direction will be described. FIGS. 5A and 5B show y-z sections including the optical axis of the projector. Note that position control in the z-direction is performed after position control in the x- and y-directions, and therefore FIGS. 5A and 5B show the state in which x- and y-direction position control has been finished and thus the optical axis of the projector coincides with the center axis of the lamp. In FIGS. 5A and 5B, the optimum light-emission-center position, set beforehand, is indicated by P1, the center of light emission of the lamp by P3, and the center of the held portion by P4.

The controller 50 acquires, as part of the data related to the illumination section, the length between the center P4 of the held portion of the lamp fitted and the center P3 of light emission thereof (called the specific length of the lamp). Then, the controller 50 calculates the movement distance in the z-direction in accordance with the specific length of the lamp acquired, and actuates the z-direction adjuster 12 to adjust the position of the lamp so that the lamp will be moved through the calculated movement distance. The movement distance in the z-direction is equal to the deviation in the z-direction of the center P3 of light emission of the lamp from the optimum light-emission-center position P1, and thus, by moving the lamp through the distance equal to this deviation, the center P3 of light emission of the lamp is made to lie on the optimum light-emission-center position P1.

For example, suppose that, in FIG. 5A, the deviation in the z-direction of the center P3 of light emission of the lamp from the optimum light-emission-center position P1 is z1. In this case, the controller 5 actuates the z-direction adjuster 12 to move the lamp 1 so that, as shown in FIG. 5B, the center P3 of light emission of the lamp will coincide with the optimum light-emission-center position P1.

Figure 6:
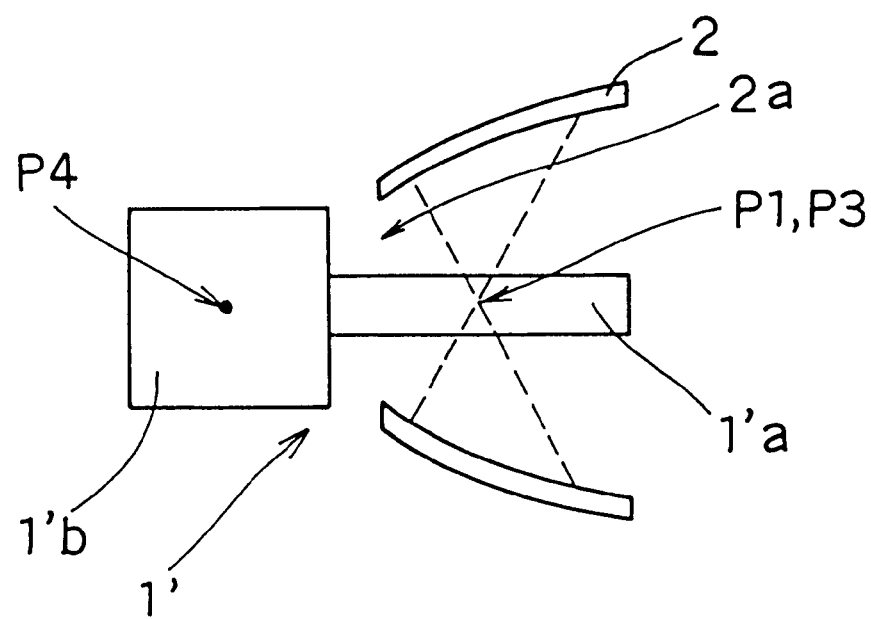
FIG. 6 is a diagram showing a y-z section, including the optical axis of the projector, of the illumination section, with a lamp of a different type attached.

Similarly, as shown in FIG. 6, when a lamp 1' of a different type from the lamp 1 is fitted, the controller 50 calculates the movement distance in the z-direction in accordance with the specific length of the lamp 1', and moves the lamp 1' through the calculated movement distance so that the center P3 of light emission of the lamp will coincide with the optimum light-emission-center position P1.

In the projector of this embodiment, the reflector 2 has a cut 2a formed around the vertex thereof, and this cut 2a is made so large as to allow insertion of a lamp having a held portion of any diameter. Accordingly, it is possible to fit a lamp 1' having a held portion of a larger diameter than the lamp 1. Since the lamp is not connected directly to the reflector, it is possible to replace only the lamp, and moreover it is possible to fit lamps of different types.

Figure 53:
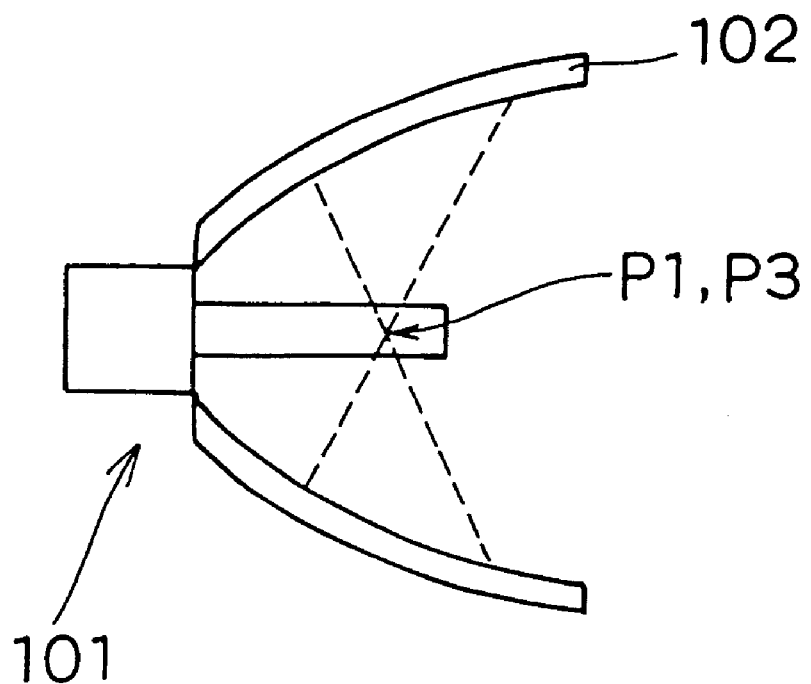
FIG. 53 is a diagram showing a y-z section, including the optical axis, of the illumination section of a conventional projector.

For comparison, FIG. 53 shows a y-z section including the optical axis of the illumination section of a conventional projector. In a conventional projector, the reflector 102 is given a shape that fits a specific type of lamp, and thus allows fitting of only a lamp of the specific type. Thus, the lamp 101 needs to be replaced as one unit together with the reflector 102.

In the projector of this embodiment, which allows use of different types of lamp and which is thus capable of setting optimally the position and the drive voltage of the lamp regardless of the type thereof, it is necessary to feed the controller 50 with the data related to the lamp. This data is stored in the illumination section, and the controller 50 reads the data from the illumination section and uses the data in performing control.

Figure 7:
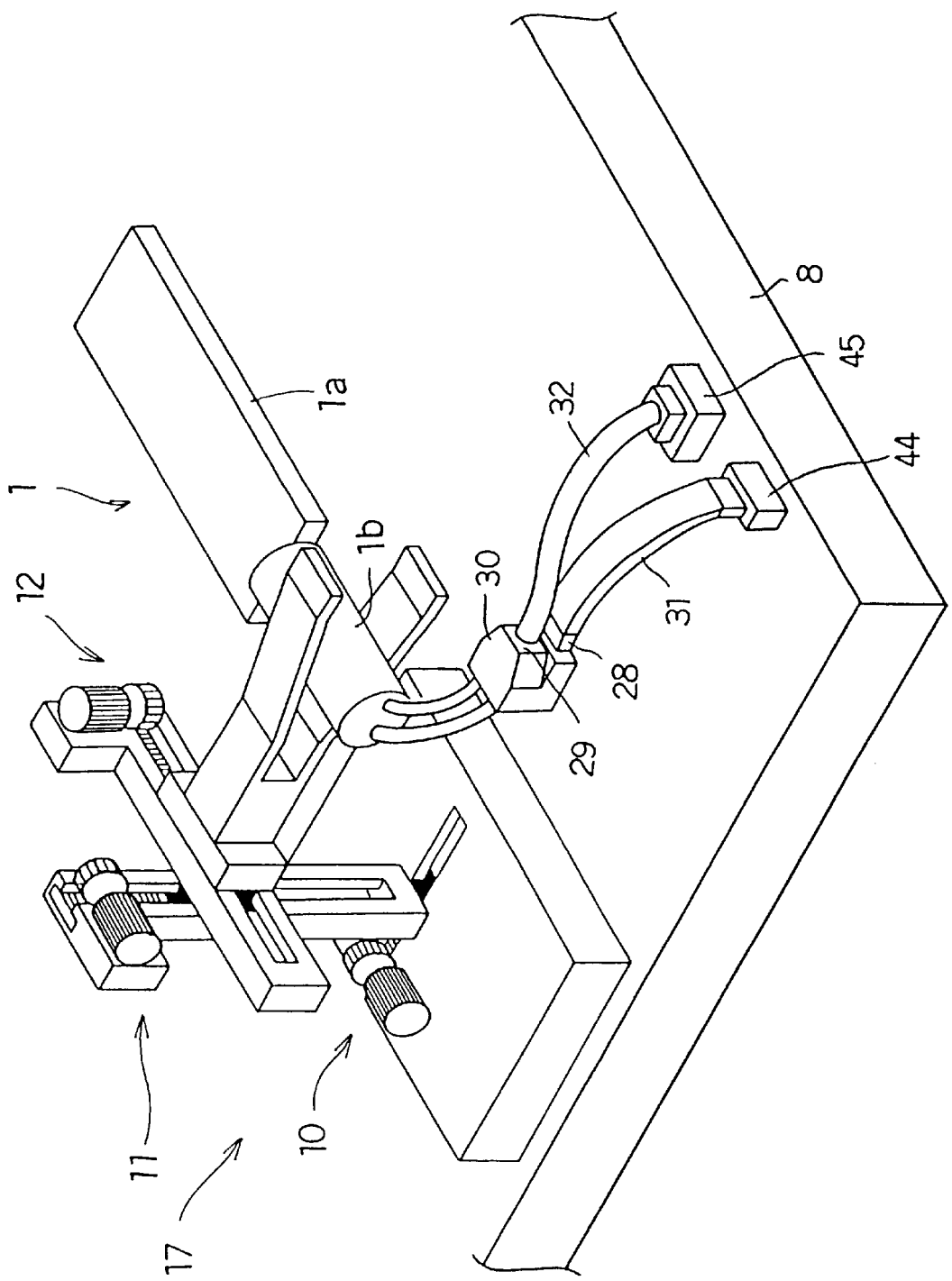
FIG. 7 is a diagram showing the construction for connecting the illumination section and the controller of the projector of the first embodiment.

FIG. 7 shows the construction for connecting the illumination section and the controller. The lamp 1 has a data holder 30 that is connected to the held portion 1b. The data holder 30 incorporates a memory, and holds the data related to the lamp 1 in the memory. The memory is an EEPROM (electrically-erasable programmable read-only memory), i.e. a non-volatile memory that allows rewriting of data, and is provided with terminals 28 for data exchange. In the memory are stored data related to the lamp 1, such as the rated output, the initial light-emission amount, the end-of-life light-emission amount, and the light-emission temperature of the lamp, and data required for lamp position control. Note that the end-of-life light-emission amount of a lamp depends heavily on the manufacturer and the user of the lamp, and is thus sometimes omitted from the data stored.

The projector has terminals 44 for data exchange that are connected to the controller 50, and these terminals 44 are connected to the terminals 28 of the data holder 30 by way of data lines 31. That is, the data related to the lamp 1 is fed by way of the terminals 28, the lines 31, and the terminals 44 to the controller 50 provided inside the projector. The data holder 30 also has terminals 29 for receiving electric power. Correspondingly, the projector has terminals 45 for supplying electric power that are connected to a power source, and these terminals 45 are connected to the power terminals 29 of the data holder 30 by way of power supply lines 32. The data holder 30 feeds the received electric power to the light-emitting portion 1a of the lamp 1.

As the data used to determine the movement distances of the lamp, it is possible to store the diameter of the held portion of the lamp and the specific length of the lamp, or alternatively the movement distances from a predetermined position of the holding member as calculated beforehand.

Figure 8:
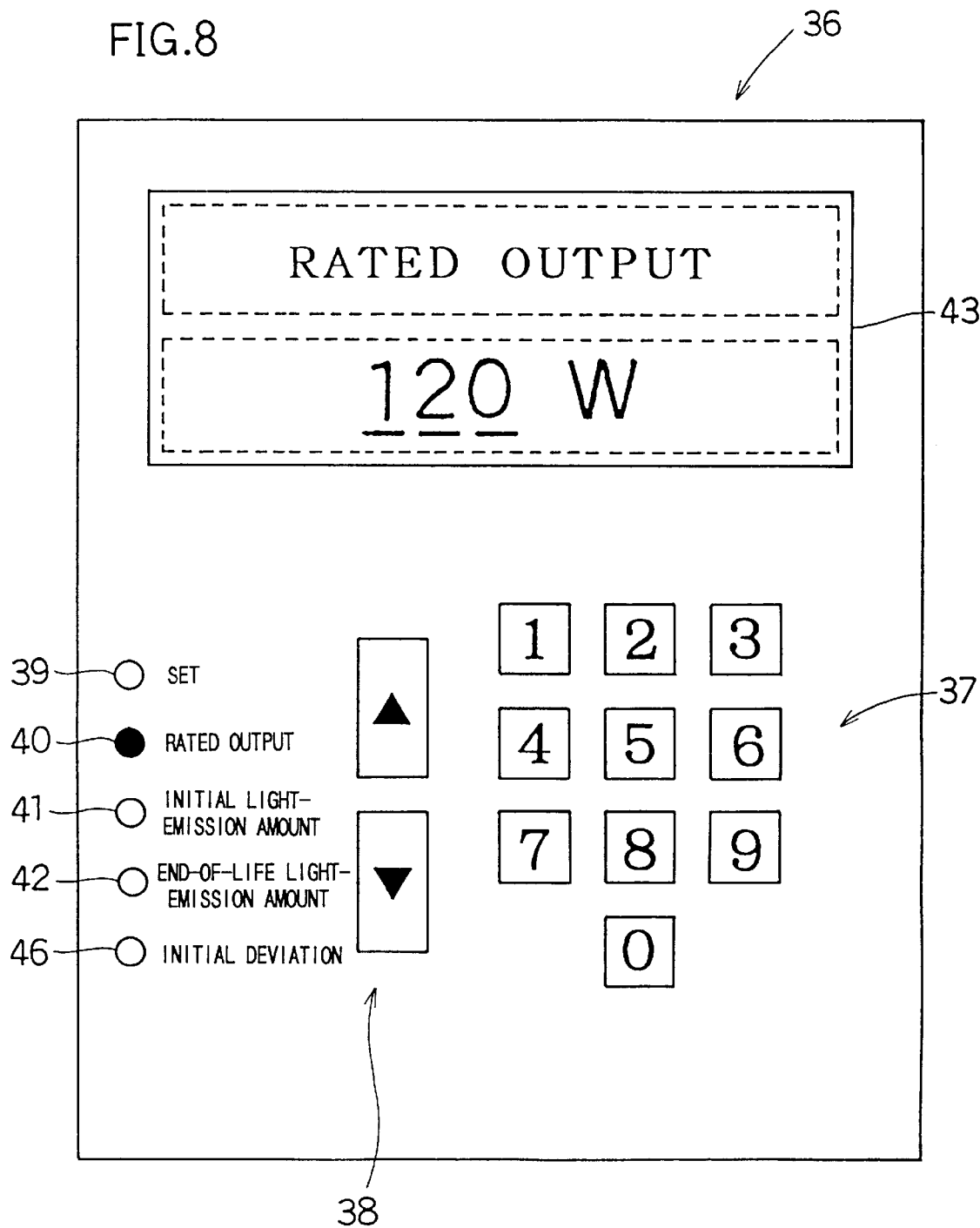
FIG. 8 is a diagram schematically showing the data input section of the projector of the first embodiment.

The projector may be designed to allow the user to enter the data related to the lamp. In that case, the projector has, on a side surface of an outer casing thereof, a data input section 36 as shown in FIG. 8. The outer casing of the projector is a casing that houses the entire projector shown in FIG. 1. The data input section 36 includes numerical keys 37, up and down keys 38, a set button 39, a rated-output setting button 40, an initial light-emission amount setting button 41, an end-of-life light-emission amount setting button 42, an initial deviation setting button 46, and a display panel 43.

Pressing the button 40, 41, 42, or 46 respectively starts a rated-output setting mode for setting the rated output, an initial light-emission amount setting mode for setting the initial light-emission amount, an end-of-life light-emission amount setting mode for setting the end-of-life light-emission amount, or a deviation setting mode for setting the deviations in the x-, y-, and z-directions with the held portion located at the initial position thereof.

Here, the deviations of the held portion at the initial position are used as the data used for position control of the lamp, and thus a deviation setting mode is provided. However, instead, it is also possible to use the data such as the diameter and the specific length of the lamp as the data used for position control, and provide a mode for setting those values. In that case, the controller 50 calculates the movement distances on the basis of those values.

After one of the above-mentioned modes has been started, when the user enters the data required in that mode by using the numerical keys 37 and the up and down keys 38, the entered data is displayed on the display panel 43. Thereafter, when the set button 39 is pressed, the displayed data is stored in the memory. The controller 50 reads necessary data from the memory.

Figure 9:
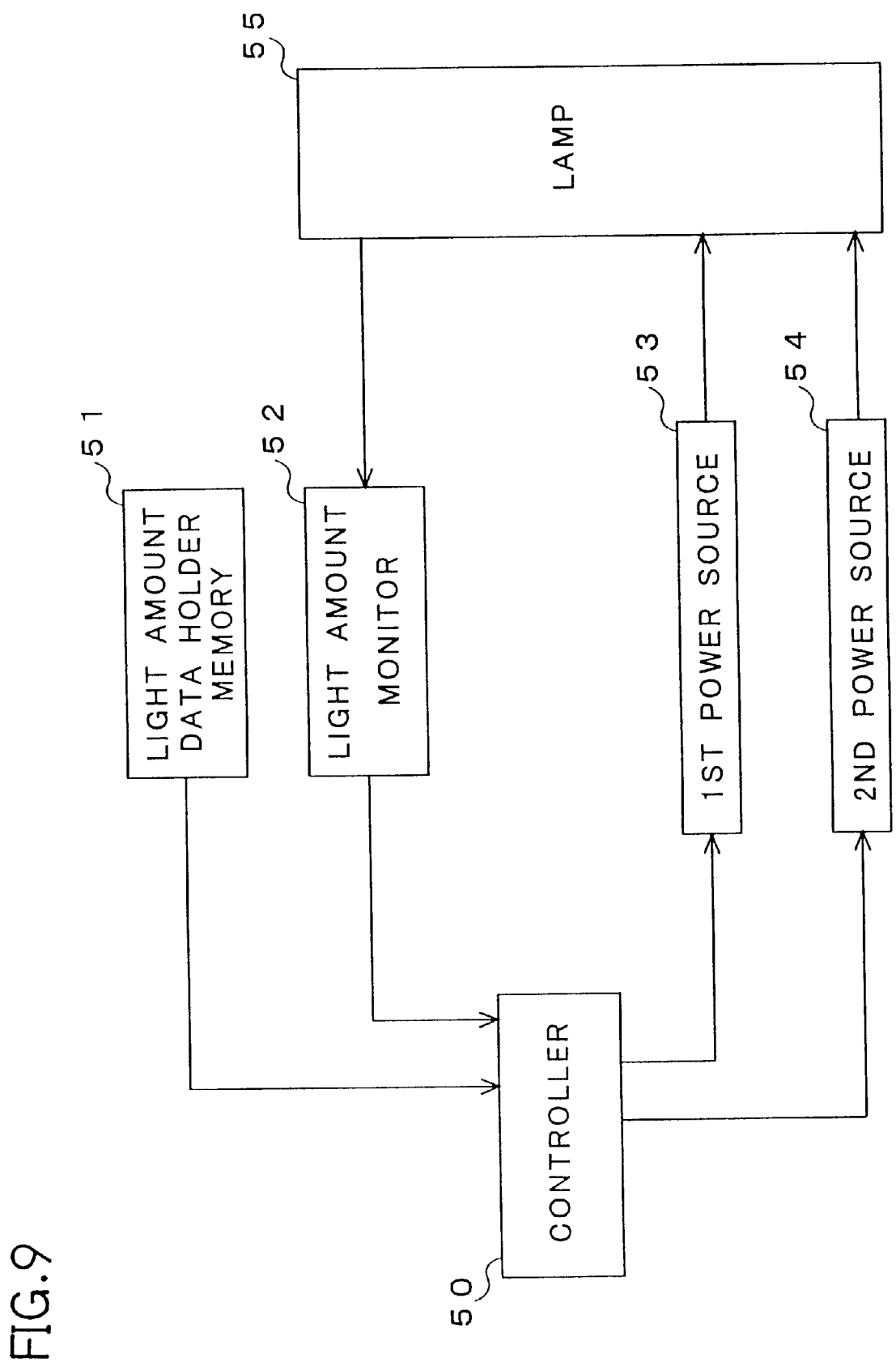
FIG. 9 is a circuit block diagram of a portion related to voltage switching of the projector of the first embodiment.

The controller 50 has a function of switching the voltage applied to the light-emitting portion of the lamp of the illumination section. Now, how voltage switching is achieved will be described. FIG. 9 shows, in the form of a block diagram, the circuit configuration of a portion related to voltage switching. The controller 50 acquires the data of the initial and end-of-life light-emission amount from the memory 51 provided within the data holder 30.

When the user requests starting of supply of electric power, the controller 50, on the basis of the rated output acquired as the data related to the illumination section, performs control such that a first power source 53 supplies a voltage to the lamp 55 and thereby lights the lamp 55. The lamp 55 is the lamp fitted to the illumination section. A light amount monitor 52 detects, at predetermined time intervals, the amount of light emitted from the lamp 55 thus lit, and feeds the detection result to the controller 50.

When the amount of light emitted from the lamp 55 as reported from the light amount monitor 52 reaches a predetermined value, the controller 50 performs control such that the voltage applied to the lamp 55 is increased. Specifically, the controller 50 switches the drive power source circuit in such a way that a voltage is applied to the lamp 55 from a second power source 54 that outputs a voltage higher than the first power source 53.

FIG. 10 shows bow the amount of emitted light varies with respect to the duration of electric power supply under the control described above. In this figure, the duration is taken along the horizontal axis, and the amount of emitted light as detected by the light amount monitor 52 is taken along the vertical axis. The initial light-emission amount is indicated by L1, the end-of-life light-emission amount is indicated by L2, and the predetermined value is indicated by L4. Furthermore, L3 indicates a value equal to ( L1+L2 )/2. After electric power starts being supplied, the amount of emitted light, starting at the initial light-emission amount L1, gradually decreases. At the time t1 when the amount of emitted light becomes equal to L4, which is smaller than L3, the controller 50 switches the power source from which to supply electric power to the lamp 55 from the first power source 53 to the second power source 54.

When the power source is switched to the second power source 54, the drive voltage applied to the lamp becomes higher, and thus the amount of light emitted therefrom increases. Owing to the characteristics of the lamp, the higher the drive voltage, the more the amount of emitted light drops with respect to time. Accordingly, the gradient of the graph of the amount of emitted light is now greater than when the first power source 53 was used. However, whereas the end-of-life light-emission amount is reached as early as at a time t2 if the lamp is driven with a constant voltage, i.e., without raising the voltage, the end-of-life light-emission amount is reached at a time t3, which is later than t2, if control is performed as in this embodiment, with the result that the life of the lamp is extended by t3–t2.

The power source circuit may be switched earlier; however, switching the power source circuit while the amount of emitted light is larger than the medium value L3 causes the end-of-life light-emission amount to be reached accordingly earlier, and in the worst case even earlier than the time t2 at which the end-of-life light-emission amount is reached if the power source circuit is not switched. In that case, switching the power source circuit offers less advantage. Therefore, it is preferable to set the predetermined value L4 smaller than the medium value L3 as in this embodiment.

In this embodiment, control is performed by use of not only the initial light-emission amount but also the end-of-life light-emission amount. However, considering that, with common lamps, the end-of-life light-emission amount can be regarded as one half of the initial light-emission amount, it is also possible to perform control by use of only the initial light-emission amount. In that case, L2=½×L1, and L3=(L1+L2)/2=(½×L1+L1)/2=¾×L1.

<Second Embodiment>

The projector of a second embodiment of the present invention is different from that of the first embodiment in that a lamp position adjustment mechanism of this projector does not include a z-direction adjuster and that, instead, a lamp used by this projector is provided with a restricting member for restricting the z-direction holding position thereof. In other respect, the projectors of the first and second embodiments have the same construction, and therefore overlapping descriptions will not be reported.

The restricting member of this embodiment will be described with reference to a schematic diagram of the illumination section shown in FIG. 11A. Around a lamp 15, a ring-shaped stopper 14 is firmly fitted so as to serve as the restricting member. The user is expected to fit the lamp with the light-emitting portion side end of the stopper 14 kept in contact with the holding member 9. The stopper 14 is firmly fixed at a position where the stopper allows the light-emission center P3 of the lamp 15 to coincide with the optimum light-emission-center position P1 in the z-direction. Accordingly, as long as the user fits the lamp in the way described above, the light-emission center P3 always coincides with the optimum light-emission-center position P1.

Figure 11A:
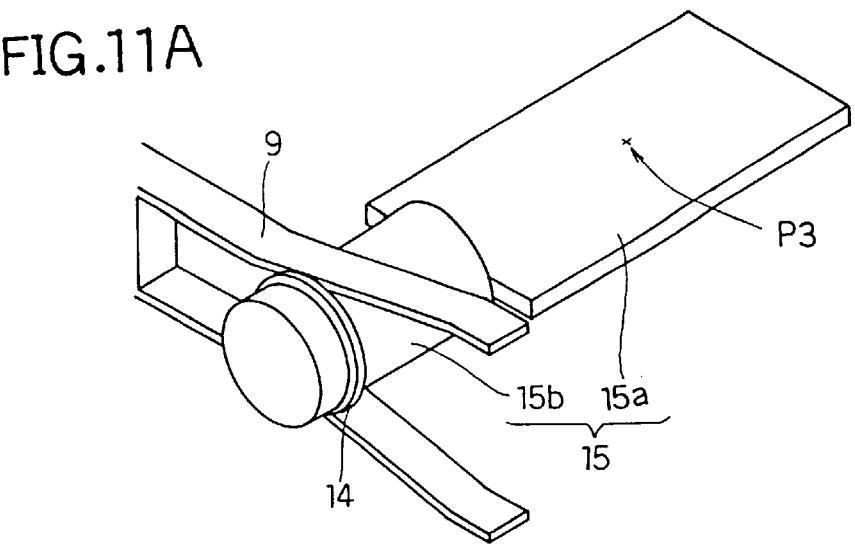
FIGS. 11A and 11B are diagrams schematically showing a part of the illumination section of the projector of a second embodiment of the present invention.
Figure 11B:
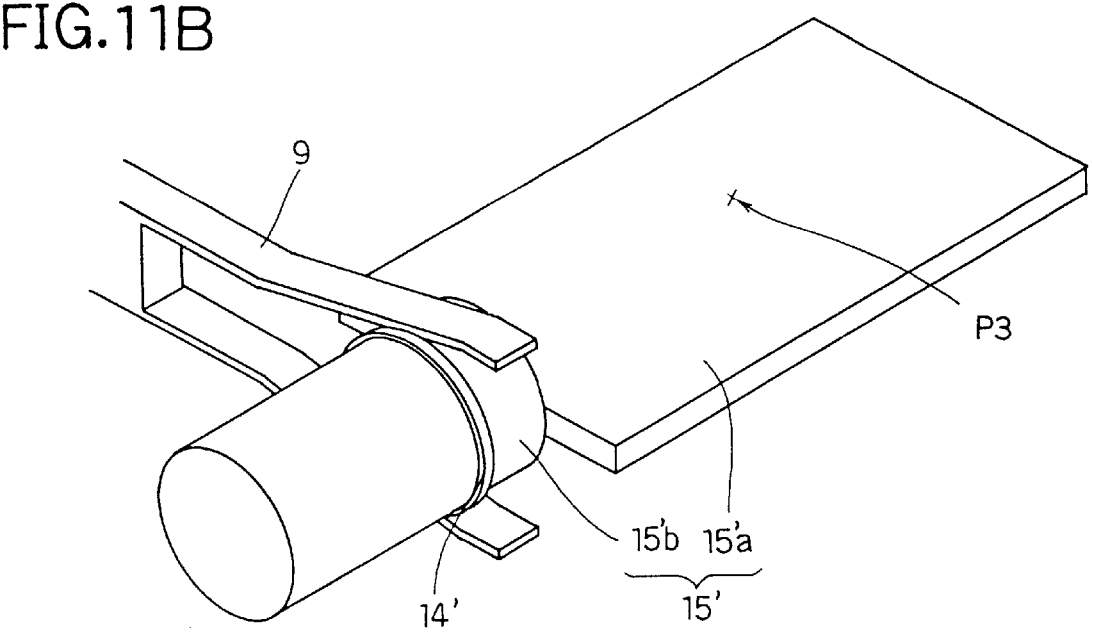

FIG. 11B shows a schematic diagram of the illumination section with a lamp 15' of a type different from the lamp 15 fitted thereto. The user fits the lamp with the light-emitting portion side end of a stopper 14' kept in contact with the holding member 9. As long as the lamp is fitted in this way, regardless of the type of the lamp, the light-emission center P3 of the lamp 15 always coincides with the optimum light-emission-center position P1 in the z-direction.

Figure 12A:
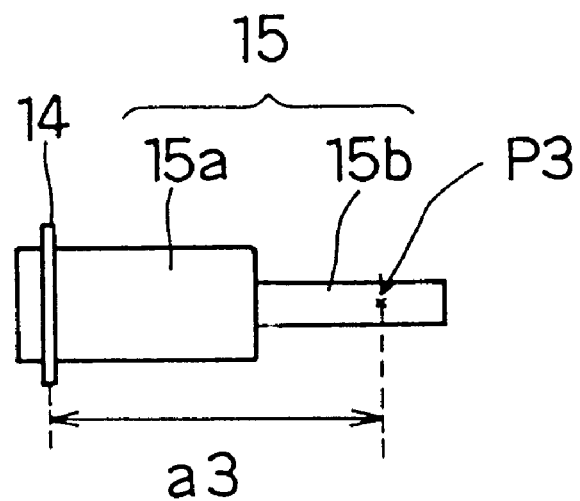
FIGS. 12A and 12B are diagrams showing vertical sections, including the optical axis, of a part of the illumination section of the projector of the second embodiment.
Figure 12B:
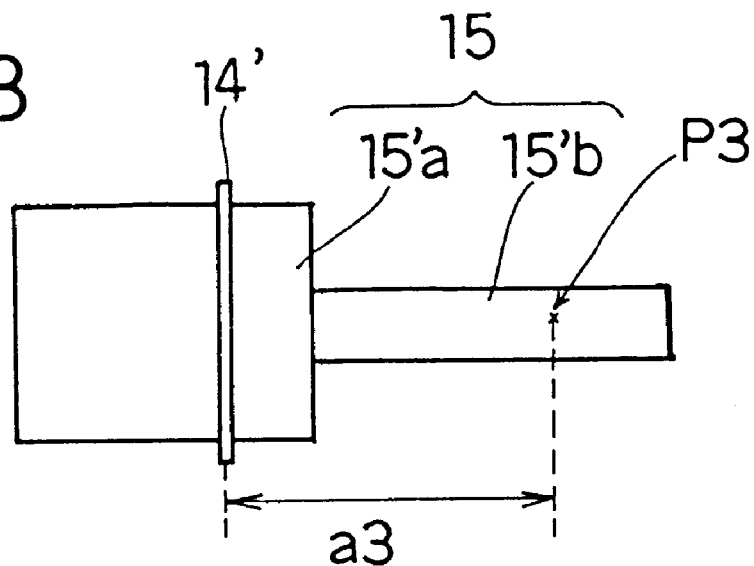

FIGS. 12A and 12B show vertical sections, including the optical axis, of the illumination section shown in FIGS. 11A and 11B. The length from the stopper to the light-emission center P3 of the light-emitting portion of the lamp has a fixed value a3 regardless of the type of the lamp. Thus, by letting the holding member 9 hold that position of the lamp which is restricted by the stopper 14 or 14', it is possible to make the light-emission center P3 of the lamp coincide with the optimum light-emission-center position P1.

In the illumination section of this projector, by observing the restriction imposed by the stopper serving as the restricting member as described above, it is possible to eliminate a positional deviation in the z-direction of the light-emission center P3 of the lamp from the optimum light-emission-center position P1. Accordingly, there is no need to provide a z-direction adjuster 12 as in the first embodiment. In this embodiment, the holding member 9 is firmly fitted directly to the y-direction adjuster 11, though not shown.

Figure 13A:
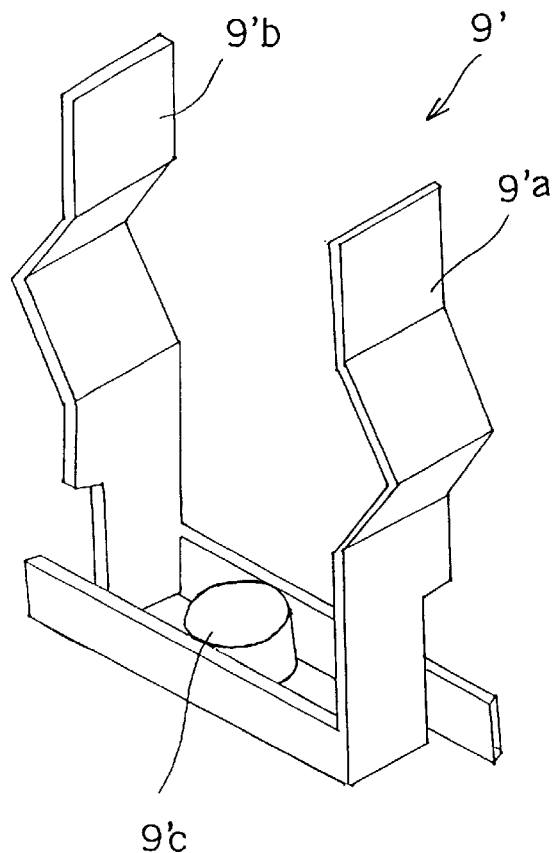
FIGS. 13A and 13B are diagrams schematically showing another example of the construction of the holding member used in the illumination section in the first and second embodiments.

In the projectors of both the first and second embodiments, the illumination section is so designed that the held portion of the lamp is pinched, from one side, by the V-shaped bifurcated portion of the holding member 9, which is fixed at the other end. In this construction, as described above, the x-direction position of the lamp varies according to the diameter of the held portion of the lamp. In place of this holding member 9, it is also possible to use a holding member 9' as shown in FIG. 13A that can pinch the held portion of the lamp from both sides with equal forces.

Figure 13B:
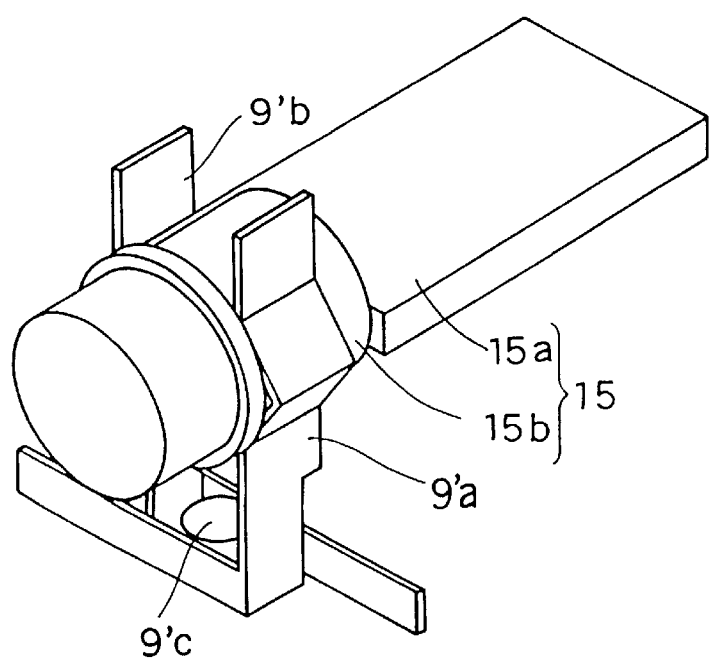

The holding member 9' is composed of a right-hand member 9'a and a left-hand member 9'b each formed as a magnetized plate having a V-shaped recessed portion near the center thereof, and a gear 9'c. The right-hand and left-hand members 9'a and 9'b are coupled together by the gear 9'c placed between them. Accordingly, the right-hand and left-hand members 9'a and 9'b move in opposite directions. FIG. 13B shows how this holding member 9' holds the lamp 15 of the second embodiment. When the held portion 15b of the lamp is inserted between the recessed portions of the right-hand and left-hand members 9'a and 9'b, the right-hand and left-hand members 9'a and 9'b are attracted by magnetism, with the result that the lamp is held with the held portion 15b pinched between them.

Figure 14A:
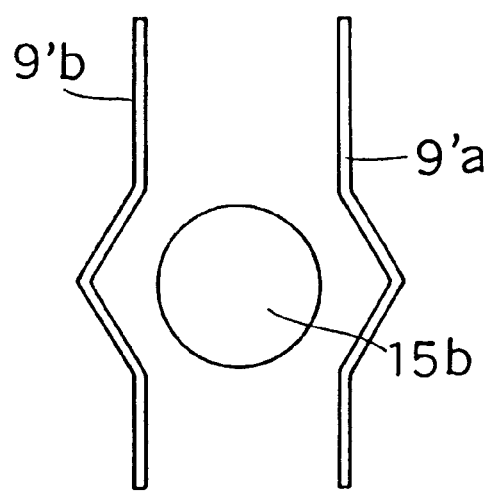
FIGS. 14A and 14B are diagrams showing the movement of the holding member shown in FIGS. 13A and 13B.
Figure 14B:
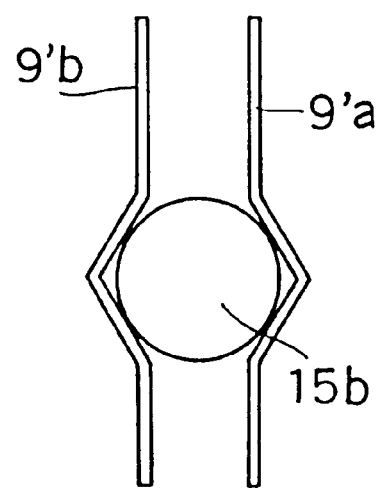

The movement of the members 9'a and 9'b is restricted by guides (not shown). The gear 9'c is fixed, so that the holding member 9' as a whole does not move in the x-direction. The magnetism acting among the lamp and the members 9'a and 9'b is considerably strong, and therefore, to ease removal of the lamp, a reset lever is provided, though not shown. FIGS. 14A and 14B show x-y sections of the holding member 9' before and after the movement respectively. The construction of this holding member 9' eliminates positional deviations of the lamp also in the x- and y-directions, and thus permits omission of the x- and y-direction adjusters.

Figure 15:
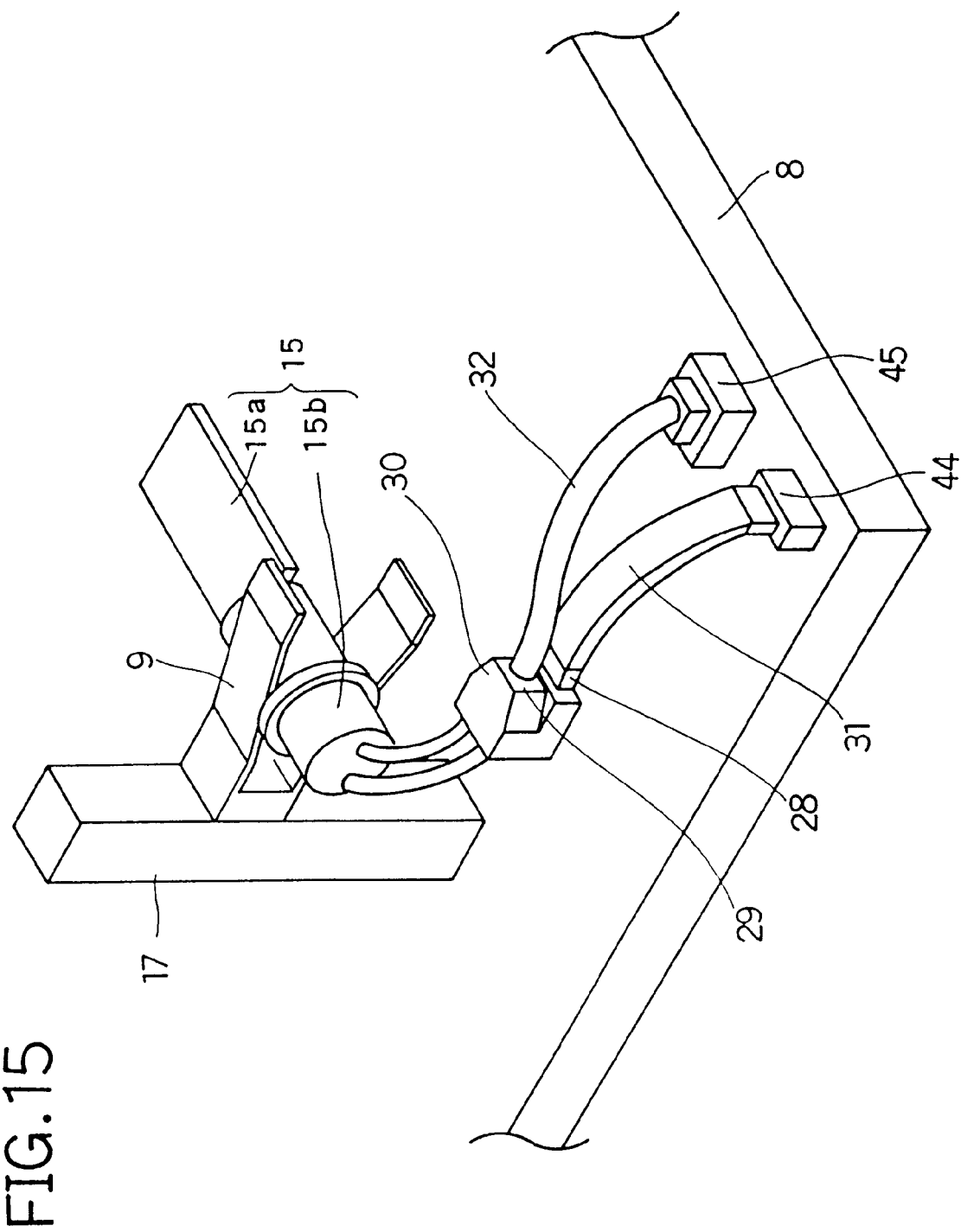
FIG. 15 is a diagram showing the construction for connecting the illumination section and the controller of the projector of the second embodiment.

In this embodiment, too, the data related to the lamp is stored in the illumination section, or alternatively entered by the user. FIG. 15 shows the construction for connecting the illumination section and the controller for the case where the data is stored in the illumination section. In FIG. 15, the lamp holder 17 is illustrated in a simplified form. The data related to the lamp 15 is fed from the data holder 30 connected to the held portion 15b of the lamp 15 to the controller 50 by way of the data lines 31. Note that, in this embodiment, the data does not include the specific length of the lamp, because the specific length is not required for position control in the z-direction.

<Third Embodiment>

Figure 16A:
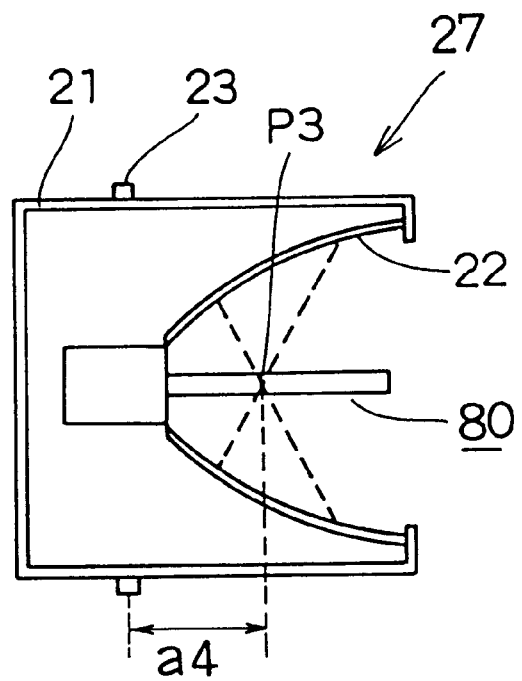
FIGS. 16A and 16B are diagrams showing sections, including the center axis of the lamp, of a part of the illumination section of the projector of a third embodiment of the present invention.
Figure 16B:
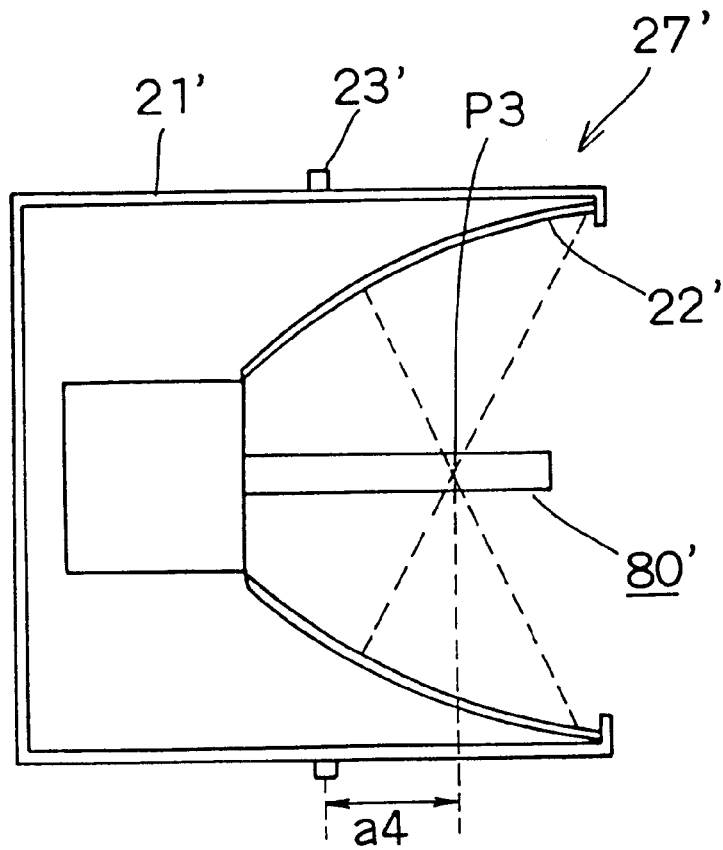

In the projector of a third embodiment of the present invention, the illumination section is so designed that a lamp and a reflector are housed in a box-shaped member to form an integral lamp unit, and thus that the lamp unit as a whole is interchangeable with a lamp unit of a different type. FIG. 16A shows the box-shaped member 21 and the internal construction thereof in the form of a section including the center axis of the lamp. The lamp unit 27 is composed of a box-shaped member 21, a reflector 22, and a lamp 80. FIG. 16B shows a section of another lamp unit 27' composed of a box-shaped member 21', a reflector 22', and a lamp 80'. The lamp unit 27' is larger than the lamp unit 27, and is provided with a lamp of a different type therefrom.

Inside the lamp unit, the lamp is fixed in such a position inside the reflector in which the lamp has the optimum positional relationship with the reflector. The box-shaped member 21 or 21' has a stopper 23 or 23' firmly fixed on the outer circumferential surface thereof. This stopper 23 or 23' serves as a restricting member for restricting the position at which the lamp unit 27 or 27' is held by the holding member so that the light-emission center P3 of the lamp will coincide with the optimum light-emission-center position of the projector in the z-direction.

The user is expected to fit the lamp unit always with the light-emitting portion side end of the stopper kept in contact with the holding member. The stopper is firmly fixed at positions where, as long as the lamp unit is fitted in this way, the stopper allows the light-emission center P3 of the lamp to coincide with the optimum light-emission-center position of the projector in the z-direction. Accordingly, the length in the z-direction from the light-emission center P3 to the stopper has a fixed value a4 regardless of the type of the lamp unit. This construction, as that of the second embodiment, eliminates the need to provide a z-direction adjuster.

Figure 17:
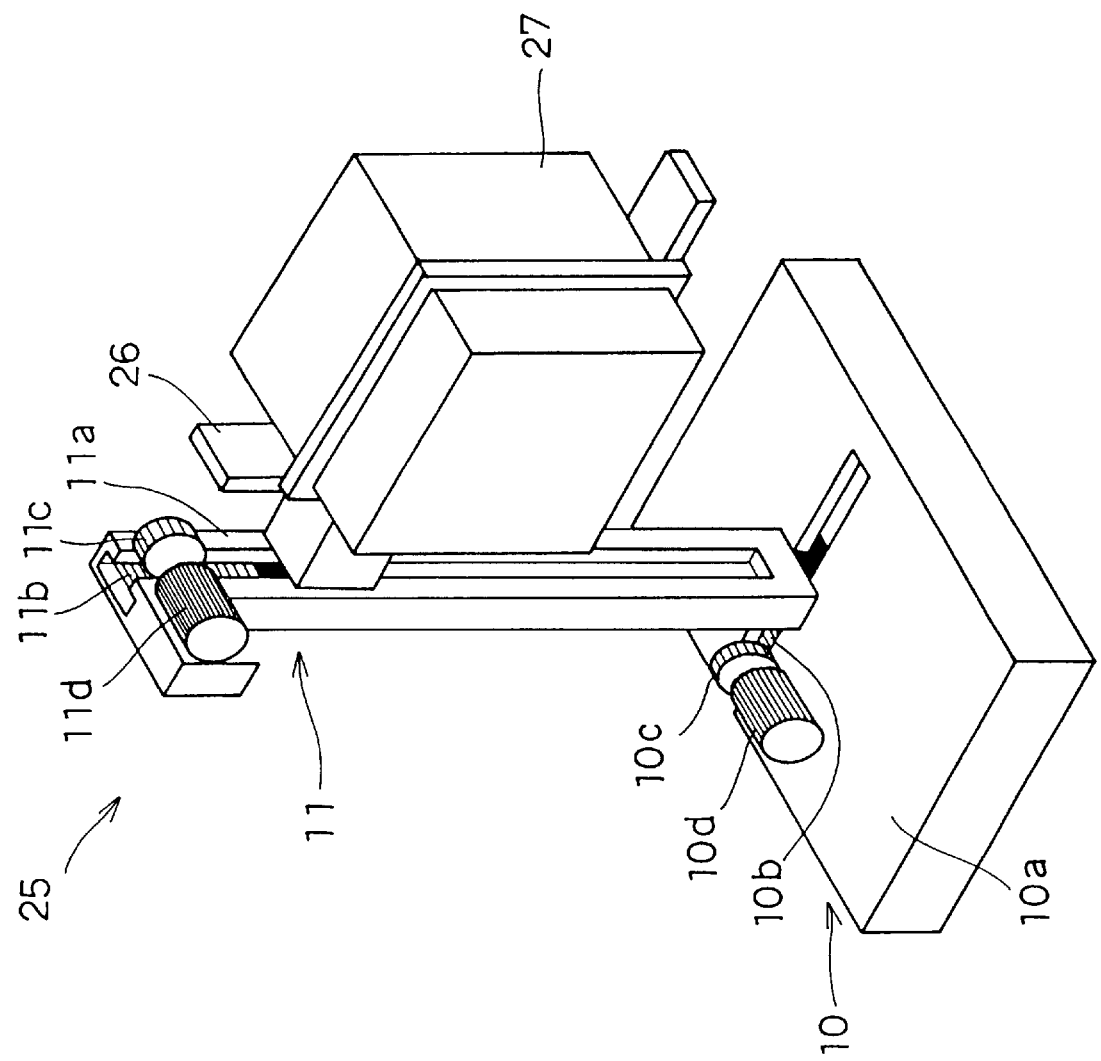
FIG. 17 is a diagram showing the construction of the entire illumination section of the third embodiment with a lamp unit fitted therein.

FIG. 17 shows the construction of the entire illumination section with the lamp unit 27 attached thereto. The lamp unit 27 is fixed by a holder 25. The holder 25 is composed of an x-direction adjuster 10, a y-direction adjuster 11, and a holding member 26. The x- and y-direction adjusters 10 and 11 have the same constructions as in the first embodiment shown in FIG. 2, and therefore their constituent components are identified with the same reference numerals and symbols, without repeating overlapping descriptions.

The holding member 26 has an L-shaped, magnetized holding portion. The box-shaped member 21 of the lamp unit 27 is made of a magnetic material, and thus the lamp unit 27 is held by the magnetism that acts between the lamp unit 27 and the holding member 26. The holding member 26 is firmly fitted to the y-direction adjuster 11, and is movable in the x- and y-directions. Accordingly, the lamp unit 27, which is held by the holding member 26, is also movable in the x- and y-directions.

Position control in the x- and y-directions is achieved by making the x- and y-direction adjusters 10 and 11 move the lamp unit 27 on the basis of the data stored in the illumination section in such a way that the center axis of the lamp coincides with the optical axis of the projector. In other respects, the illumination section has the same construction as in the first embodiment, and therefore overlapping descriptions will not be repeated.

Figure 18:
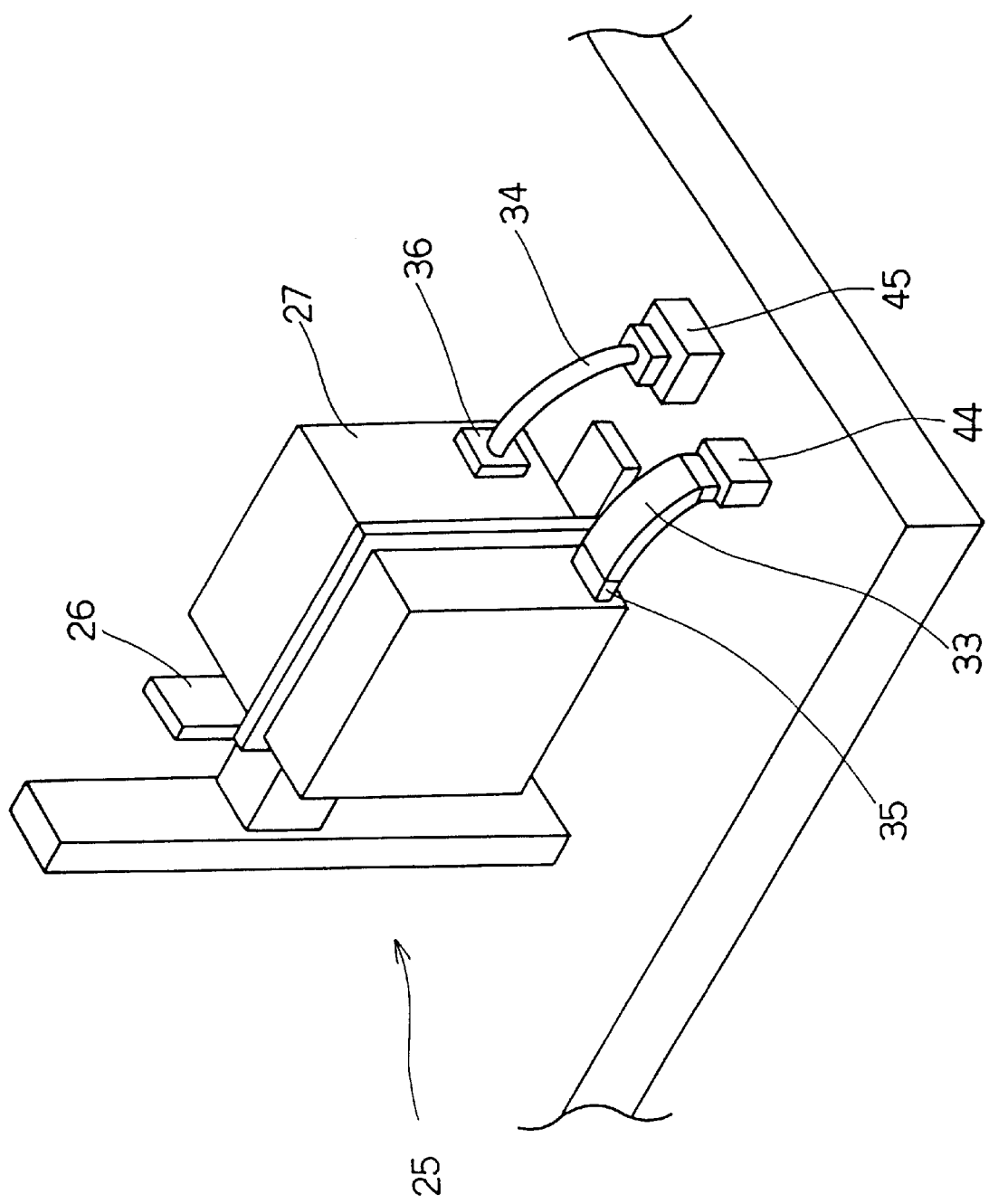
FIG. 18 is a diagram showing the construction for connecting the illumination section and the controller of the projector of the third embodiment.

FIG. 18 shows the construction for connecting the illumination section and the controller. In FIG. 18, the lamp unit holder 25 is illustrated in a simplified form. The lamp unit 27 has a memory inside the box-shaped member. In the memory is stored data similar to that stored in the memory provided within the data holder provided in the illumination section of the second embodiment.

The box-shaped member is provided with terminals 35 for data exchange. The memory provided inside the box-shaped member is connected to the controller provided inside the projector by way of these terminals 35, data lines 33, and terminals 44 for data exchange provided on the part of the projector. The box-shaped member is also provided with terminals 36 for receiving electric power. The lamp unit 27 is connected to a power source (not shown) by way of these terminals 36, power supply lines 34, and terminals 45 for supplying electric power provided on the part of the projector.

In this embodiment, too, it is possible to permit entry of the data related to the lamp by the user as described previously in connection with the first embodiment.

<Fourth Embodiment>

Figure 19:
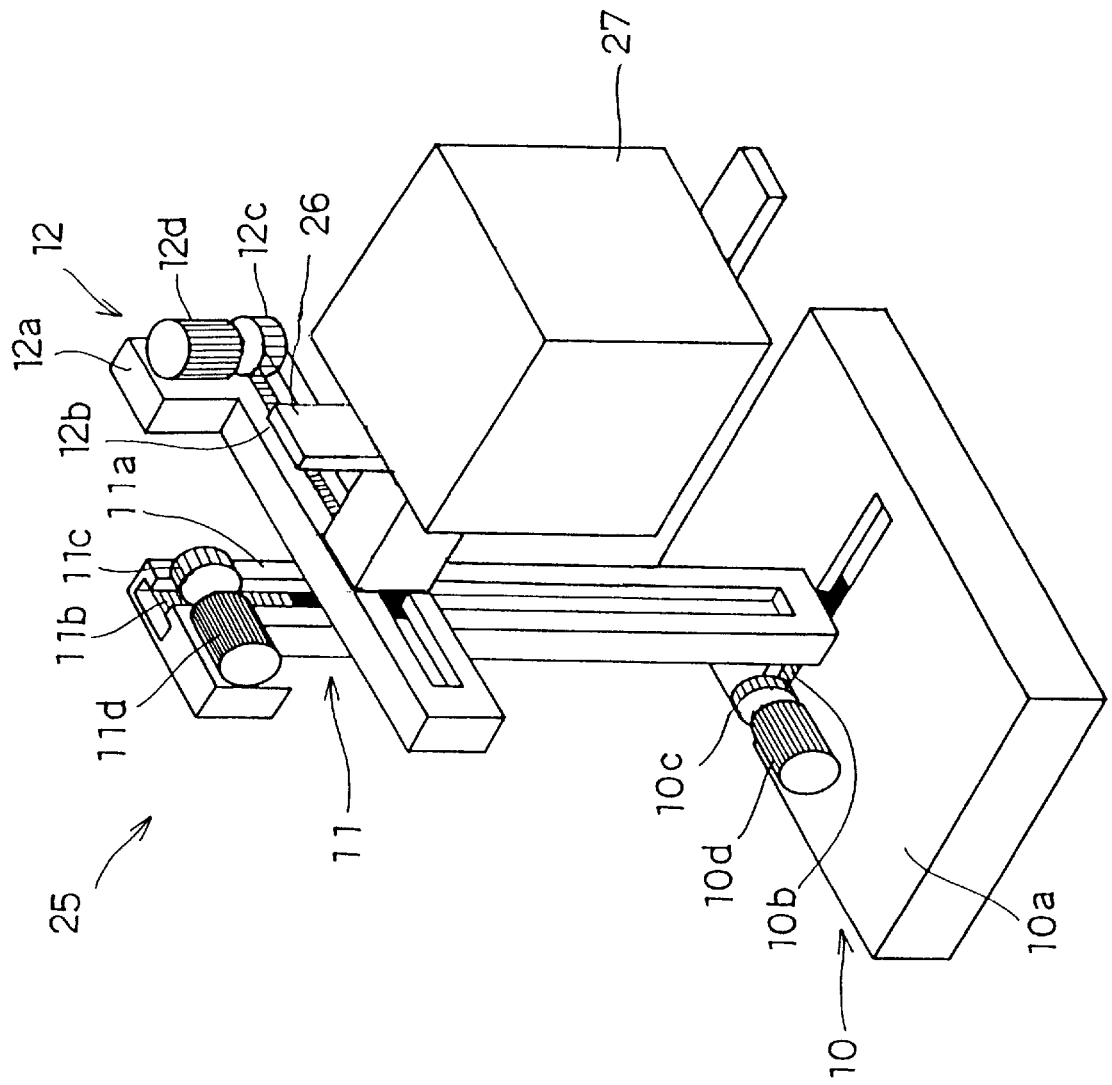
FIG. 19 is a diagram showing the construction of the entire illumination section of a fourth embodiment of the present invention with a lamp unit fitted therein.

FIG. 19 shows the construction of the entire illumination section of a fourth embodiment of the present invention. As compared with the third embodiment, in this embodiment, the lamp unit lacks the stopper and instead has a z-direction adjuster 12. The z-direction adjuster 12 here has the same construction as the z-direction adjuster 12 in the first embodiment shown in FIG. 2. In other respects, the illumination section has the same construction as in the third embodiment, and therefore overlapping descriptions will not be repeated. This construction permits the lamp unit to be moved to the optimum position thereof.

In this embodiment, the data stored in the illumination section or entered by the user includes the data for determining the z-direction movement distance of the lamp unit.

<Fifth Embodiment>

Figure 20:
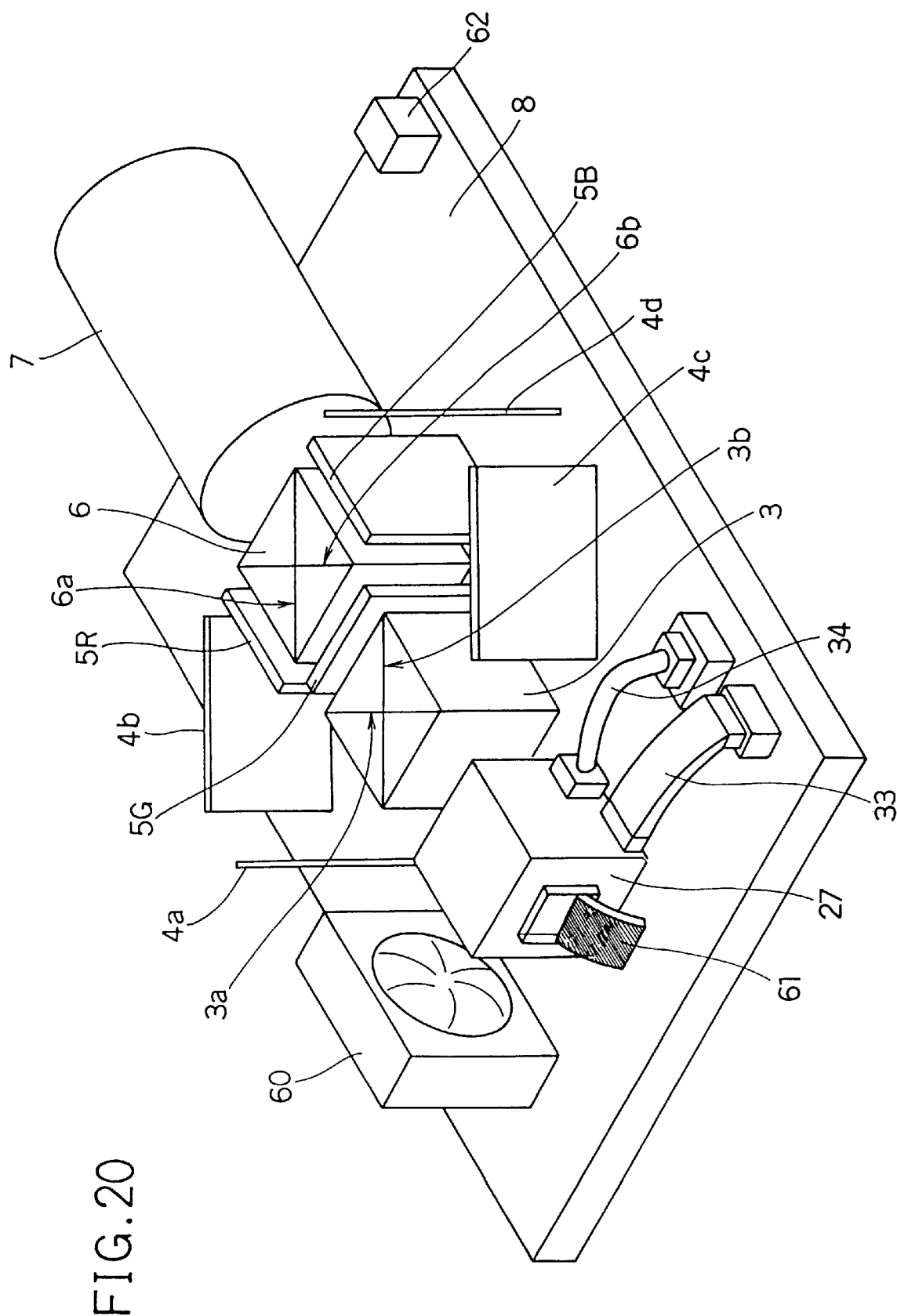
FIG. 20 is a diagram schematically showing the construction of the projector of a fifth embodiment of the present invention.
Figure 21:
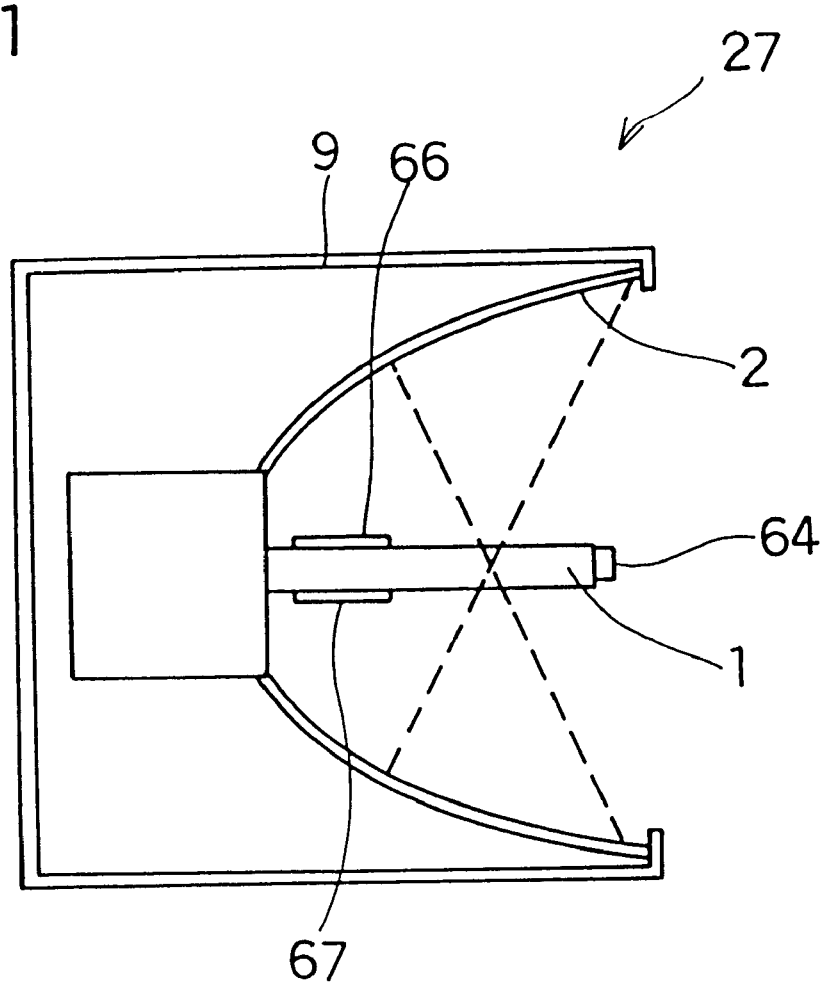
FIG. 21 is a diagram showing a vertical section of the lamp unit of the fifth embodiment.

The projector of a fifth embodiment of the present invention has the same construction as the projectors of the third and fourth embodiments except that the projector is additionally provided with a temperature control mechanism. FIG. 20 schematically shows the construction of the projector of this embodiment. FIG. 21 shows a vertical section of a lamp unit of the projector.

First, the constituent components of the temperature control mechanism will be described with reference to FIGS. 20 and 21. The temperature control mechanism is composed of a fan 60, an atmospheric temperature detector 62, signal transmission lines 61, a heater 67 and a Peltier device 66 for controlling the temperature of the lamp in accordance with a signal transmitted by way of the transmission lines 61, a lamp temperature detecting sensor 64 for detecting the temperature of the lamp, and a controller 50 (FIG. 22) for controlling the fan 60, the heater 67, and the Peltier device 66 on the basis of the detection data obtained from the atmospheric temperature detector 62 and the lamp temperature detecting sensor 64.

The atmospheric temperature detector 62 is provided on the base block 8 so as to detect the temperature of the atmosphere. The fan 60 is provided on the base block 8, near the lamp unit 27, so as to cool the air around the lamp unit 27. The heater 67, the Peltier device 66, and the lamp temperature detecting sensor 64 are so arranged as to be kept in contact with the lamp 1.

Figure 22:
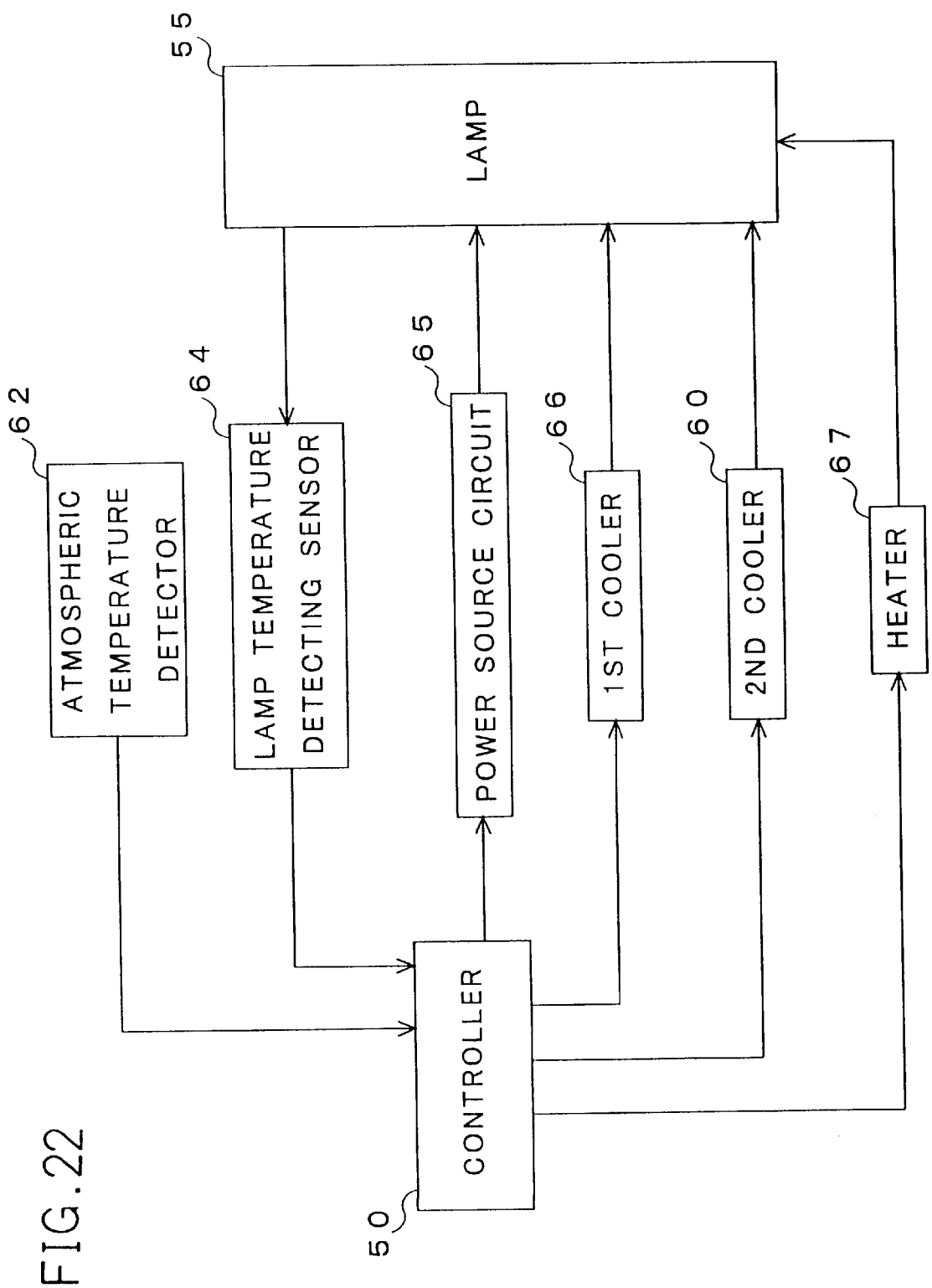
FIG. 22 is a block diagram of a portion related to temperature control of the projector of the fifth embodiment.

FIG. 22 shows, in the form of a block diagram, the configuration of a portion related to temperature control of this embodiment. The controller 50 controls a power source circuit 65 on the basis of the operation of a power switch by the user. The power source circuit 65 includes the first power source 53 and the second power source 54 shown in FIG. 9. Moreover, the controller 50 controls the heater 67 and the Peltier device 66, which are provided inside the lamp unit and of which the latter serves as a first cooler, on the basis of the result of lamp temperature detection fed from the lamp temperature detecting sensor 64. Here, data transmission and control are achieved by way of the signal transmission lines 61. Furthermore, the controller 50 controls the fan 60, which serves as a second cooler, on the basis of the result of atmospheric temperature detection fed from the atmospheric temperature sensor 62.

Figure 54:
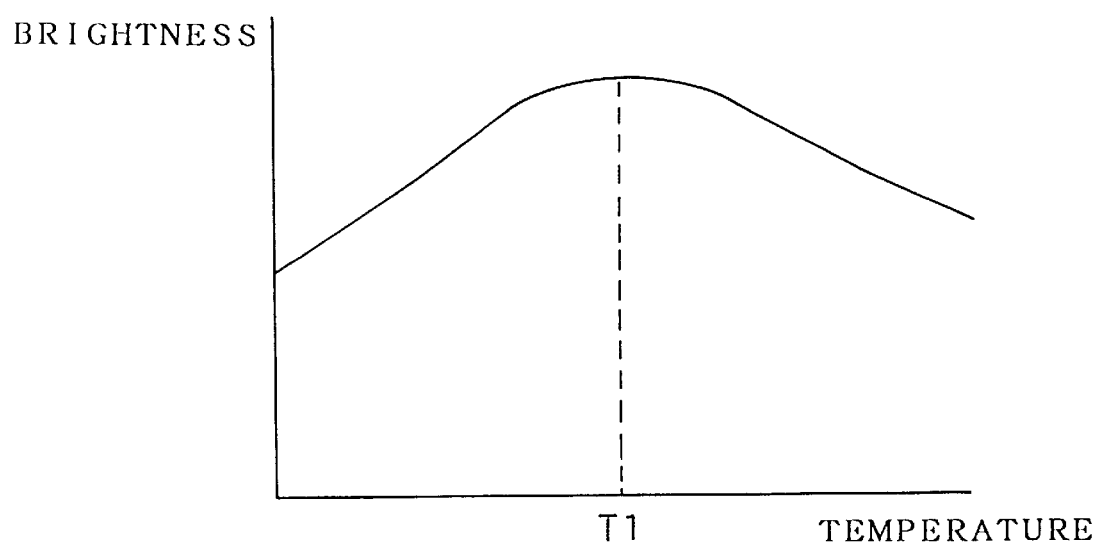
FIG. 54 is a diagram showing a typical relationship between temperature and rightness as observed in a lamp.

Now, how the fan 60 serves to achieve temperature control will be described. Even if there is no variation in the voltage applied to the lamp, the brightness of the lamp varies according to the temperature of the lamp emitting light. FIG. 54 shows a relationship between temperature and brightness as observed when the applied voltage is kept fixed, with temperature taken along the horizontal axis and brightness taken along the vertical axis. As shown in FIG. 54, the lamp is brightest at the optimum temperature T1, and, the larger the deviation from the optimum temperature T1, the lower the brightness of the lamp. Accordingly, to obtain bright illumination efficiently, it is preferable to let the lamp emit light at the optimum temperature T1.

While emitting light, the lamp 55 continues generating heat, and thus the temperature of the lamp rises. In this embodiment, to keep the temperature of the lamp 55 at the optimum temperature, while the lamp 55 is emitting light, the fan 60 is kept operating so as to cool the air around the lamp and thereby indirectly lower the temperature of the lamp that tends to rise.

The degree in which the fan 60 needs to effect cooling to keep the temperature of the lamp close to the optimum temperature T1 varies according to the temperature of the atmosphere. The lower the temperature of the atmosphere, the less the fan 60 needs to effect cooling; the higher the temperature of the atmosphere, the more the fan 60 needs to effect cooling. Accordingly, in this embodiment, the degree of cooling that needs to be effected is determined on the basis of the result of atmospheric temperature detection by the atmospheric temperature sensor 62, and the driving of the fan 60 is so controlled as to achieve the thus determined degree of cooling. Specifically, the rotation rate of the fan 60 is controlled in accordance with the degree of cooling required.

Next, how the Peltier device 66 and the heater 67 serve to achieve temperature control will be described. The projector is provided with a main power source which supplies power to all sections, including the power source circuit 65, that require electricity. The power source circuit 65 for applying the voltage to the lamp 55 is called a subsidiary power source. The user can, by appropriate operation, request to turn on or off the main power source and to turn on or off the subsidiary power source as desired. When turning-on of the subsidiary power source is requested while the main power source is on, the voltage starts being applied and, as soon as the temperature of the lamp 55 reaches the light-emission temperature, an image starts being projected (i.e. the lamp 55 is lit). When the subsidiary power source is turned off while the lamp 55 is being lit, the temperature of the lamp 55 drops below the light-emission temperature, and the lamp 55 is extinguished.

A predetermined period after extinction, when the lamp 55 has been cooled until the temperature has become below a predetermined re-lighting enabling temperature, application of the voltage to the lamp 55 is permitted again. The lamp 55 is so manufactured as to emit light at a predetermined light-emission temperature, but, if application of the voltage is started while the temperature of the lamp is still higher than the re-lighting enabling temperature, the lamp is not lit even when the lamp reaches the light-emission temperature.

If the subsidiary power source is turned on while the temperature of the lamp is higher than the re-lighting enabling temperature, it is not possible to re-light the lamp 55 even though the voltage is applied thereto. Thus, in such a case, control is performed such that the subsidiary power source is turned on after waiting for the lamp 55 to be cooled until the temperature becomes below the re-lighting enabling temperature. In this embodiment, control is performed, by the use of the Peltier device 66 included in the temperature control mechanism, to shorten the above-mentioned predetermined time required after image display is turned off until the lamp 55 is cooled until the temperature becomes below the re-lighting enabling temperature.

Figure 23:
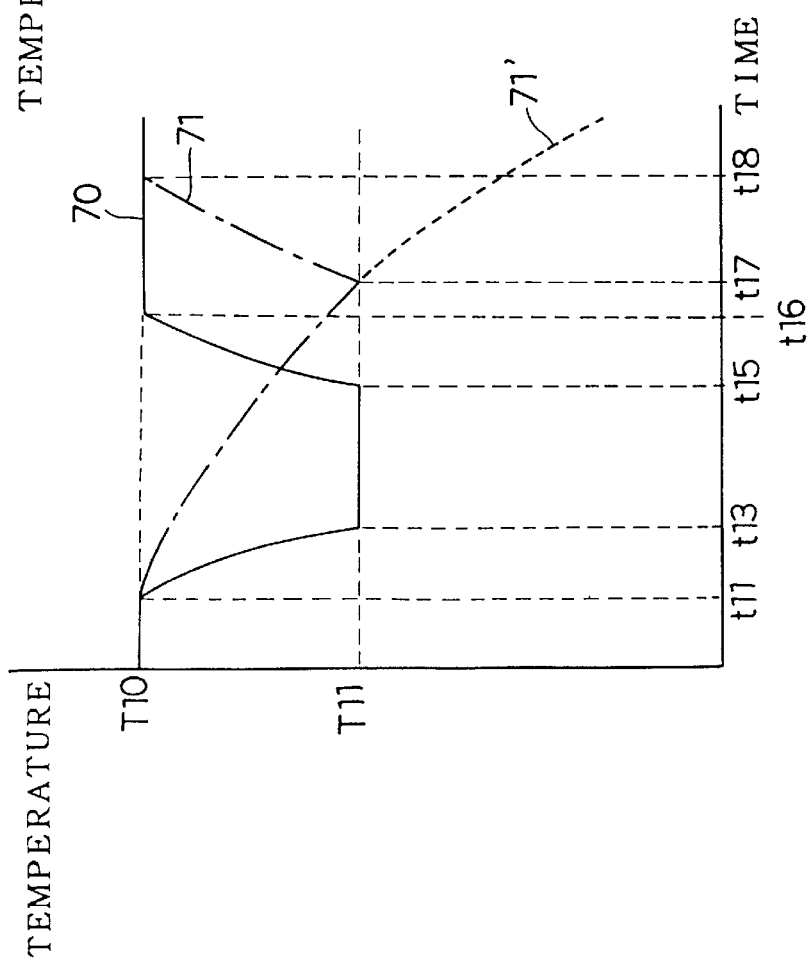
FIG. 23 is a diagram showing how temperature varies with respect to time under the control of the temperature control mechanism.

FIG. 23 shows an example of how the temperature of the lamp 55 varies with respect to time under this control, with time taken along the horizontal axis and temperature taken along the vertical axis. In FIG. 23, an example of temperature variation as observed under the control performed in this embodiment is indicated by a solid line 70, and, for comparison, examples of temperature variation as observed under conventional control are indicated by a dash-and-dot line 71 and a broken line 71'. While image display is on, the lamp 55 is kept at the light-emitting temperature T10. When, at a time t11, the subsidiary power source is turned off, in this embodiment, the lamp is cooled rapidly by the use of the Peltier device 66. As a result of this rapid cooling, the lamp 55 is cooled down to the re-lighting enabling temperature T11 at a time t13. That is, it takes a period of t1–t11 for the lamp to be cooled down to the re-lighting enabling temperature T11.

Furthermore, in this embodiment, control is performed, by the use of the heater 67, to maintain the relighting enabling temperature T11. When the subsidiary power source is turned on at a time t15, the lamp 55 is heated by the use of the heater 67 so as to reach the light-emission temperature T10 faster. At a time t16, the temperature of the lamp 55 reaches the light-emission temperature T10, and thus an image starts being presented for observation by the observers' eyes.

Under conventional control, even when the subsidiary power source is turned off at the time t10, no rapid cooling is performed, and therefore it takes a long time to reach the re-lighting enabling temperature; specifically, the re-lighting enabling temperature is reached as late as at a time t17. Accordingly, even if turning-on of the subsidiary power source is requested at the time t13, which is earlier than the time t17, either the request is neglected, as indicated by a broken line 71', or, after waiting for the re-lighting enabling temperature T11 to be reached at the time t17, the subsidiary power source is turned on to light the lamp, as indicated by a dash-and-dot line 71.

Moreover, under conventional control, lighting of the lamp is controlled without using any means for forcibly heating the lamp, and therefore it takes a long time for the lamp to be heated from the re-lighting enabling temperature T11 to the light-emission temperature T10; specifically, the light-emission temperature T10 is reached as late as at a time t18, when an image starts being presented for observation by the observers' eyes. In this way, even if the subsidiary power source is turned on at the same time t15, it takes a far longer time under conventional control to start presenting an image for observation by the observers' eyes.

Figure 24:
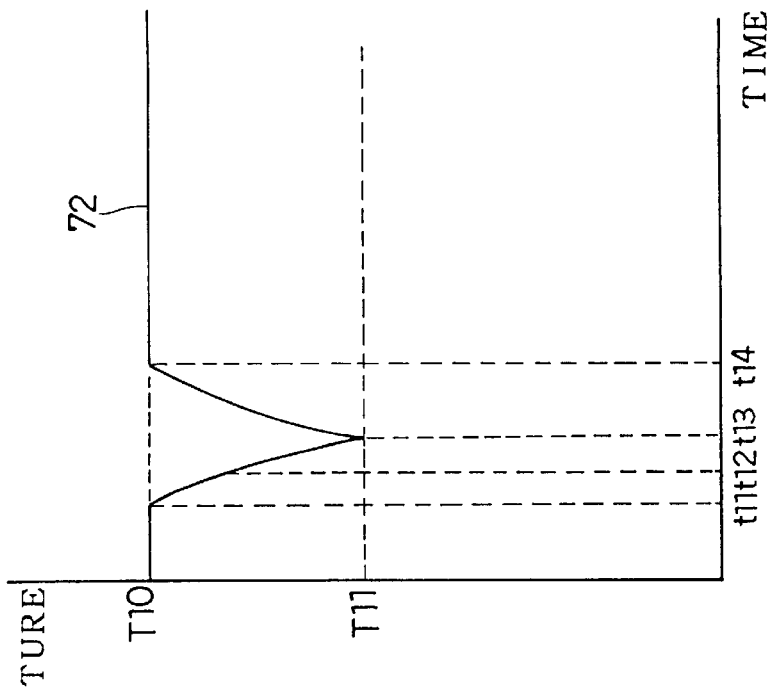
FIG. 24 is a diagram showing how temperature varies with respect to time under the control of the temperature control mechanism, as observed when display of an image is requested at a different time from the case shown in FIG. 23.

How temperature control is achieved in this embodiment will be described further below. In FIG. 24, variation in the temperature of the lamp 55 as observed under the control performed in this embodiment when turning-on of the subsidiary power source is requested before the lamp is cooled down to the re-lighting enabling temperature T11 is indicated by a solid line 72. When turning-off of the subsidiary power source is requested at the time t11, rapid cooling is started. If turning-on of the subsidiary power source is request at a time t12, i.e. immediately after starting rapid cooling, then, after waiting for the re-lighting enabling temperature T11 to be reached at the time t13, control in response to the request is started.

Specifically, the subsidiary power source is turned on to supply the voltage to the lamp 55, and simultaneously heating the lamp 55 by the heater 67 is started. As a result of this control, an image starts being presented for observation by the observers' eyes at a time t14. In this case, it takes a certain stand-by time, after the request to turn the subsidiary power source on, for the lamp to be lit again; however, this stand-by time is far shorter than under conventional control.

Next, how temperature control is achieved by the use of the Peltier device 66 and the heater 67 in a manner different from the manner based on rapid cooling described above. If the temperature of the lamp 55 is lower than the re-lighting enabling temperature when the main power source is turned on, the lamp 55 is preheated by the heater 67 so as to maintain the temperature at the re-lighting enabling temperature T11. As a result of this control, the time that the lamp 55 requires, after the subsidiary power source is turned on, to reach the light-emission temperature T10 is shortened.

Figure 25:
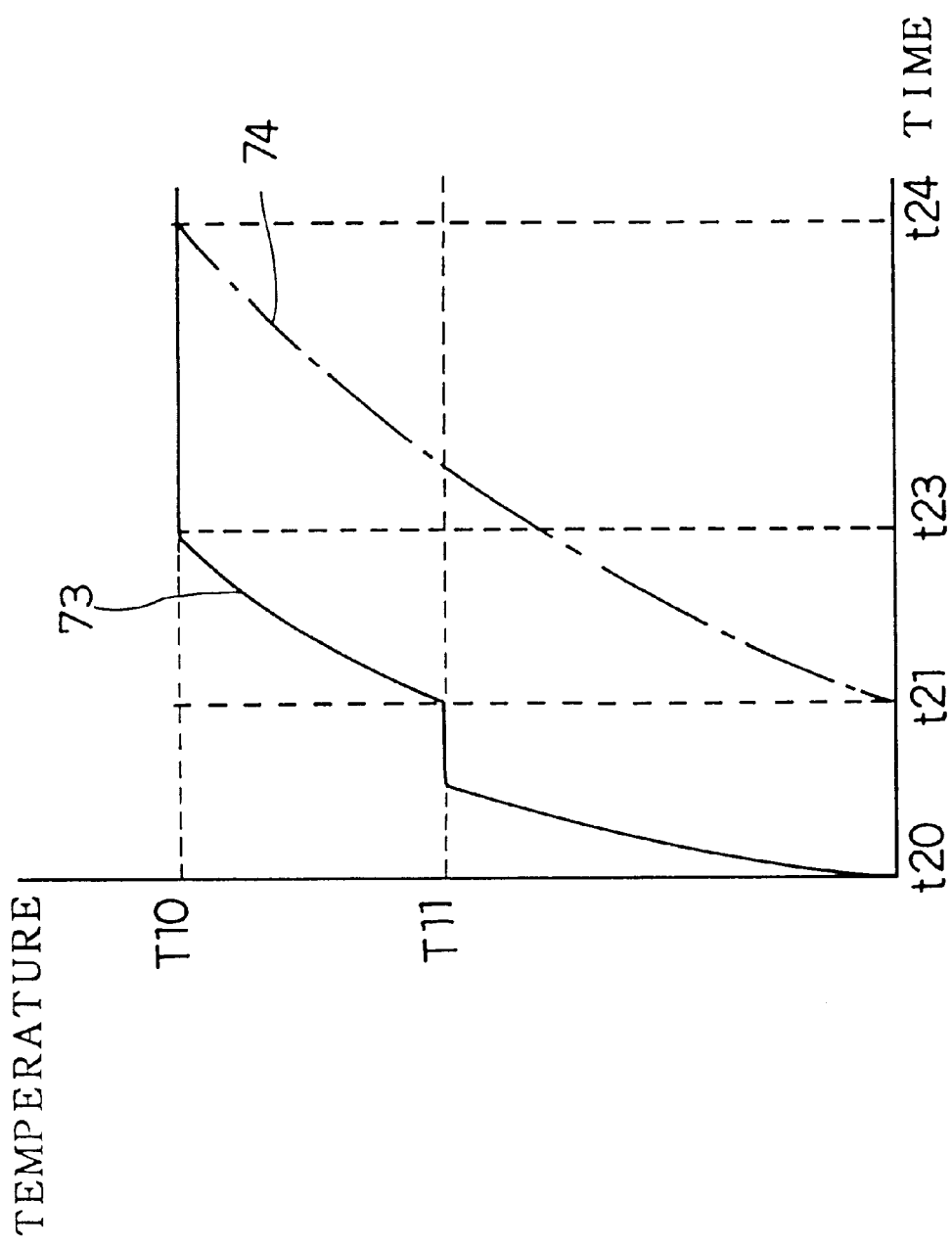
FIG. 25 is a diagram showing how temperature varies under pre-heating control in the projector of the fifth embodiment.

In FIG. 25, an example of how the temperature of the lamp 55 varies with respect to time under this control is indicated by a solid line 73. In FIG. 25, for comparison, an example of how the temperature of the lamp varies under conventional control is indicated by a dash-and-dot line 74. In FIG. 25, time is taken along the horizontal axis and temperature is taken along the vertical axis. The main power source is turned on at a time t20. In this embodiment, simultaneously with this turning-on of the main power source, the lamp 55 starts being preheated so as to maintain the temperature of the lamp at the re-lighting enabling temperature T11.

The subsidiary power source is turned on at a time t21. In this embodiment, simultaneously with this turning-on of the subsidiary power source, the lamp 55 starts being supplied with the voltage, and starts being heated by the heater 67 so as to shorten the time that the lamp 55 requires to reach the light-emission temperature T10. As a result of this control, an image starts being presented for observation at a time t23.

Under conventional control, after the subsidiary power source is turned on at the time t21, the temperature of the lamp reaches the light-emission temperature T10 at a time t24, and an image starts being presented for observation by the observers' eyes. However, raising the temperature of the lamp from an unpreheated state up to the light-emission temperature T11 solely by the applied voltage takes quite a long time. Thus, even if the subsidiary power source is turned on at the same time t21, there arises a great difference in the time required to start projecting an image between under the control performed in this embodiment and under conventional control; specifically, a far shorter time is required in this embodiment.

Figure 26:
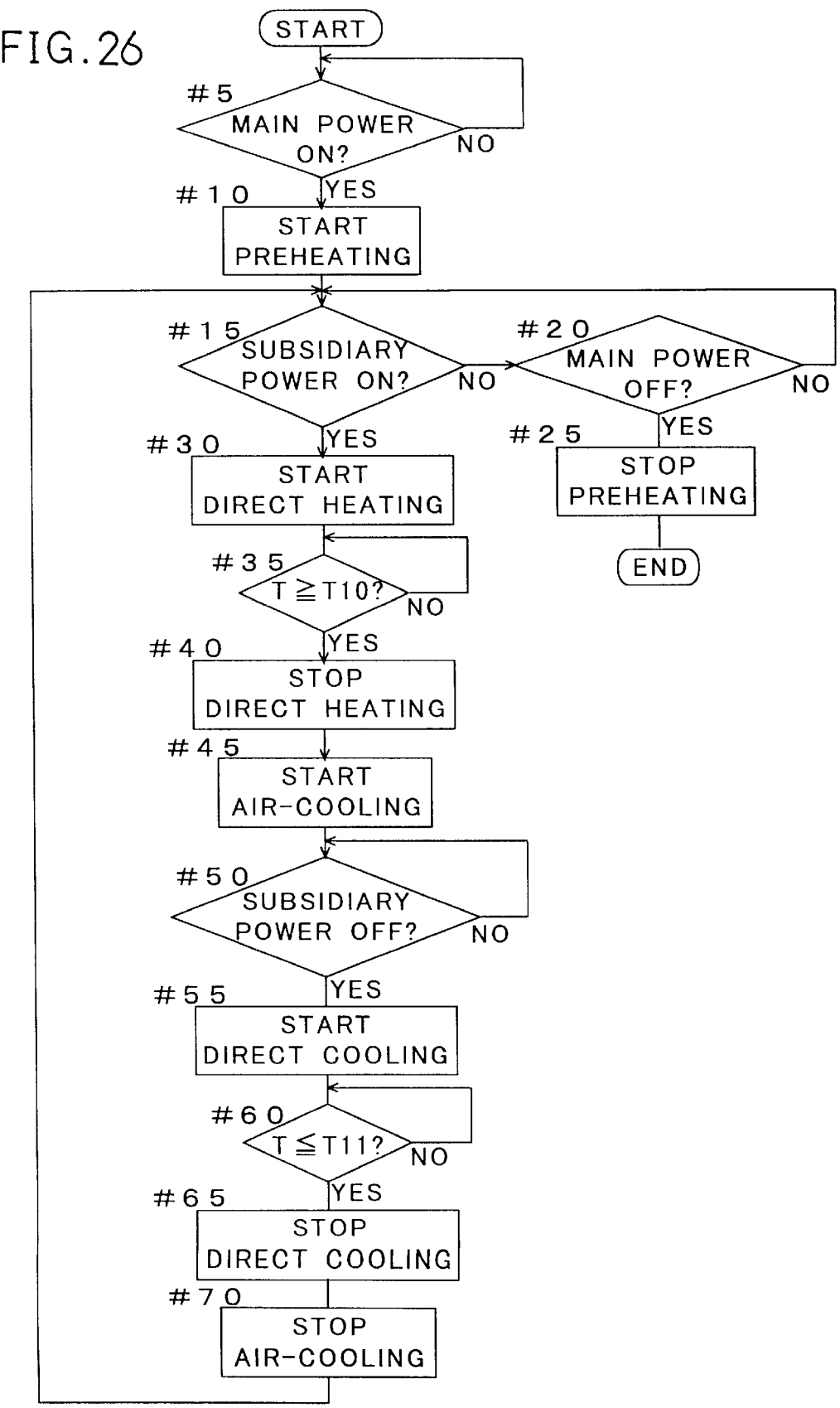
FIG. 26 is a diagram showing the flow of control related to temperature control performed in the projector of the fifth embodiment.

FIG. 26 shows the flow of control related to temperature control performed in this embodiment. When, in step #5, the main power source is turned on, then, in step #10, preheating by the heater 67 is started. Preheating is continued until the temperature T of the lamp 55 reaches the re-lighting enabling temperature T11. In step #15, whether the subsidiary power source is on or not is checked. If the subsidiary power source is off, then, in step #20, whether the main power source is off or not is checked. If the main power source is off, then, in step #25, preheating is stopped and the flow is ended. If the main power source is not off, the flow returns to step #15.

If, in step #15, the subsidiary power source is on, then, in step #30, direct heating of the lamp 55 by the heater 67 is started. Then, in step #35, whether or not the temperature T of the lamp 55 is equal to or higher than the light-emission temperature T10 is checked. When the temperature T becomes equal to or higher than T10, the flow proceeds to step #40, where direct heating of the lamp 55 by the heater 67 is stopped, and then to step #45, where the fan 60 starts being driven to start cooling. When, in step #50, the subsidiary power source is turned off, then, in step #55, direct cooling of the lamp 55 by the Peltier device 66 is started. Then, in step #60, the flow waits for the temperature T of the lamp 55 to become lower than T11. When the temperature T of the lamp 55 becomes lower than T11, the flow proceeds to step #65, where direct cooling is stopped, and then to step #70, where driving of the fan 60 is stopped. Then, the flow returns to step #15.

<Sixth Embodiment>

The projector of a sixth embodiment of the present invention has the same construction as the projector of the first embodiment except that the projector is additionally provided with a brightness adjustment mechanism. The brightness adjustment mechanism permits adjustment of the brightness of the illumination light by which the liquid crystal display panels are illuminated when the projector is in use. When, at the position of the liquid crystal display panels, the region illuminated by the illumination light coincides with the image region of the liquid crystal display panels, it is possible to make the most efficient use of light, and achieve uniform illumination with the highest brightness.

If the region illuminated by the illumination light is larger than the image region of the liquid crystal display panels, part of the illumination light does not strike the liquid crystal display panels and is thus discarded, making the brightness of illumination lower than when the whole of the illumination light strikes the liquid crystal display panels. The larger the region illuminated by the illumination light but lying outside the image region of the liquid crystal display panels, the lower the brightness of illumination. In this embodiment, the brightness adjustment mechanism, by controlling the position of the lamp, adjusts the region illuminated by the illumination light at the position of the liquid crystal display panels and thereby adjusts the brightness of illumination. The brightness adjustment mechanism first detects the brightness of illumination on the liquid crystal display panels, and, on the basis of the result of this detection, adjusts the brightness of illumination.

In this projector, immediately after the lamp is fitted, the position of the lamp is controlled so that the lamp will be located in a position in which, calculation at the time of design predicts, the most efficient use of the light emitted therefrom is possible. However, individual lamps have varying characteristics, and therefore the position that is calculated to be the optimum position at the time of design does not always the position in which the most efficient use of light is possible with every lamp. Moreover, there is a possibility that the position of the lamp will deviate. According to the brightness adjustment performed in this embodiment, the brightness of illumination on the liquid crystal display panels is detected, and, on the basis of the result of this detection, the position of the lamp is controlled so that illumination will be achieved with the highest brightness.

Moreover, according to this brightness adjustment, the brightness of illumination is detected, and, if the brightness is higher than a predetermined level, the brightness of illumination is lowered. This control is effective in a case where the lamp fitted emits too much light and thus the illumination light is too bright.

Figure 27A:
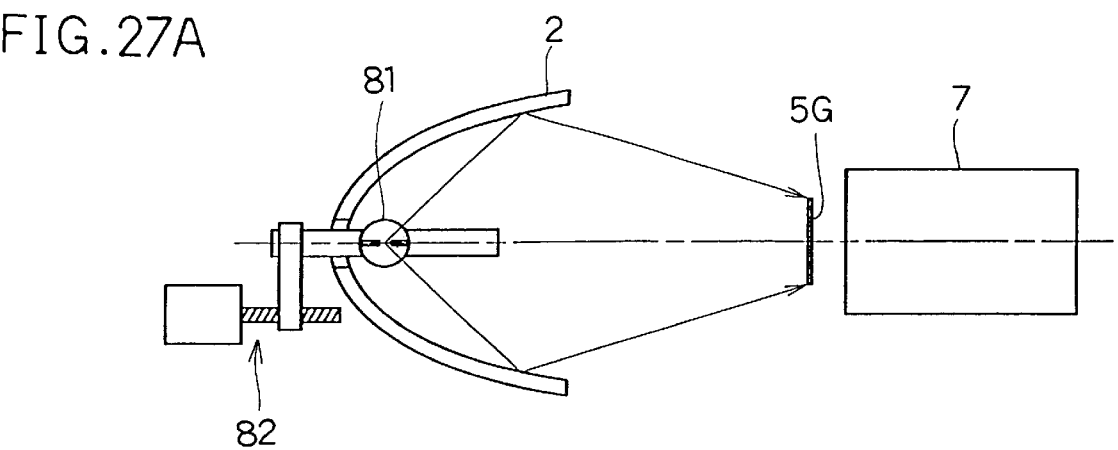
FIGS. 27A and 27B are diagrams schematically showing how the illuminated region varies according to the position of the lamp in the projector of a sixth embodiment of the present invention.
Figure 27B:
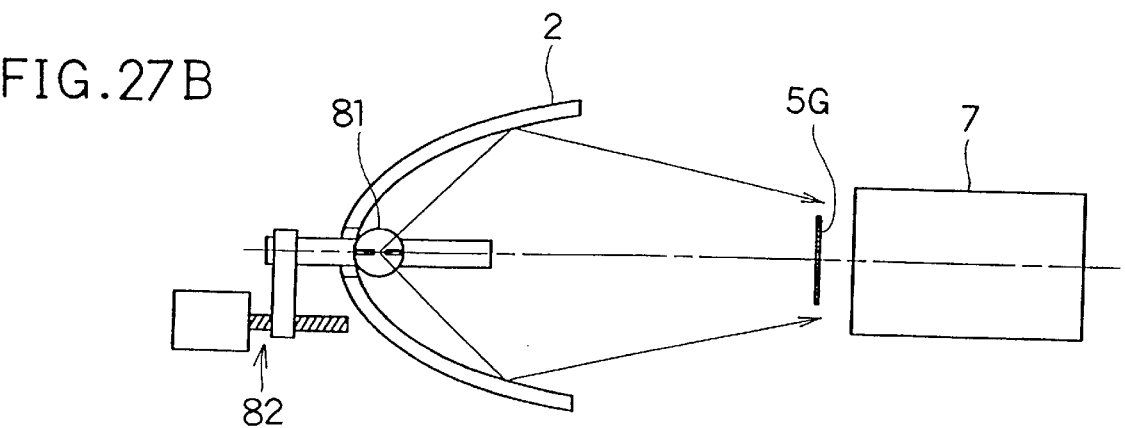

FIGS. 27A and 27B show, in the form of sectional views, how the liquid crystal display panels are illuminated by the light emitted from the lamp in this projector. FIG. 27A shows a state in which the region illuminated by the light coincides with the image region of the liquid crystal display panel 5G, i.e. the state in which the brightness of illumination is highest, and FIG. 27B shows a state in which the region illuminated by the light is larger than the image region of the liquid crystal display panel 5G, i.e. a state in which the brightness of illumination is lower than in the state shown in FIG. 27A. Note that this projector is provided with three liquid crystal display panels that are so arranged as to have equal regions illuminated by the illumination light at their respective positions, and therefore only the liquid crystal display panel 5G is shown in FIGS. 27A and 27B.

For the same reason, detection of the brightness of illumination on the liquid crystal display panels is achieved by providing a detector (not shown) that detects the brightness only on the liquid crystal display panel 5G. The detector is composed of, for example, a light amount sensor arranged near the periphery of the liquid crystal display panel 5G. The lamp 81 can be moved in the z-direction by a z-direction adjuster 82, which has, for example, the same construction as the z-direction adjuster 12 shown in FIG. 2.

To obtain the brightest illumination at all times, the lamp 81 is moved in the z-direction by the z-direction adjuster 82 to the position where the detection result obtained from the sensor indicates the highest brightness. For example, when the lamp 81 is in the state shown in FIG. 27B, the lamp is moved forward along the optical axis to the position where the lamp is in the state shown in FIG. 27A.

To adjust the brightness of illumination so that the brightness will not exceed an upper limit, when the detection result obtained from the sensor indicates brightness higher than the upper limit, the lamp 81 is moved in the z-direction to adjust the amount of light discarded so that the brightness will be lowered to the upper limit or below. For example, when the lamp 81 is in the state shown in FIG. 27A and the brightness is above the upper limit, the lamp 81 is moved backward along the optical axis to a position where the illumination light offers appropriate brightness.

Figure 28A:
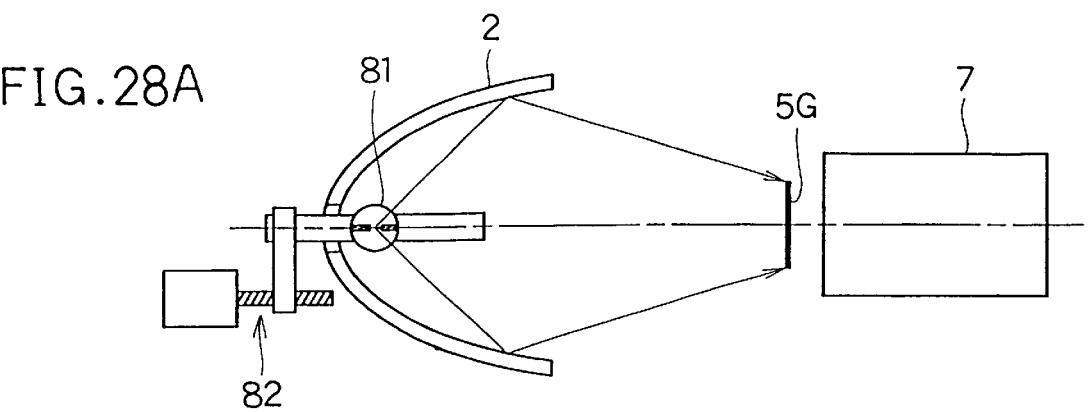
FIGS. 28A and 28B are diagrams schematically showing how the position of the lamp where the optimum brightness is obtained varies according to the type of the lamp in the projector of the sixth embodiment.
Figure 28B:
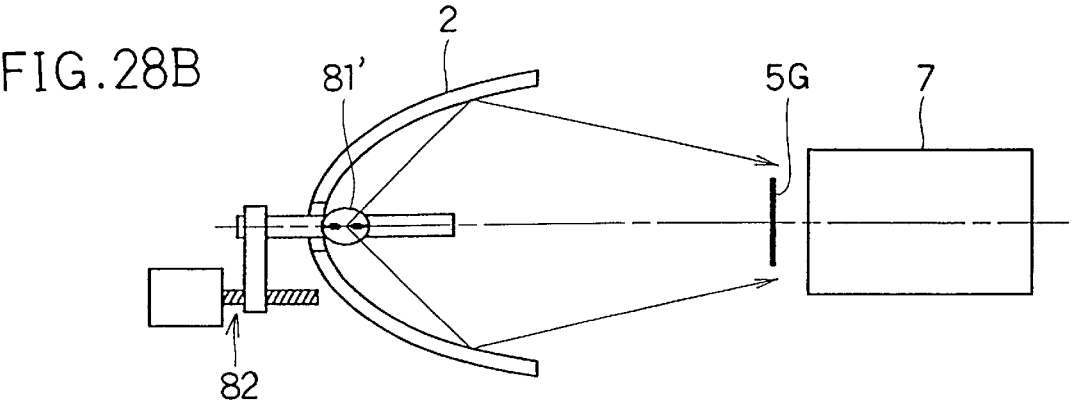

The control described above is effective when the lamp is interchanged with a lamp that emits a different amount of light. FIGS. 28A and 28B show sections of the projector with lamps of different types attached thereto. For example, suppose that, when the lamp 81 is attached, the brightest illumination is obtained in the state shown in FIG. 28A, but that, when the lamp 81 is interchanged with another lamp 81', which emits a larger amount of light, the brightness exceeds the upper limit in the state in which the brightest illumination is obtained. In this case, as shown in FIG. 28B, the lamp 81' is moved backward along the optical axis to adjust the state of illumination on the basis of the detection result obtained from the sensor.

What control to perform on the basis of the detection result of the sensor may be specified by the user, or may be set beforehand at the time of manufacture.

<Seventh Embodiment>

The projector of a seventh embodiment of the present invention has, as a brightness adjustment mechanism, a reflector position adjustment mechanism for adjusting the z-direction position of the reflector 83, instead of the z-direction adjuster 82 for adjusting the position of the lamp employed in the sixth embodiment. FIGS. 29A, 29B, 30A, and 30B are diagrams of the seventh embodiment corresponding to FIGS. 27A, 27B, 28A, and 28B respectively of the sixth embodiment. The reflector position adjusting mechanism 84 is composed of a drive shaft 84a inserted into a hole provided in the reflector 83 so as to be kept in contact therewith and a motor 84b for feeding a rotational force to the drive shaft 84a. The hole provided in the reflector 83 and the drive shaft 84 have screw threads formed thereon in such a way as to mesh with each other. Thus, as the drive shaft 84a rotates, the reflector 83 moves along the optical axis.

Figure 29A:
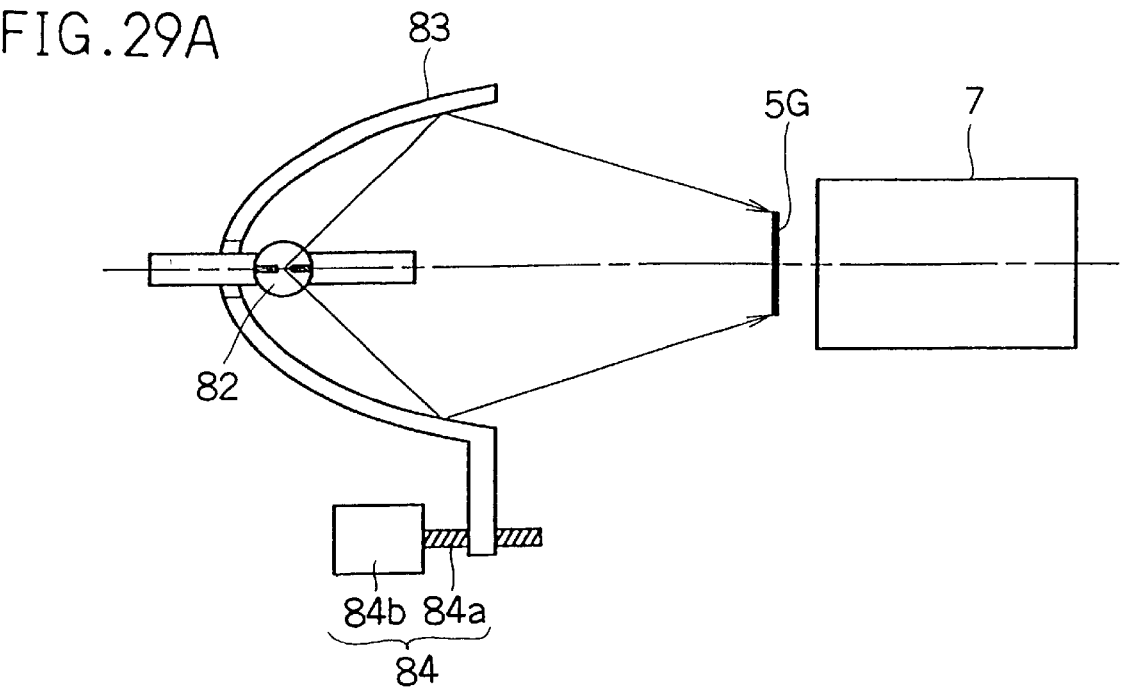
FIGS. 29A and 29B are diagrams schematically showing how the illuminated region varies according to the position of the reflector in the projector of a seventh embodiment of the present invention.
Figure 29B:
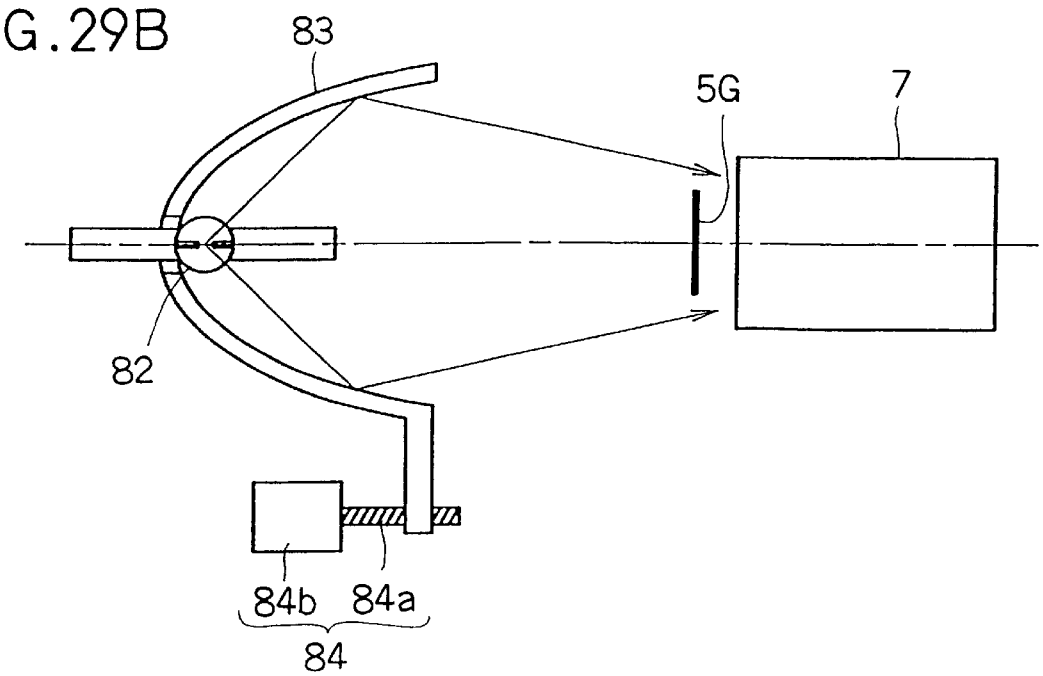

FIGS. 29A and 29B show how the state of illumination varies according to the position of the reflector 83. FIG. 29A shows the state in which the brightness of illumination is highest, and FIG. 29B shows a state in which, because of part of the illumination light is discarded, the brightness of illumination is lower than in the state shown in FIG. 29A.

Figure 30A:
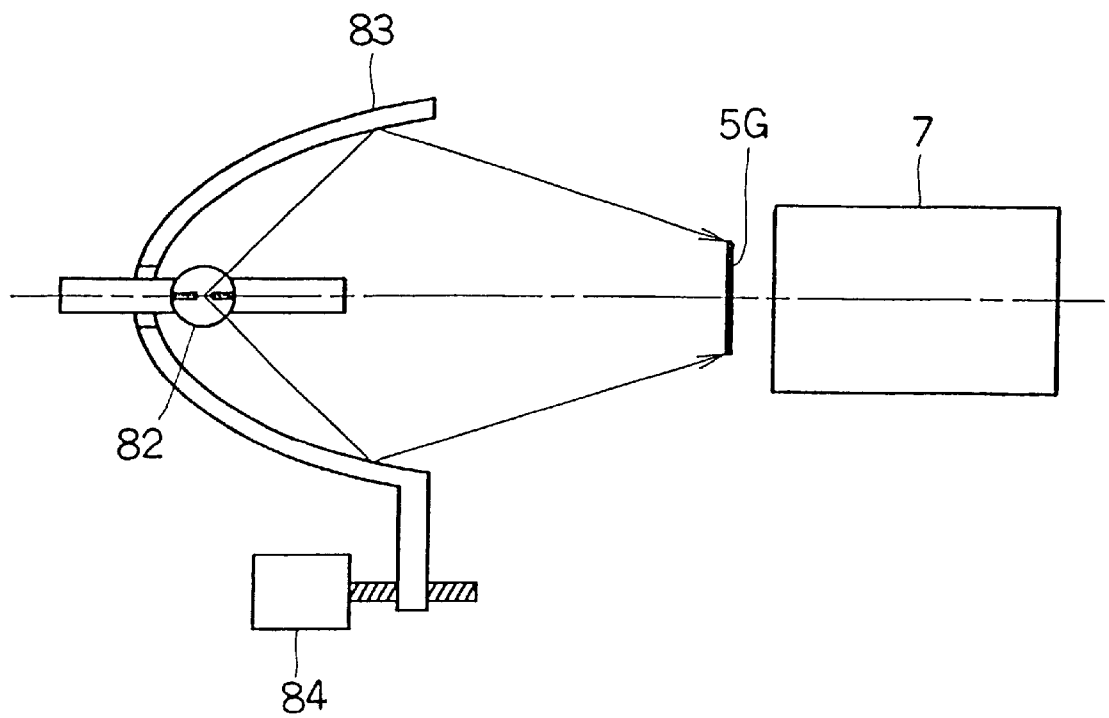
FIGS. 30A and 30B are diagrams schematically showing how the position of the reflector where the optimum brightness is obtained varies according to the type of the lamp in the projector of the seventh embodiment.
Figure 30B:
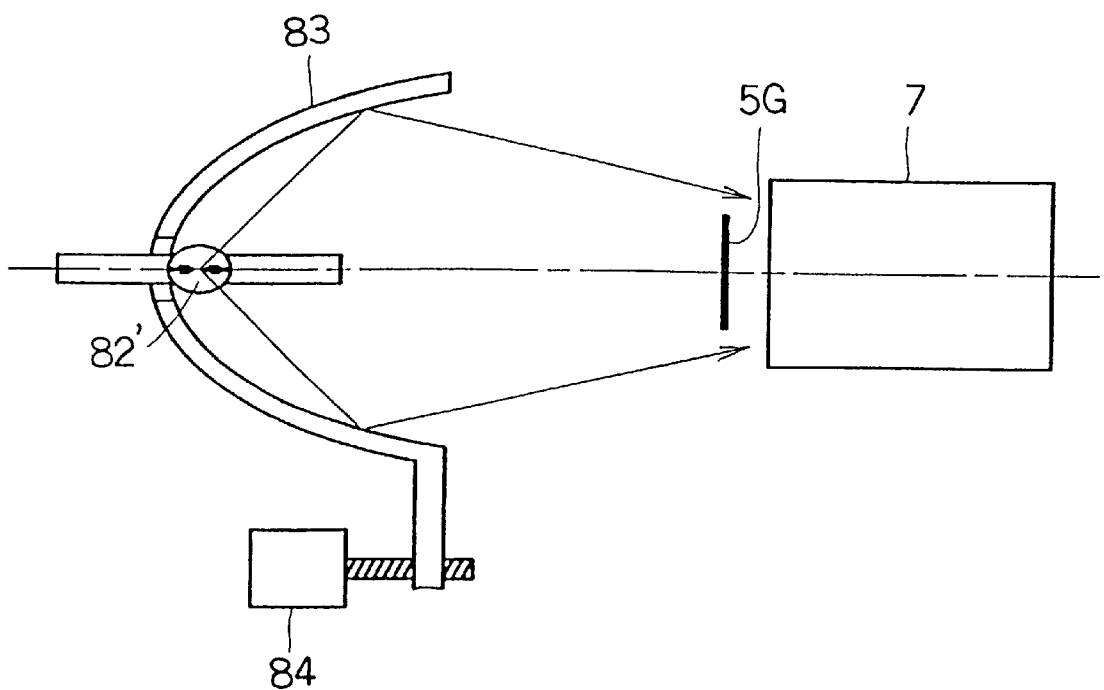

FIGS. 30A and 30B show how the state of illumination varies as the position of the reflector 83 is controlled in accordance with the type of the lamp. FIG. 30A shows how illumination is achieved by the lamp 82, and FIG. 30B shows how illumination is achieved by the lamp 82'. The only difference between this embodiment and the sixth embodiment is the member that is used to adjust the brightness on the basis of the detection result of the sensor. In other respects, this embodiment is the same as the sixth embodiment, and therefore overlapping descriptions will not be repeated.

In the sixth and seventh embodiments described above, a member for adjusting the position of the lamp or the reflector is provided as a brightness adjustment mechanism. However, it is also possible to realize a brightness adjustment mechanism by the use of another member. Hereinafter, the constructions of projectors provided with a brightness adjustment mechanism of a type different from that of the sixth or seventh embodiment will be described.

<Eighth Embodiment>

Figure 51:
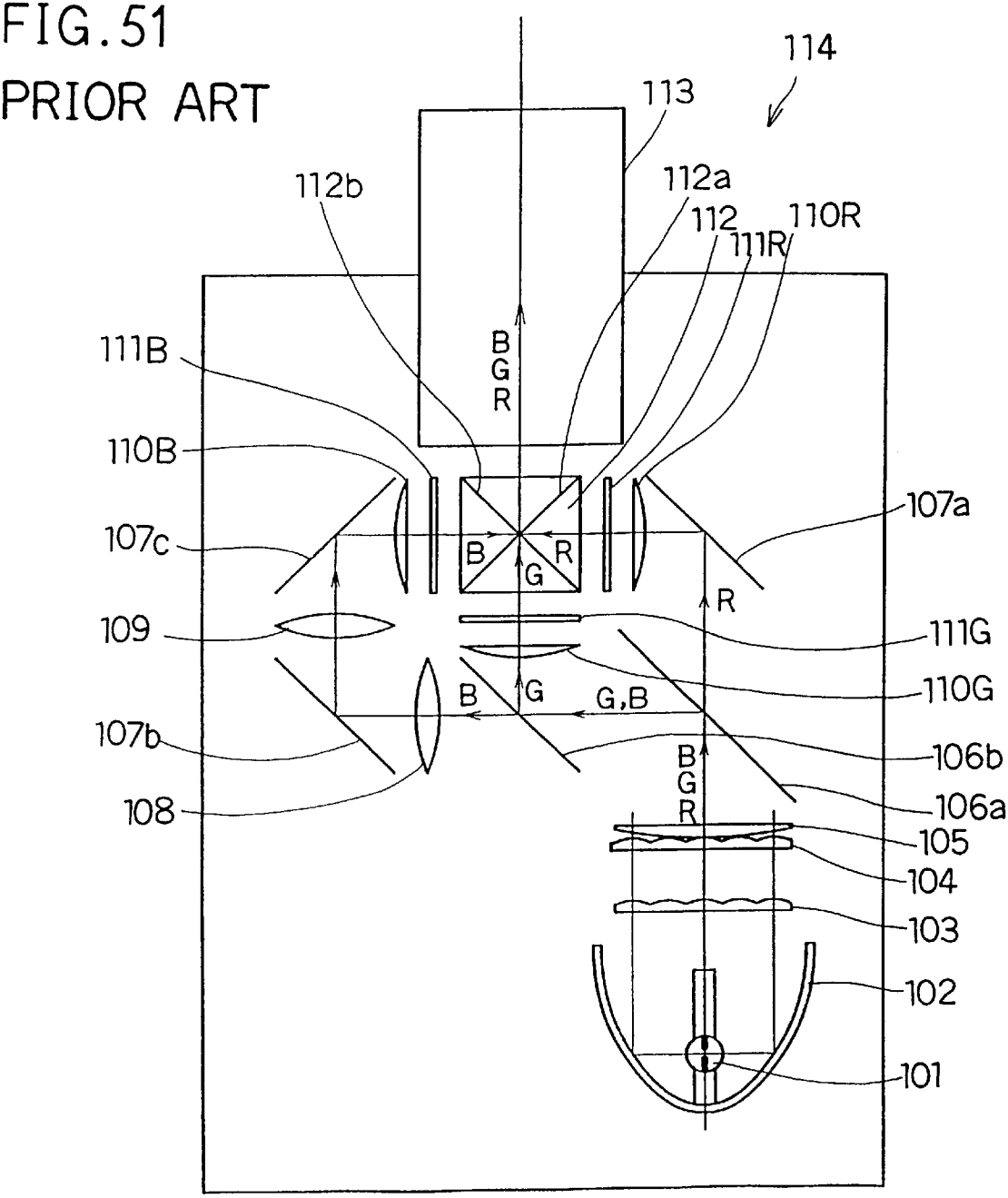
FIG. 51 is a diagram schematically showing the construction of a conventional projector.
Figure 52:
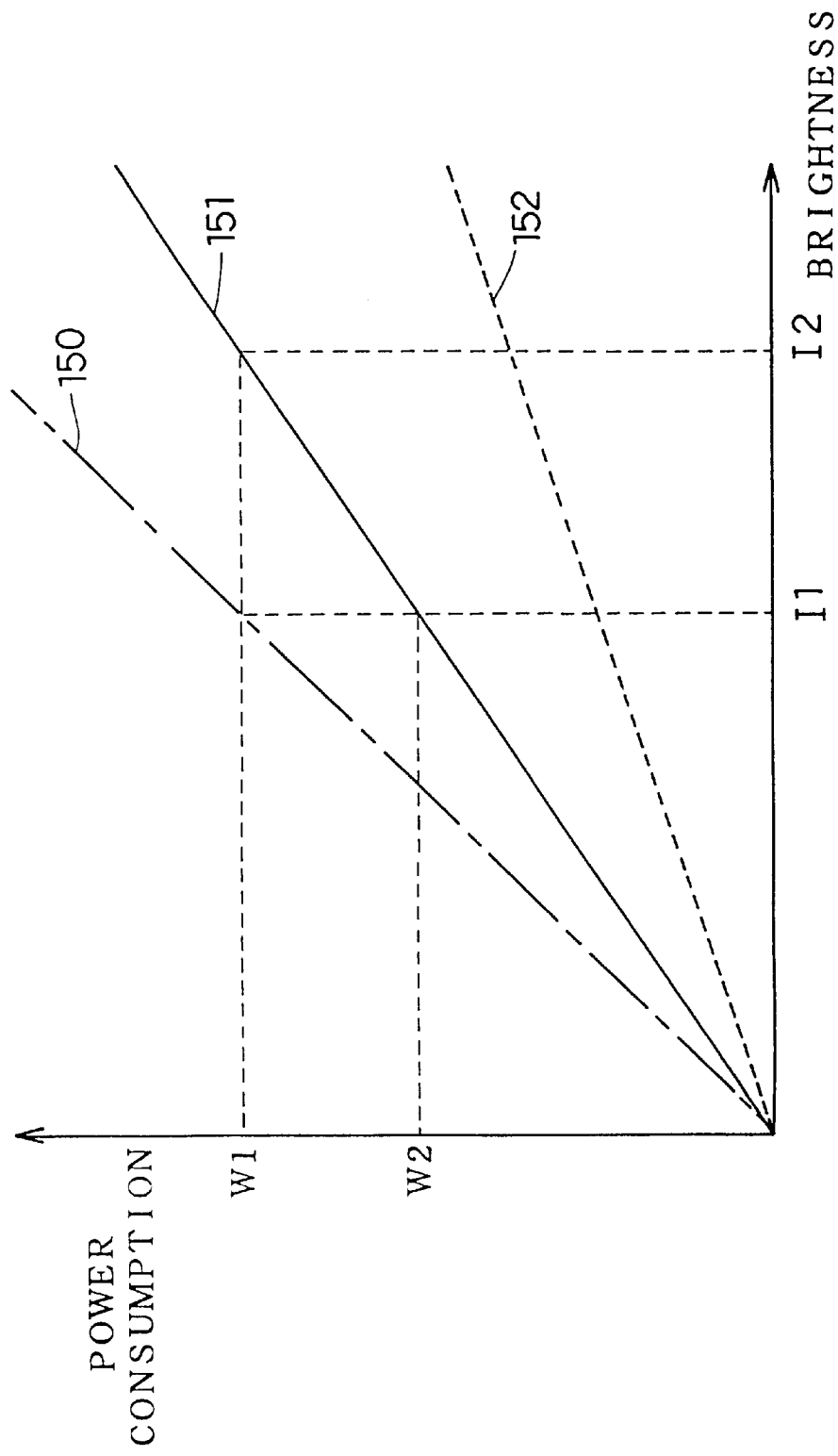
FIG. 52 is a diagram showing the relationship between brightness and electric power consumption for different types of lamp.

FIG. 31A schematically shows the construction of the projector of an eighth embodiment of the present invention. The projector of this embodiment has the same construction as the conventional projector shown in FIG. 51 except that the projector is additionally provided with a brightness adjustment mechanism. Such components as are found also in the conventional projector are identified with the same reference numerals and symbols, and overlapping descriptions will not be repeated.

The brightness adjustment mechanism is composed of a first lens array moving member 90 for moving the first lens array 103 along the optical axis. The moving member 90 is composed of a drive shaft 90a inserted into a hole provided in the first lens array 103 so as to be kept in contact therewith and a motor 90b for feeding a rotational force to the drive shaft 90a. The hole provided in the first lens array 103 and the drive shaft 90a have screw threads formed thereon so as to mesh with each other. Thus, as the drive shaft 90a rotates, the first lens array 103 moves along the optical axis. The moving member go permits the first lens array 103 to move along the optical axis, for example from the state A indicated by solid lines to the state B indicated by broken lines.

FIG. 31B shows how the state of illumination varies according to the position of the first lens array 103. When the first lens array 103 is in the state A or in the state B with respect to the liquid crystal display panels 111R, 111G, and 111B, the region illuminated by the illumination light is as indicated by reference numeral 92a or 92b respectively. That is, in the state A, the region illuminated by the illumination light is smaller, and thus brighter illumination is obtained.

The brightness adjustment mechanism controls the brightness in the same manner as in the sixth and seventh embodiments, and therefore overlapping descriptions will not be repeated.

<Ninth Embodiment>

FIG. 32A schematically shows the construction of the projector of a ninth embodiment of the present invention. The projector of this embodiment has, as a brightness adjustment mechanism, a second lens array moving member 91 for moving the second lens array 104 along the optical axis, instead of the first lens array moving member 90 employed in the eighth embodiment. The moving member 91 is composed of a drive shaft 91a inserted into a hole provided in the second lens array 104 and a motor 91b, and has a construction similar to that of the moving member 90. The moving member 91 permits the second lens array 104 to move along the optical axis, for example from the state A indicated by solid lines to the state B indicated by broken lines.

FIG. 32B shows how the state of illumination varies according to the position of the second lens array 104. When the second lens array 104 is in the state A or in the state B with respect to the liquid crystal display panels 111R, 111G, and 111B, the region illuminated by the illumination light is as indicated by reference numeral 93a or 93b respectively. That is, in the state A, the region illuminated by the illumination light is smaller, and thus brighter illumination is obtained.

The brightness adjustment mechanism of the eighth and ninth embodiments described above can be applied also to projectors having a illumination section of a different construction. For example, the illumination section may be of a type that allows the use of interchangeable lenses as in the first to fourth embodiments. A projector that is different from the projector of the ninth embodiment only in the construction of the illumination section will be described below as a tenth embodiment.

<Tenth Embodiment>

FIG. 33A schematically shows the construction of the projector of a tenth embodiment of the present invention. In the projector of this embodiment, the illumination section is composed of a reflector 115 formed as a reflecting mirror having the shape of a paraboloid and a lamp 116 of a type different from the lamp 101. The moving member 91 permits the second lens array 104 to move along the optical axis, for example from the state A indicated by solid lines to the state B indicated by broken lines.

FIG. 33B shows how the state of illumination varies according to the position of the second lens array 104. When the second lens array 104 is in the state A or in the state B with respect to the liquid crystal display panels 111R, 111G, and 111B, the region illuminated by the illumination light is as indicated by reference numeral 94a or 94b respectively. That is, in the state A, the region illuminated by the illumination light is smaller, and thus brighter illumination is obtained.

<Eleventh Embodiment>

FIG. 34A schematically shows the construction of the projector of an eleventh embodiment of the present invention. In the projector of this embodiment, the light emitted from the illumination section having a lamp 117 and a reflector 118 formed as a reflecting mirror having the shape of an ellipsoid of revolution is directed through a kaleidoscope 119, a relay lens 121, and a field lens 122 to a liquid crystal display panel 123. The light from the illumination section is first focused on the incident surface of the kaleidoscope 119, and is then reflected as many times as corresponds to the angle of incidence inside the kaleidoscope 119 so as to be separated into a plurality of light beams, which then exit from the kaleidoscope 119. The separated light beams are superimposed on one another by the relay lens 121 on the liquid crystal display panel 123 so as to be converted into an optical image, and is then projected through a projection lens 124 on a projection screen (not shown). The kaleidoscope 119 is held by a holding member 120.

In this projector, the brightness adjustment mechanism is composed of a moving member 125 that moves the holding member 120 of the kaleidoscope 119 along the optical axis and thereby indirectly moves the kaleidoscope 119 along the optical axis. The moving member 125 is composed of a drive shaft 125a inserted into a hole provided in the holding member 120 and a motor 125b, and has a construction similar to that of the moving member 90 of the eighth embodiment. The moving member 125 permits the holding member 120 and the kaleidoscope 119 to move along the optical axis, for example from the state A indicated by solid lines to the state B indicated by broken lines.

FIG. 34B shows how the state of illumination varies according to the position of the kaleidoscope 119. When the kaleidoscope 119 is in the state A or in the state B with respect to the liquid crystal display panel 123, the region illuminated by the illumination light is as indicated by reference numeral 126a or 126b respectively. That is, in the state A, the region illuminated by the illumination light is smaller, and thus brighter illumination is obtained. The brightness adjustment mechanism controls the brightness in the same manner as in the sixth and seventh embodiments, and therefore overlapping descriptions will not be repeated.

<Twelfth Embodiment>

FIG. 35A schematically shows the construction of the projector of a twelfth embodiment of the present invention. The projector of this embodiment has, as a brightness adjustment mechanism, a moving member 128 for moving a holding member 127 of the relay lens 121 along the optical axis, instead of the moving member 125 for moving the holding member 120 of the kaleidoscope of the eleventh embodiment. The moving member 128 is composed of a drive shaft 128a inserted into a hole provided in the holding member 127 and a motor 128b, and has a construction similar to the moving member 90 of the eighth embodiment. The moving member 128 permits the holding member 127 and the relay lens 121 to move along the optical axis, for example, from the state A indicated by solid lines to the state indicated by broken lines.

FIG. 35B shows how the state of illumination varies according to the position of the relay lens 121. When the relay lens 121 is in the state A or in the state B with respect to the liquid crystal display panel 123, the region illuminated by the illumination light is as indicated by reference numeral 129a or 129b respectively. That is, in the state A, the region illuminated by the illumination light is smaller, and thus brighter illumination is obtained. The brightness adjustment mechanism controls the brightness in the same manner as in the sixth and seventh embodiments, and therefore overlapping descriptions will not be repeated.

In the projectors of the sixth to twelfth embodiments, the brightness adjustment mechanism does not control the brightness of illumination light individually on the three liquid crystal display panels. In a case where the light from a light source is separated into light of R-, G-, and B-color wavelength ranges so as to illuminate liquid crystal display panels with light of separate wavelength ranges, a common light source exhibits different brightness for light of different wavelength ranges. Usually, the highest brightness is obtained with light of the R-color wavelength range. Hereinafter, projectors provided with a brightness adjustment mechanism having a function of correcting differences in brightness among light of different wavelength ranges will be described as thirteenth and fourteenth embodiments.

<Thirteenth Embodiment>

Figure 36:
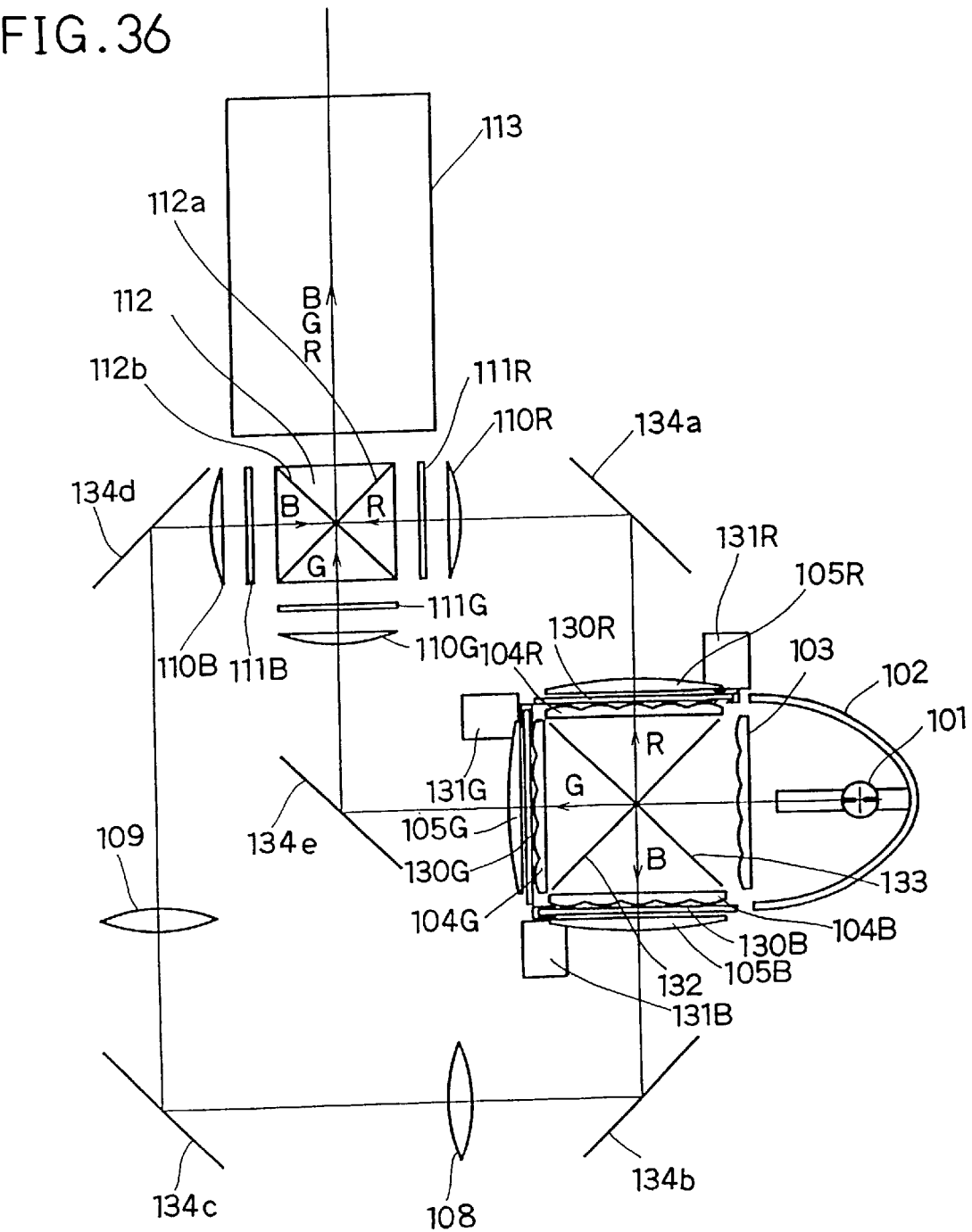
FIG. 36 is a diagram schematically showing, in a sectional view, the construction of the projector of a thirteenth embodiment of the present invention.

FIG. 36 schematically shows the construction of the projector of a thirteenth embodiment of the present invention. Such components as are found also in the projector of the eighth embodiment shown in FIG. 31A are identified with the same reference numerals and symbols, and overlapping descriptions will not be repeated. The projector of this embodiment is different from that of the eighth embodiment in that the light from the light source is, after exiting the first lens array 103, separated into light of wavelength ranges of three colors, i.e. red (R), green (G), and blue (B) and correspondingly a plurality of second lens arrays and condenser lenses are provided to cope with light of those separate wavelength ranges individually, and in addition in that the brightness adjustment mechanism has a different construction.

A light separator is composed of a dichroic mirror 132 that reflects only light of the B-color wavelength range and a dichroic mirror 133 that reflects only light of the R-color wavelength range arranged perpendicularly to each other. The brightness adjustment mechanism is composed of aperture diaphragms 130R, 130G, and 130B provided so as to cope with light of three colors individually, and motors 131R, 131G, and 131B for adjusting the aperture of those aperture diaphragms individually. The aperture diaphragms 130R, 130G, and 130B are provided respectively between second lens arrays 104R, 104G, and 104B and integrating lenses 105R, 105G, and 105B that are provided so as to cope with light of three colors individually.

The light of the R-color wavelength range reflected by the dichroic mirror 133 of the light separator passes through the second lens array 104R, the aperture diaphragm 130R, and the integrating lens 105R, is then reflected by a reflecting mirror 134a, and then, through a field lens 110R, illuminates a liquid crystal display panel 111R. The light of the G-color wavelength range transmitted through the two mirrors 132 and 133 of the light separator passes through the second lens array 104G, the aperture diaphragm 130G, and the integrating lens 105G, is then reflected by a reflecting mirror 134e, and then, through a field lens 110G, illuminates a liquid crystal display panel 111G.

The light of the B-color wavelength range reflected by the dichroic mirror 132 of the light separator passes through the second lens array 104B, the aperture diaphragm 130B, and the integrating lens 105B, is then reflected by a reflecting mirror 134b, then passes through a condenser lens 108, is then reflected by a reflecting mirror 134c, and then, through a field lens 110B, illuminates a liquid crystal display panel 111B. The light conveying the optical images formed individually on the liquid crystal display panels 111R, 111G, and 111B is integrated together by a cross dichroic prism 112, and is then projected through a projection lens 113 on a projection screen.

Figure 37:
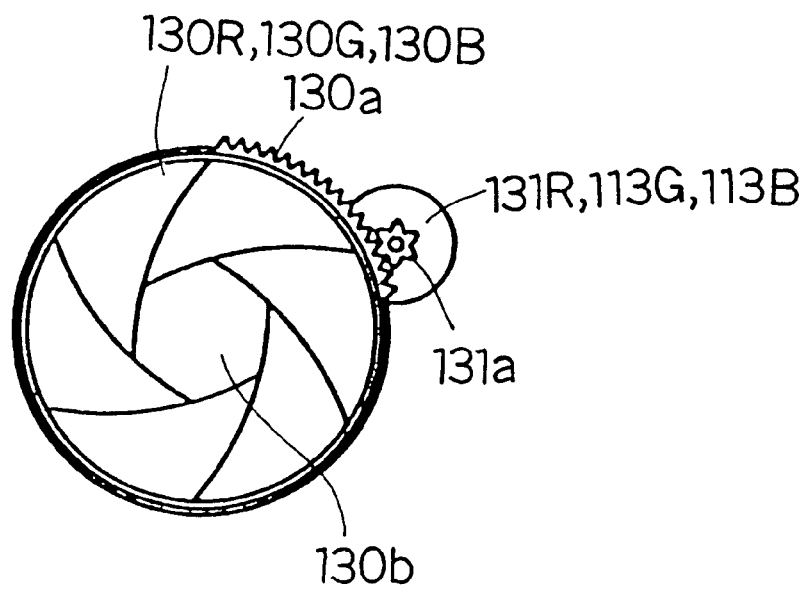
FIG. 37 is a diagram showing in detail the construction of the aperture diaphragm and the motor for adjusting the aperture diaphragm of the projector of the thirteenth embodiment.

FIG. 37 shows in detail the construction of the aperture diaphragms 130R, 130G, and 130B and the motors 131R, 131G, and 131B for adjusting the aperture thereof individually. A portion 130a of the peripheral portion of the aperture diaphragms 130R, 130G, and 130B is formed into a sawtooth shape, and the motors 131R, 131G, and 131B have a rotary portion 131a that meshes with this saw-toothed portion 130a. Rotation of the rotary portion 131a feeds a rotational force to the peripheral portion of the aperture diaphragms 130R, 130G, and 130B.

According as the aperture diaphragms 130R, 130G, and 130B are rotated, the area of their aperture 130b varies. The smaller the area of the aperture 130b, the less light is transmitted. The motors 131R, 131G, and 131B are controlled individually, and therefore the amount of light transmitted can be controlled individually for each color. This makes it possible to adjust the brightness of illumination on the liquid crystal display panels 111R, 111G, and 111B individually.

According to the brightness adjustment performed in this embodiment, it is possible not only to adjust brightness as in the eighth to twelfth embodiments described previously, but also to correct differences in brightness among light of different colors.

<Fourteenth Embodiment>

Figure 38:
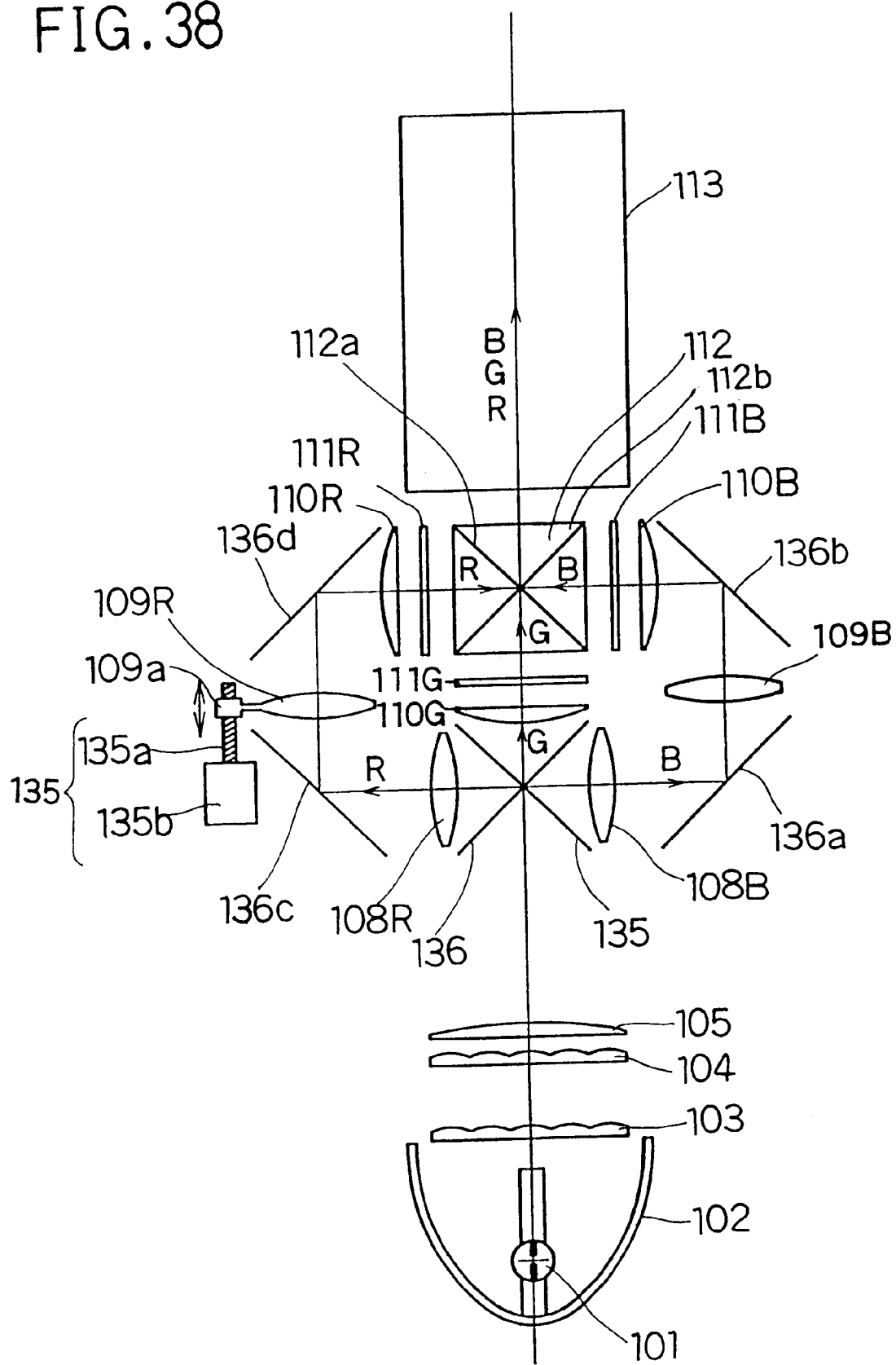
FIG. 38 is a diagram schematically showing, in a sectional view, the construction of the projector of a fourteenth embodiment of the present invention.

FIG. 38 schematically shows the construction of the projector of a fourteenth embodiment of the present invention. Such components as are found also in the projector of the eighth embodiment shown in FIG. 31A are identified with the same reference numerals and symbols, and overlapping descriptions will not be repeated. The light separator is composed of a dichroic mirror 135 that reflects only light of the R-color wavelength range and a dichroic mirror 136 that reflects only light of the B-color wavelength range arranged perpendicularly to each other.

The light of the R-color wavelength range reflected by the dichroic mirror 135 of the light separator travels via a condenser lens 108R, a reflecting mirror 136c, a relay lens 109R, a reflecting mirror 136d, and a field lens 110R, and then illuminates a liquid crystal display panel 111R. The light of the G-color wavelength range transmitted through the two dichroic mirrors 135 and 136 of the light separator travels through a field lens 110G, and then illuminates a liquid crystal display panel 111G. The light of the B-color wavelength range reflected by the dichroic mirror 136 of the light separator travels via a condenser lens 108B, a reflecting mirror 136a, a relay lens 109B, a reflecting mirror 136b, and a field lens 110B, and then illuminates a liquid crystal display panel 111B.

In this embodiment, the brightness adjustment mechanism is composed of a moving member 135 for moving the relay lens 109R along the optical axis. The moving member 135 is composed of a drive shaft 135a inserted into a hole formed in a holding member 109a for holding the relay lens 109R and a motor 135b, and has a construction similar to that of the moving member 90 of the eighth embodiment. The moving member 135 permits the relay lens 109R to move along the optical axis, and thereby allows adjustment of the brightness of the illumination light incident on the liquid crystal display panel 111R.

According to the brightness adjustment performed in this embodiment, it is possible to adjust the state of illumination by light of the R-color wavelength range, which exhibits the largest differences in brightness relative to light of the other wavelength ranges, and thereby reduce differences in brightness among light of the separated wavelength ranges. Moreover, it is possible to use the brightness adjustment mechanism of the eighth or ninth embodiment in combination, and thereby achieve adjustment of the brightness of the optical image as well.

<Fifteenth Embodiment>

Figure 39:
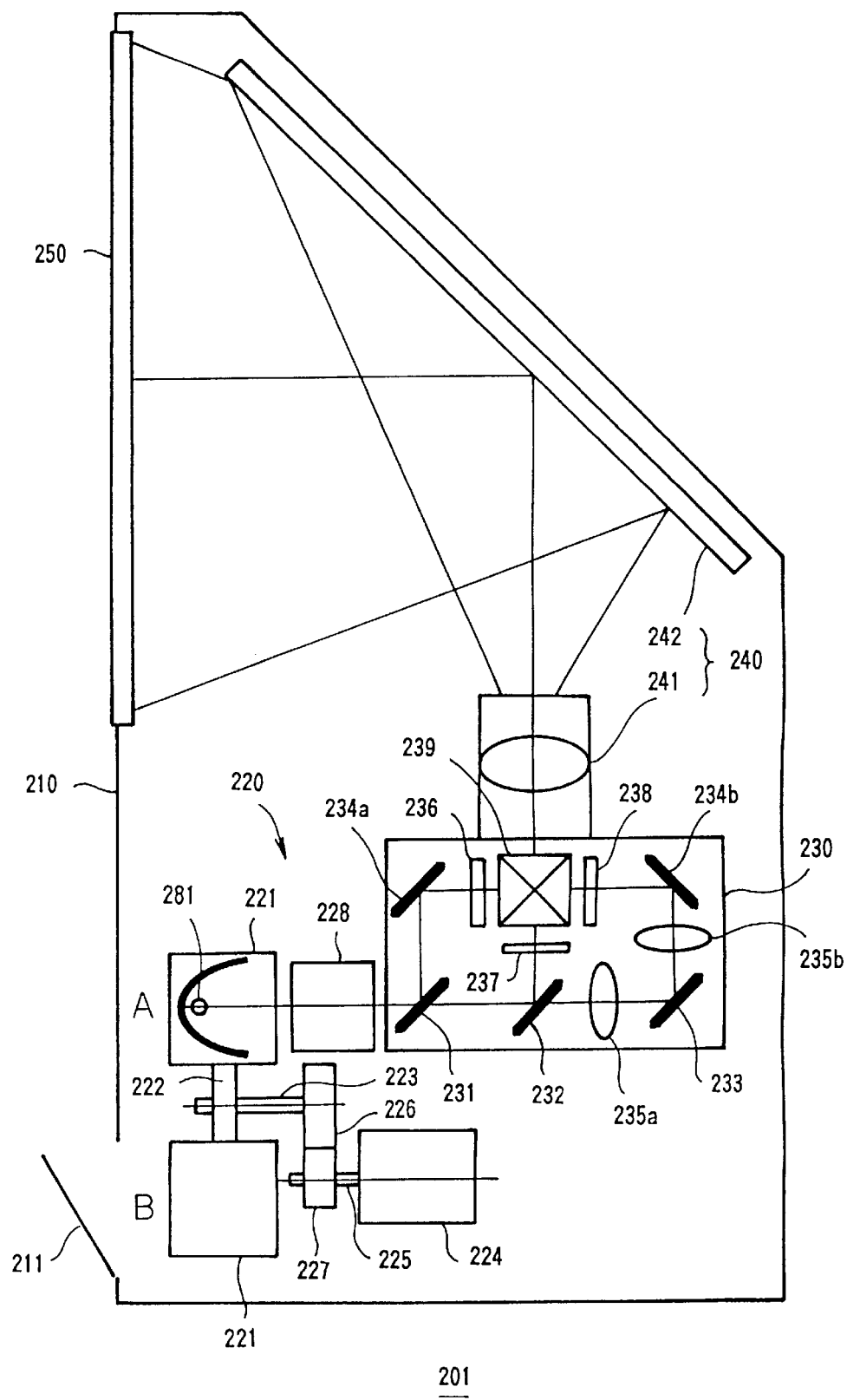
FIG. 39 is a diagram schematically showing the construction of the projector of a fifteenth embodiment of the present invention.

FIG. 39 schematically shows the overall construction of the projector 201 of a fifteenth embodiment of the present invention. This projector 201 is built as a back-surface-projection-type television monitor; that is, the projector receives a television signal, modulates the light from a light source in accordance with the RGB signals extracted from the received television signal, and then projects the modulated light on a screen from the back to display a color image thereon.

The projector 201 is composed of a screen 250 for displaying an image, a light source section 220 for supplying light for image projection, a modulation section 230 for modulating the light from the light source section 220 in accordance with RGB signals, a projection section 240 for projecting, while enlarging, the modulated light on the screen 250 to focus the light thereon, and a chassis 210 for housing all these components. The projector 201 employs as a light source for image projection a metal-halide lamp 281, which is a kind of arc discharge lamp. The lamp 281 is replaceable, and emits white light.

The light source section 220 is provided with two mount portions 221 for fitting a lamp 281, and thus allows simultaneous fitting of two lamps 281. Note however that the two lamps 281 thus fitted are not lit simultaneously; only the lamp 281 fitted in the mount portion 221 at the position indicated by A is lit, and the lamp 281 fitted in the mount portion 221 at the position indicated by B is not lit. The position A is called the lit position, and the position B is called the unlit position. The lamp placed at the unlit position B is a spare lamp.

Between the lit position A and the modulation section 230, a polarization converter 228 is arranged that converts the randomly polarized light emitted from the lamp 281 into linearly polarized light having a single polarization plane. Thus, the whole of the light from the light source section 220 is converted into light polarized in a way fit for the later-described liquid crystal display panels provided in the modulation section 230 before being directed to the modulation section 230.

In a lower front portion of the chassis 210 facing the unlit position B, an openable door 211 is provided. When the door 211 is opened, an opening appears through which the lamp can be removed from and fitted in the mount portion 221 at the unlit position B. FIG. 39 shows a state immediately before a spare lamp is fitted in the mount portion 221 at the unlit position B, and thus no spare lamp is shown there. Whichever mount portion 221 is located at the lit position A, the user cannot touch the lamp 281 fitted in that mount portion 221 and thus, quite naturally, cannot replace the lamp.

The two mount portions 221 are so constructed as to be movable between the lit position A and the unlit position B alternately. Specifically, the mount portions 221 are held by a holder 222 having a rotary shaft 223, and the light source section 220 is provided with a motor 224 for rotating the holder 222. The rotary shaft 223 of the holder 222 and a rotary shaft 225 of the motor 224 have gears 226 and 227 respectively fixed thereon so as to mesh with each other. Thus, as the motor 224 rotates, the holder rotates 222, and the mount portions 221 rotate together. To allow one of the two mount portions 221 to be located at the lit position A and the other at the unlit position B at a time, the lit and unlit positions A and B, and also the two mount portions 221, are arranged symmetrically about the rotary shaft 223.

It is also possible to provide three or more mount portions 221, with two or more unlit positions B secured, so that a plurality of spare lamps can be fitted. In that case, the door 211 may be made so large as to face all the unlit positions B, or sufficiently large to face only one of them. Even in cases where three or more mount portions 221 are provided, the lit and unlit positions A and B, and the mount portions 221, are arranged in rotation symmetry about the rotary shaft 223.

The modulation section 230 separates the white light supplied from the light source section 220 into light of three primary colors, i.e. R, G, and B, then modulates the thus separated light of three colors individually, then integrates the thus modulated light of three colors together, and then directs the integrated light to the projection section 240. The modulation section 230 is provided with three color filters 231, 232, and 233 for separating the light from the light source section 220, three transmission-type liquid crystal display panels (LCDs) 236, 237, and 238, and a cross prism 239 for integrating together the modulated light.

The filters 231, 232, and 233 respectively reflect R-color light, G-color light, and B-color light while transmitting light of other colors. These filters 231, 232, and 233 are arranged on the optical path of the light coming from the light source section 220, at 45° to this optical path, so that the light reflected therefrom will all travel parallel to one another in the same direction. The cross prism 239 is arranged in a position where the prism 239 can directly receive the light reflected from the filter 232 at the center. On both sides of the cross prism 239 are arranged total-reflection mirrors 234a and 234b for directing the light reflected from the filters 231 and 233 to the cross prism 239.

The liquid crystal display panels 236, 237, and 238 respectively modulate R-color light, G-color light, and B-color light in accordance with the R, G, and B signals of the RGB signals. The liquid crystal display panels 236, 237, and 238 are so arranged as to be almost in contact with the cross prism 239 and perpendicular to the light reflected from the mirror 234a, the filter 232, and the mirror 234b respectively. The filters 231, 232, and 233 and the liquid crystal display panels 236, 237, and 238 may be arranged in any order as long as appropriate correspondence between the light of three colors and the signals is achieved.

The cross prism 239 is composed by cementing together four prisms each having a rectangular equilateral triangle shaped section, and thus has a square shaped section as a whole. The cementing surfaces between these component prisms are formed into half-mirrors, and are arranged at 450 to any of the light of three colors incident thereon. The cross prism 239, by transmitting the light from the liquid crystal display panel 237 and reflecting the light from the liquid crystal display panel 236 and the light from the liquid crystal display panel 238, integrates together the modulated light of three colors, and then directs the integrated light to the projection section 240.

The distances between the filter 231 and the filter 232, between the filter 232 and the filter 233, between the filter 231 and the mirror 234a, and between the filter 233 and the mirror 234b are equal. The distances between the filter 232 and the liquid crystal display panel 237, between the mirror 234a and the liquid crystal display panel 236, and between the mirror 234b and the liquid crystal display panel 238 are equal. Accordingly, the length of the optical path from the filter 231 via the mirror 234a to the liquid crystal display panel 236 is equal to the length of the optical path from the filter 231 via the filter 232 to the liquid crystal display panel 237.

On the other hand, the optical path from the filter 231 via the filters 232 and 233 and the mirror 234b to the liquid crystal display panel 238 is longer than the above-mentioned two optical paths. Therefore, to make this optical path substantially equal to the above-mentioned two optical paths, relay lenses 235a and 235b are arranged between the filter 232 and the filter 233 and between the filter 233 and the mirror 234b respectively. Note that it is not always necessary to provide two relay lenses; it is also possible to provide, instead, a single relay lens that corresponds to the two relay lenses 235a and 235b somewhere on the optical path from the filter 232 to the liquid crystal display panel 238.

The projection section 240 is composed of a projection lens 241 and a total-reflection mirror 242. The projection lens 241 projects upward the modulated light integrated together by the cross prism 239, and the mirror 242 reflects the light from the projection lens 241 toward the screen 250 provided at the front. As a result, the light conveying images of three colors is focused on the screen 250, and thereby a color image is displayed on the screen 250.

The projector 201 is built as a television monitor, and therefore the size of the screen 250 and the length of the optical path from the cross prism 239 to the screen 250 are fixed. Accordingly, the projection lens 241 does not need to be provided with a function for focus adjustment. However, to prevent blurring of the display image due to slight assembly errors, the projection lens 241 is designed to be capable of fine adjustment of focus.

This construction, in which the light projected from the projection lens 241 is reflected by the total-reflection mirror 242, helps keep the projector 201 compact and simultaneously secure a comparatively long optical path from the projection lens 241 to the screen 250 to make the displayed image accordingly large. The total-reflection mirror 242 may be a flat mirror, or, to make the displayed image still larger, a convex mirror. It is also possible to change the position and orientation of the modulation section 230 and the projection lens 241 in such a way that the optical axis of the projection lens 241 is perpendicular to the screen 250; this makes it possible to omit the mirror 242.

The screen 250 has fine surface irregularities formed uniformly over the entire surface so as to be semitransparent, and thus the light projected on the screen 250 from the back thereof so as to be focused thereon travels forward therethrough while being dispersed. Accordingly, an observer, standing or sitting on the front side of the screen 250, can observe the image displayed on the screen 250 From any direction on the front side thereof.

As described previously, this projector 201 employs as a light source a replaceable lamp 281. However, here, what is replaced is not the lamp 281 alone, but the lamp unit incorporating the lamp 281. A metal-halide lamp becomes hot when lit, and therefore, if the surface of the glass bulb is stained with an inflammable greasy or similar substance, the lamp may burst. By allowing not the lamp alone but the lamp unit to be replaced, it is possible to reduce greatly the: possibility of the user directly touching the lamp, making the glass bulb stained with seburn. This makes it possible to prevent a lamp burst hazard.

A metal-halide lamp offers the advantage of emitting a large amount of light, but simultaneously has the disadvantage of the glass bulb deteriorating as light-emission time increases, eventually causing lamp bursting if used in an advanced stage of deterioration. For this reason, with a metal-halide lamp, the period within which safe use is guaranteed is determined as the life of the lamp at the time of manufacture in consideration of the relationship between light-emission time and the degree of deterioration. The projector 201 and the lamp unit employed therein are designed to avoid the risk of allowing the lamp to be lit for a period far longer than the life.

Figure 40:
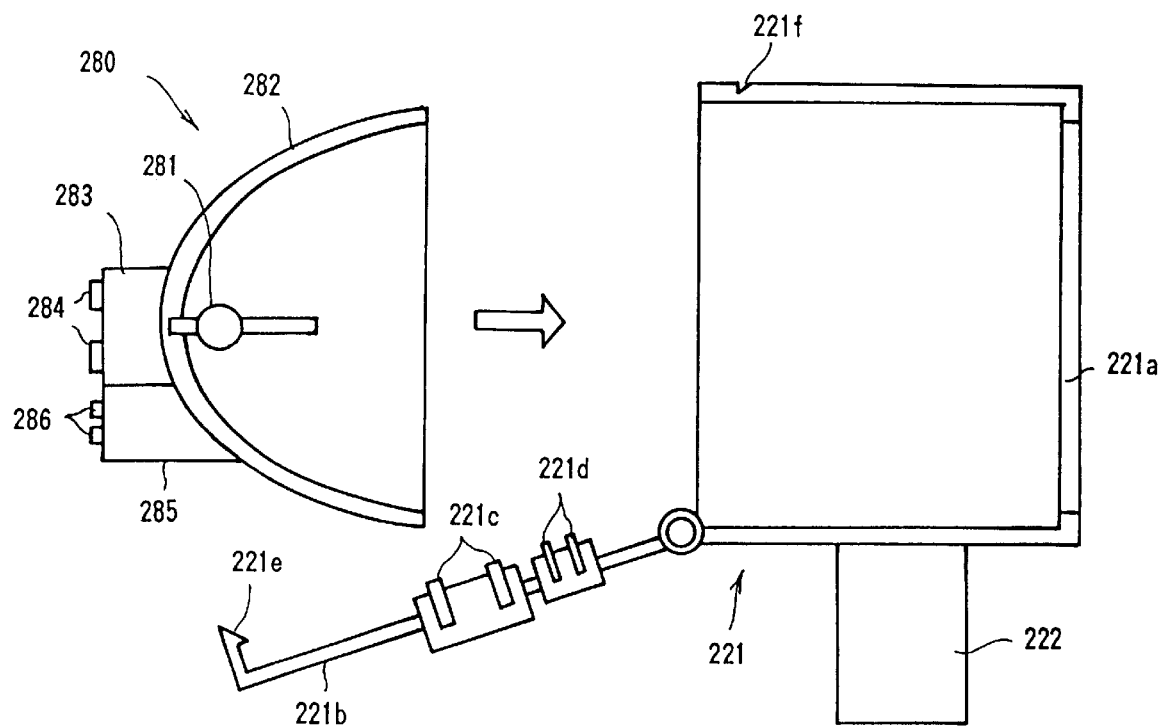
FIG. 40 is a diagram showing, in a sectional view, the construction of the mount portion and the lamp unit fitted therein of the projector of the fifteenth embodiment.
Figure 41:
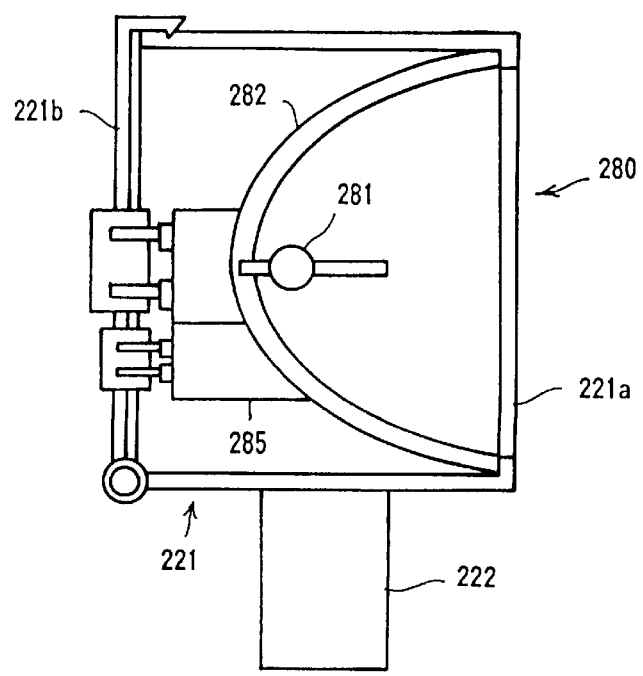
FIG. 41 is a diagram showing a section of the mount portion of the projector of the fifteenth embodiment, with the lamp unit fitted therein.

FIG. 40 shows the construction of the lamp unit 280 and the mount portion 221 employed in the projector 201, and FIG. 41 shows the state of the mount portion 221 with the lamp unit 280 fitted therein. The lamp unit 280 is composed of a metal-halide lamp 281, a total-reflection mirror (reflector) 282 having the shape of a paraboloid, a lamp holder 283 that holds the lamp 281 and the mirror 282 as one unit and on which terminals 284 of the lamp 281 are provided, and a memory 285 for storing various items of data related to the lamp 281. The lamp 281 is arranged at the focus of the mirror 282 so that the light emitted from the lamp 281 will be, by being reflected by the mirror 282, made into a parallel beam.

The memory 285 is an EEPROM, i.e. a non-volatile memory that allows rewriting of data, is provided with terminals 286 for data exchange, and is firmly fitted to the lamp holder 283. When the lamp unit 280 is manufactured, various items of data related to the lamp 281 is written to the memory 285, for example the rated output, the light-emission efficiency, the life when lit at the rated output, the relationship between the output and the rate of deterioration, the relationship between the output and the color temperature of the light emitted, and the relationship between the temperature and the ignition voltage at which the lamp allows itself to be lit. The projector 201 reads these items of data related to the lamp 281 from the memory 285 to use them for operation control. In particular, the projector 201 updates the life of the lamp 281 stored in the memory 285 by calculating the remaining life on the basis of the light-emission time when the lamp is lit.

The mount portion 221 has a cylindrical shape, has an opening formed at the front end thereof, and has a door 221b provided at the rear end thereof. The door 221b is provided with terminals 221c for supplying electric power to the lamp 281 and terminals 221d for exchanging data with the memory 285. As indicated by an arrow in FIG. 40, the lamp unit 280 is inserted into the mount portion 221 from the back, and is fixed inside the mount portion 221 by the front-end edge of the paraboloid-shaped mirror 282 making contact with the rim portion of the opening 221a and the terminals 221c and 221d of the closed door 221b making contact with the terminals 284 and 286 respectively.

To allow the door 221b to be kept closed, at an end portion of the door 221b is formed a claw 221e that engages with a groove 221f formed on the outer circumferential surface of the mount portion 221. The door 221b is elastic, and therefore, by softly handling the end portion thereof with the tip of a finger, it is possible to disengage the claw 221e from the groove 221f and thereby open the door 221b. Thus, the lamp unit 280 can easily be fitted in and removed from the mount portion 221.

Figure 42:
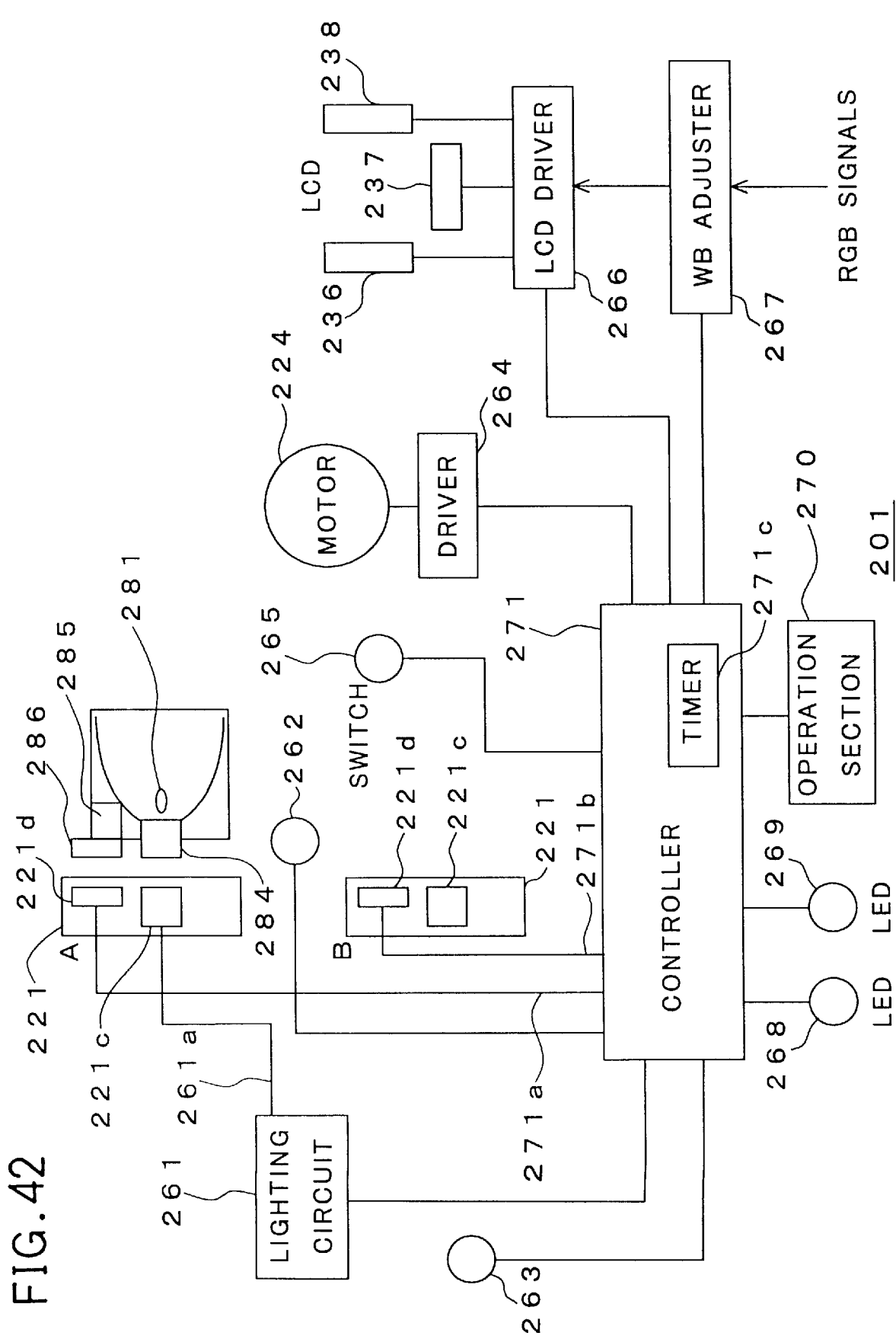
FIG. 42 is a block diagram showing the outline of the circuit configuration related to image display of the projector of the fifteenth embodiment.

FIG. 42 shows the outline of the circuit configuration related to image display of the projector 201. The projector 201 is provided with a lighting circuit 261 for supplying electric power to the mount portion 221 to light the lamp 281, a temperature sensor 262 for detecting the temperature of the lamp 281 fitted in the mount portion 221 at the lit position A, a door state sensor 263 for detecting whether the door 211 provided so as to face the unlit position B is open or closed, a driver 264 for driving the motor 224, and a switch 265 that is closed when the mount portions 221 are located at the lit and unlit positions A and B and that is open when the mount portions 221 are located somewhere between the lit and unlit positions A and B.

Wirings 261a for supplying electric power are laid from the lighting circuit 261 to the lit position A. The ends of the wirings 261a are exposed at the lit position A to serve as connection terminals, and are automatically connected to the terminals 221c of the mount portion 221 when the mount portion 221 is positioned at the lit position A. On the other hand, no wiring is laid from the lighting circuit 261 to the unlit position B, and therefore no electric power is supplied to the mount portion 221 at the unlit position B.

The projector 201 is further provided with a liquid crystal display panel driver 266 for driving the liquid crystal display panels 236, 237, and 238 in accordance with R, G, and B signals so as to modulate R-color, G-color, and B-color light, a WB adjuster 267 for feeding R, G, and B signals to the driver 266 and for adjusting the white balance (WB) of the displayed image by controlling the intensity of those three signals, two light-emitting diodes (LEDs) 268 and 269 for indicating warnings, an operation section 270 that is operated by the user, and a controller 271.

The projector 201 is also provided with a signal processing circuit (not shown) of a type well known in television technology for receiving a television signal and producing RGB signals therefrom. The WB adjuster 267 receives the RGB signals from this signal processing circuit. Note that it is also possible to feed the WB adjuster 267 with RGB signals reproduced on a video reproduction apparatus.

The controller 271, composed of a microcomputer, controls the lighting circuit 261 to light the lamp 281, controls the driver 264 to drive the motor 224, controls the driver 266 to drive the liquid crystal display panels 236, 237, and 238, controls the WB adjuster 267 to adjust the white balance, and controls the operation of the signal processing circuit (not shown). The controller 271 is provided with a timer 271c for measuring the period for which the lamp 281 has been kept lit, and wirings 271a and 271b for data exchange with the memory 285 of the lamp unit 280 are laid from the controller 271 to the lit and unlit positions A and B respectively. The ends of the wirings 271a and 271b are exposed at the lit and unlit positions A and B to serve as connection terminals, and are automatically connected to the terminals 221d of the mount portions 221 when the mount portions 221 are positioned at the lit and unlit portions A and B.

To prevent a lamp burst hazard, the controller 271 automatically moves to the lit position A the mount portion 221 in which a lamp unit 280 with a lamp 281 having a remaining life is fitted. To achieve this, before image display is started, the controller 271 reads the remaining life of the lamp 281 from the memory 285 of each of the lamp units 280. When there is no remaining life, i.e. when the remaining life is equal to or less than 0, the mount portion 221 in question is recognized as "unfit to be lit"; similarly, when no lamp unit 280 is fitted, the mount portion 221 in question is recognized as "unfit to be lit". When a lamp unit 280 with a lamp 281 having a remaining life is fitted, the mount portion 221 is regarded as "fit to be lit".

If the mount portion 221 at the lit position A is recognized as "unfit to be lit", then whether the mount portion 221 at the unlit position B is fit to be lit or not is checked so that, if found fit to be lit, this mount portion 221 is moved to the lit position A. If both of the mount portions 221 at the lit and unlit positions A and B are found unfit to be lit, the LED 268 is turned on to give a warning.

When image display is ended, i.e. when the lamp 281 located at the lit position A is extinguished, the controller 271 subtracts the light-emission time measured by the timer 271c from the reaming life read immediately before the lamp 281 was lit to calculate the updated value of the remaining life, and writes the calculated value to the memory 285 of the lamp unit 280 to update the remaining life stored therein. Here, the remaining life is calculated at the time point when the user feeds in an instruction requesting ending of image display through the operation section 270, and, if the thus calculated remaining life is shorter than a predetermined period H, whether the mount portion 221 at the unlit position B is fit to be lit or not is checked. If the mount portion 221 at the unlit position B is found unfit to be lit, a message is displayed on the screen for a short time, for example for several seconds, to warn that a lamp unit 280 with a lamp 281 having a remaining life should be fitted in the mount portion 221 at the unlit position B. Thereafter, the lamp 281 is extinguished.

For example, the message reads: "The lamp is approaching the end of its life. Please fit a new spare lamp in the spare lamp holder". Noticing this message, the user is prompted to fit a new lamp unit 280 in the mount portion 221 at the unlit position B on a convenient occasion.

The predetermined period H is set to be longer than twice the average period required by a typical image-display session. In the projector 201 of this embodiment, which is built as a television monitor, it is preferable to set the period H at 3 to 4 hours. This is to secure a sufficient remaining life to allow a next image-display session even when a new lamp unit 280 is not fitted. If the remaining life runs out while the lamp 281 is being lit, the lamp 281 is kept lit. This is because lamp bursting does not occur immediately when the remaining life runs out, and therefore it is preferable to give priority to avoiding the inconvenience of interrupting image display to move the lamp 281 located at the unlit position B to the lit position A. To shorten as much as possible the period for which the lamp is lit beyond the life thereof, it is preferable to set the predetermined time H to be longer than twice the average period required by a typical image-display session.

The user opens the door 211 and fits a new lamp unit 280 in the mount portion 221 at the unlit position B. While the lamp 281 at the lit position A is being lit by the lighting circuit 261, or while the temperature of the lamp 281 at the lit position A is equal to or higher than a predetermined temperature, the controller 271 inhibits the driving of the motor 224. This prevents the hot lamp 281 from moving to the position B immediately after extinction, and thus prevents the user from suffering a skin burn by touching the lamp.

Moreover, while the door 211 is being recognized as open by the door state sensor 263, the controller 271 inhibits the driving of the motor 224, and, if the door 211 is recognized to be opened while the motor 224 is being driven, the controller 271 immediately stops the motor 224. This ensures that the mount portions 221 rotate only while the door 211 is closed, and thus prevents the user from having his fingertips pinched by the mount portions 221 or the holder 222. While the door 211 is open, the LED 269 is kept on to warn against leaving the door open.

The driving of the motor 224, performed to rotate the mount portions 221, is topped when the switch 265 is closed. Accordingly, even if the driving of the motor 24 is interrupted as a result of the door 211 being opened, making it impossible to keep track of the positions of the mount portions 221, it is possible, simply by restarting the driving of the motor 224, to position the mount portions 221 at the lit and unlit positions A and B.

A metal-halide lamp, which is a kind of arc discharge lamp, starts being lit at different ignition voltages according to whether the temperature thereof is low or high. At low temperatures, the gas filling the lamp ionizes easily, and thus the lamp can be lit at a low ignition voltage. By contrast, at high temperatures, the gas filling the lamp does not ionize easily, and thus the lamp cannot be lit unless an ignition voltage as high as twice to ten times the low ignition voltage.

In the projector 201, to make it possible to restart image display immediately after ending of image display, the lighting circuit 261 is designed to output two, i.e. a high and a low, ignition voltages. In accordance with whether or not the temperature of the lamp 281 at the lit position A as detected by the temperature sensor 262 is equal to or lower than a predetermined temperature, the controller 271 instructs the lighting circuit 261 to output either of the two ignition voltages. When the detected temperature is low, the low ignition voltage is applied to the lamp 281, and thus it is possible to light the lamp 281 while preventing damage to the electrodes of the lamp. On the other hand, when the detected temperature is high, the high ignition voltage is applied so that the lamp can be lit without fail even immediately after extinction.

Instead of selecting an ignition voltage in accordance with the detected temperature, it is also possible to select an ignition voltage in accordance with the period that has elapsed after extinction. For example, when the period that has elapsed after extinction is equal to or shorter than 80 seconds, the high ignition voltage is selected, and, when the period after extinction exceeds 80 seconds, the low ignition voltage is selected. Moreover, it is also possible to set a medium ignition voltage between the two, i.e. high and low, ignition voltages so that one of the three ignition voltages will be selected in accordance with the temperature of the lamp 281 or the period that has elapsed after extinction. Furthermore, it is also possible to make the ignition voltage variable continuously between a minimum voltage and a maximum voltage about ten times the minimum voltage so that an appropriate ignition voltage will be applied to the lamp 281 in accordance with the state of the lamp.

Even in a configuration in which only a low ignition voltage is available, it is possible to restart image display immediately after ending of image display by moving the spare lamp 281 at the unlit position B and thus at a low temperature to the lit position A when the lamp 281 at the lit position A is at a high temperature. However, there is not always a spare lamp fitted at the unlit position B, and, even if there is one fitted, the spare lamp does not always have a remaining life. Thus, this method of control does not offer sufficient reliability. In addition, allowing the hot lamp 281 immediately after extinction to be moved to the unlit position B creates the risk of the user suffering a skin burn by touching the hot lamp. For this reason, in terms of both reliability and safety, it is preferable to adopt the above-described method of control that achieves re-lighting of the lamp 281 at the lit position A by selective use of one of two, a high and a low, ignition voltage.

To allow conformable image viewing and to reduce electric power consumption, it is preferable to permit the brightness of the displayed image to be varied according to the ambient brightness. To achieve this, in the projector 201, the voltage that the lighting circuit 261 applies to the lamp 281 to keep the lamp lit (hereafter this voltage will be referred to as the normal voltage) is made variable, and is varied by the controller 271 in response to an instruction that the user feeds in through the operation section 270 to adjust the brightness. According as the normal voltage varies, the amount of light emitted by the lamp 281 varies, causing the amount of light projected on the screen 250, and thus the brightness of the displayed image, to vary.

Figure 55:
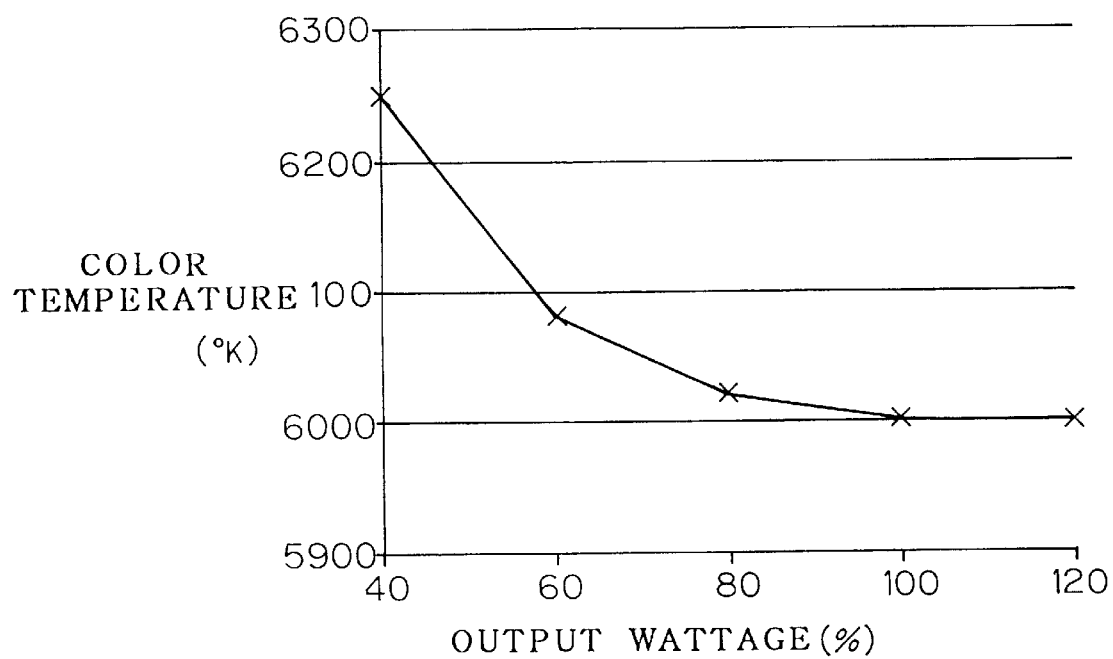
FIG. 55 is a diagram showing an example of the relationship between output wattage and color temperature as observed in a metal-halide lamp.

With a metal-halide lamp, according as the amount of light the lamp emits, i.e., the output wattage of the lamp, varies, the color temperature of the emitted light varies. FIG. 55 shows an example of the relationship between the output wattage and the color temperature. A high output wattage results in a low color temperature, and a low output wattage results in a high color temperature. Light appears reddish or bluish depending on whether the color temperature of the light is low or high respectively. Accordingly, to keep the hues of the displayed image unchanged regardless of the brightness of the image, it is necessary to adjust the white balance in accordance with the normal voltage applied to the lamp 281.

To achieve this, the controller 271 instructs the WB adjuster 267 to vary individually the intensity of the R, G, and B signals that are fed to the driver 266 in accordance with the normal voltage that the lighting circuit 261 is instructed to output. Specifically, according as the normal voltage is increased, the intensity of the B signal with respect to the R signal is increased relatively, and according as the former is decreased, the latter is decreased relatively. As a result, when the lamp 281 emits a large amount of light, and thus the brightness of the displayed image is high, the emitted light is made less reddish; by contrast, when the lamp 281 emits a small amount of light, and thus the brightness of the displayed image is low, the emitted light is made less bluish. This makes it possible to keep the hues of the displayed image unchanged.

As described previously, the relationship between lamp output and color temperature is stored in the memory 285 of the lamp unit 280. The controller 271 uses this data to control the WB adjuster 267 to adjust the white balance. Accordingly, regardless of the wattage of the lamp 281 used, it is possible to display images with well-balanced hues. Instead of storing the relationship between output wattage and color temperature in individual lamp units 280, it is also possible to store, on the part of the controller 271, the relationship between output wattage and color temperature as typically observed in a metal-halide lamp and use this data to control adjustment of the white balance.

The operation section 270 is provided with an operation member for setting hues so that, in accordance with an instruction fed in by the user, the controller 271 will correct the proportion of the R, G, and B signals determined on the basis of the relationship between output wattage and color temperature. This allows the user to set the hues of the displayed image as he likes.

The rate at which the lamp 281 deteriorates varies with the output that the lamp yields while lit. Therefore, to calculate the remaining life accurately, it is necessary to take into consideration not only the period for which the lamp 281 has been kept lit, but also the output that the lamp has been yielding meanwhile. Accordingly, in the projector 201, the speed at which the timer 271c for measuring the light-emission time of the lamp 281 measures time is made variable. As described previously, the relationship between the output and the rate of deterioration of the lamp 281 is stored in the memory 285 of the lamp unit 280, and, with reference to this data, the controller 271 varies the speed of time measurement by the timer 271c in accordance with the normal voltage that the lighting circuit 261 is instructed to output. As a result, even though the output of the lamp 281 is varied according to the ambient brightness, it is possible to calculate the remaining life accurately.

Figure 43:
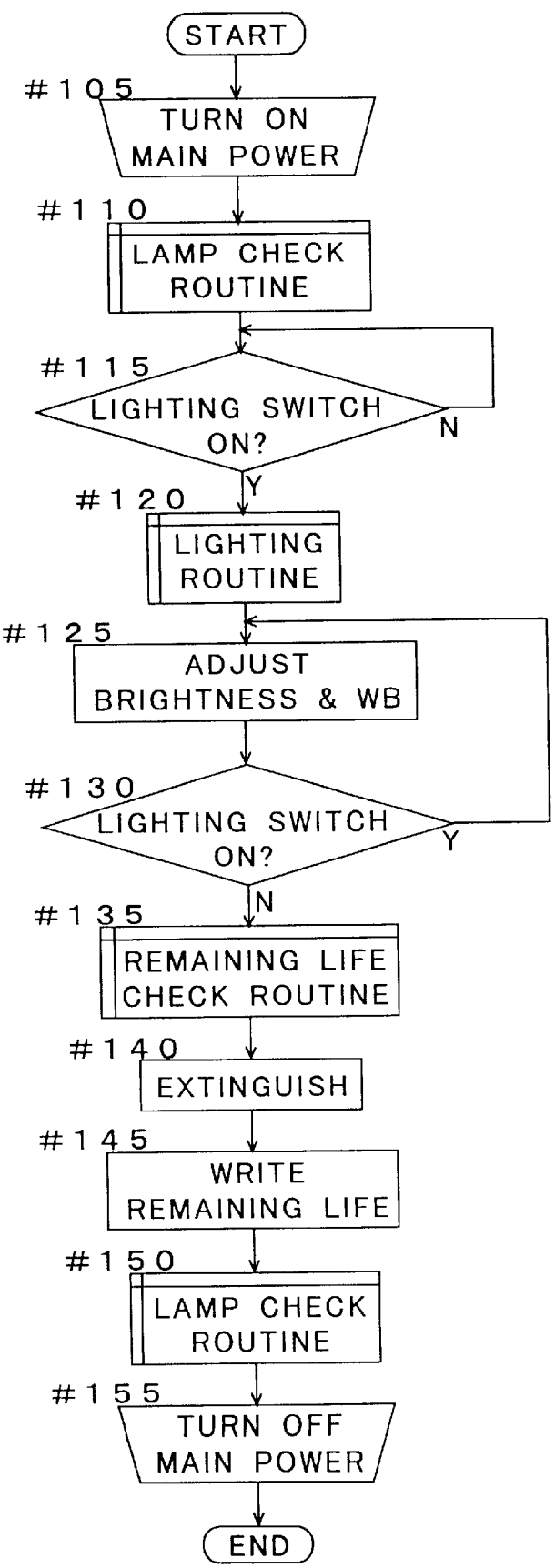
FIG. 43 is a flow chart showing the outline of the entire flow of control related to image display performed in the projector of the fifteenth embodiment.

Now, the operations that the projector 201 performs to control image display will be described with reference to FIGS. 43 to 46. FIG. 43 is a flow chart showing the outline of the entire flow of control operations. When the power switch is so operated that electric power starts being supplied to the individual portions of the projector 201 (step #105), the controller 271 first performs, for each of the mount portions 211, a lamp check on the basis of whether a lamp unit 280 is fitted therein or not and the remaining life of the lamp 281 stored in the memory 285 to check whether the lamp fitted in that mount portion 221 is fit to be lit or not, and then positions a mount portion 221 that has been found fit to be lit to the lit position A (#110).

Next, whether or not starting of image display is requested by operation of a switch for requesting starting and ending of image display provided in the operation section 270 is checked (#115). If starting of image display is not requested, the flow waits until starting of image display is requested. When starting of image display is requested, a lighting routine starts being executed whereby an ignition voltage is applied to the lamp 281 at the lit position A so that the lamp will be lit (#120). As a result, a color image corresponding to the television signal that the projector is receiving is displayed on the screen 250.

Image display is continued until ending of image display is requested by operation of the switch for requesting starting and ending of image display (#130). Meanwhile, in accordance with an instruction fed in by the user, the brightness of the displayed image is varied by varying the normal voltage applied to the lamp 281 (#125). At the same time that the brightness of the displayed image is varied, the white balance is adjusted and the speed of time measurement by the timer 271c is varied accordingly.

When ending of image display is requested (#130), the remaining life of the lamp 281 is calculated, and, if necessary, replacement of the lamp unit 280 is prompted (#135). Then, the lamp 281 is extinguished (#140), and the calculated remaining life is written to the memory 285 of the lamp unit 280 at the lit position A (#145). Furthermore, in preparation for image display next time, a lamp check is performed in the same manner as in step #110 (#150), and, when the power switch is so operated that electric power stops being supplied, the flow comes to an end (#155).

Figure 44:
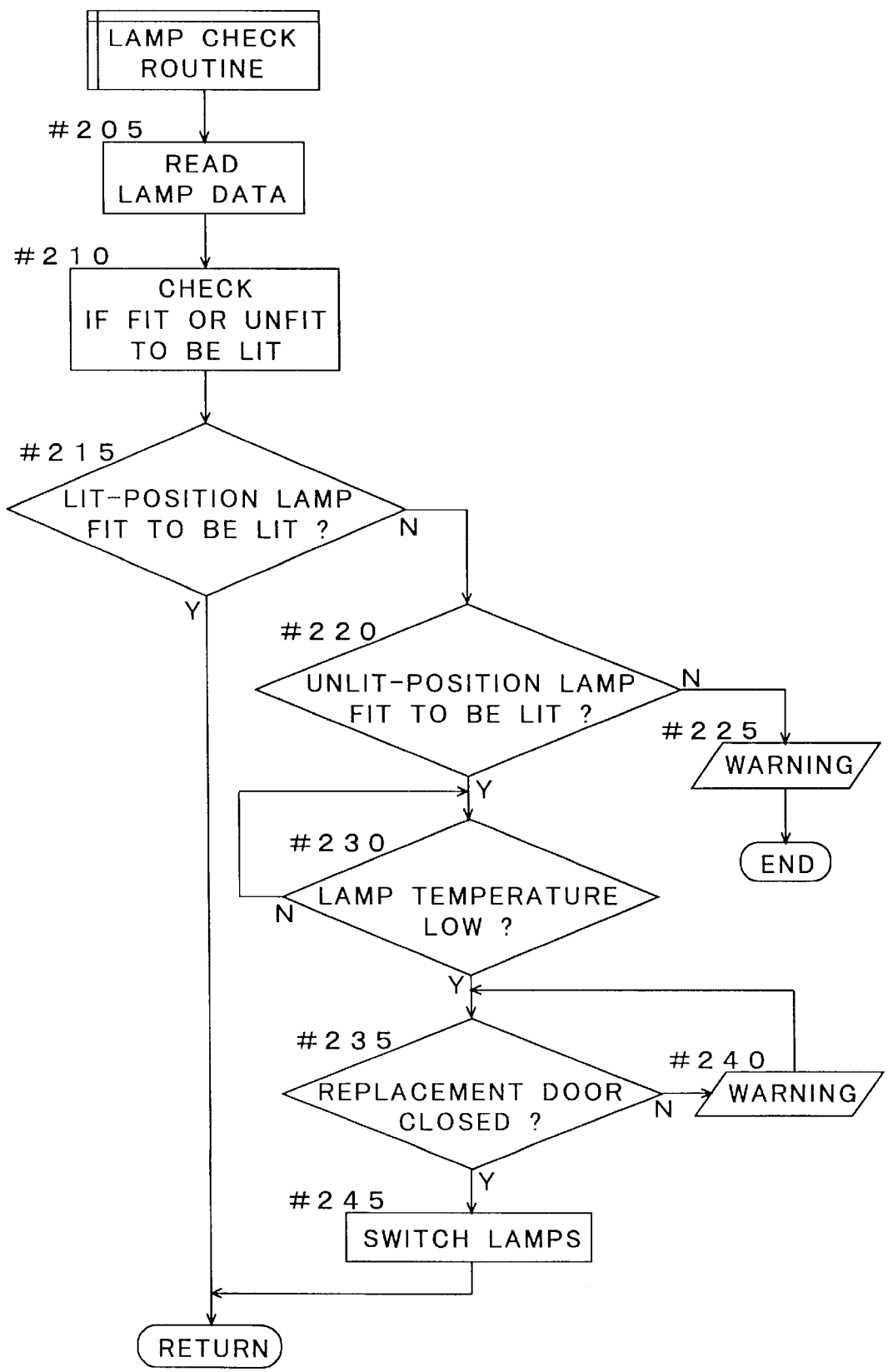
FIG. 44 is a flow chart showing the flow of operations performed to check the lamp in the projector of the fifteenth embodiment.

FIG. 44 is a flow chart showing the flow of operations performed as a lamp check routine in steps #110 and #150. For each of the mount portions 221 at the lit and unlit positions A and B, first, the data related to the lamp 281 including the remaining life is read out from the memory 285 of the lamp unit 280 fitted therein (step #205), and then, in accordance with whether a lamp unit 280 is fitted in this mount portion 221 or not and whether the lamp 281 has a remaining life or not, whether this mount portion 221 is fit to be lit or not is determined as described previously (#210).

Next, whether the mount portion 221 at the lit position A is fit to be lit or not is checked (#215), and, if the lamp is fit to be lit, the flow returns to the main routine shown in FIG. 43. If the mount portion 221 at the lit position A is unfit to be lit, then whether the mount portion 221 at the unlit position B is fit to be lit or not is checked (#220). If the mount portion 221 at the unlit position B is also unfit to be lit, the LED 268 is turned on to warn that there is no lamp 281 fitted that has a remaining life (#225), and then the flow comes to an end.

If the mount portion 221 at the unlit position B is fit to be lit, then whether the temperature of the lamp 281 at the lit position A as detected by the temperature sensor 262 is equal to or higher than a predetermined temperature or not is checked (#230), and, if so, the flow waits for the lamp temperature to drop below the predetermined temperature. If the temperature of the lamp 281 at the lit position A is lower than the predetermined temperature, then the state of the door 211 as detected by the door state sensor 263 is checked (#235). If the door 211 is found open, the LED 269 is turned on to warn that switching of the lamp units 280 is impossible (#240), and then the flow waits for the door 211 to be closed.

When the door 211 is found closed, the motor 224 is driven to rotate the holder 222 so that the mount portion 221 now at the lit position A will be moved to the unlit position B and the mount portion 221 now at the unlit position B will be moved to the lit position A, and thereby switching of the lamps 281 is achieved (#245). In this way, the lamp 281 having a remaining life is positioned at the lit position A so as to be ready to start image display at any time, and then the flow returns to the main routine shown in FIG. 43.

Figure 45:
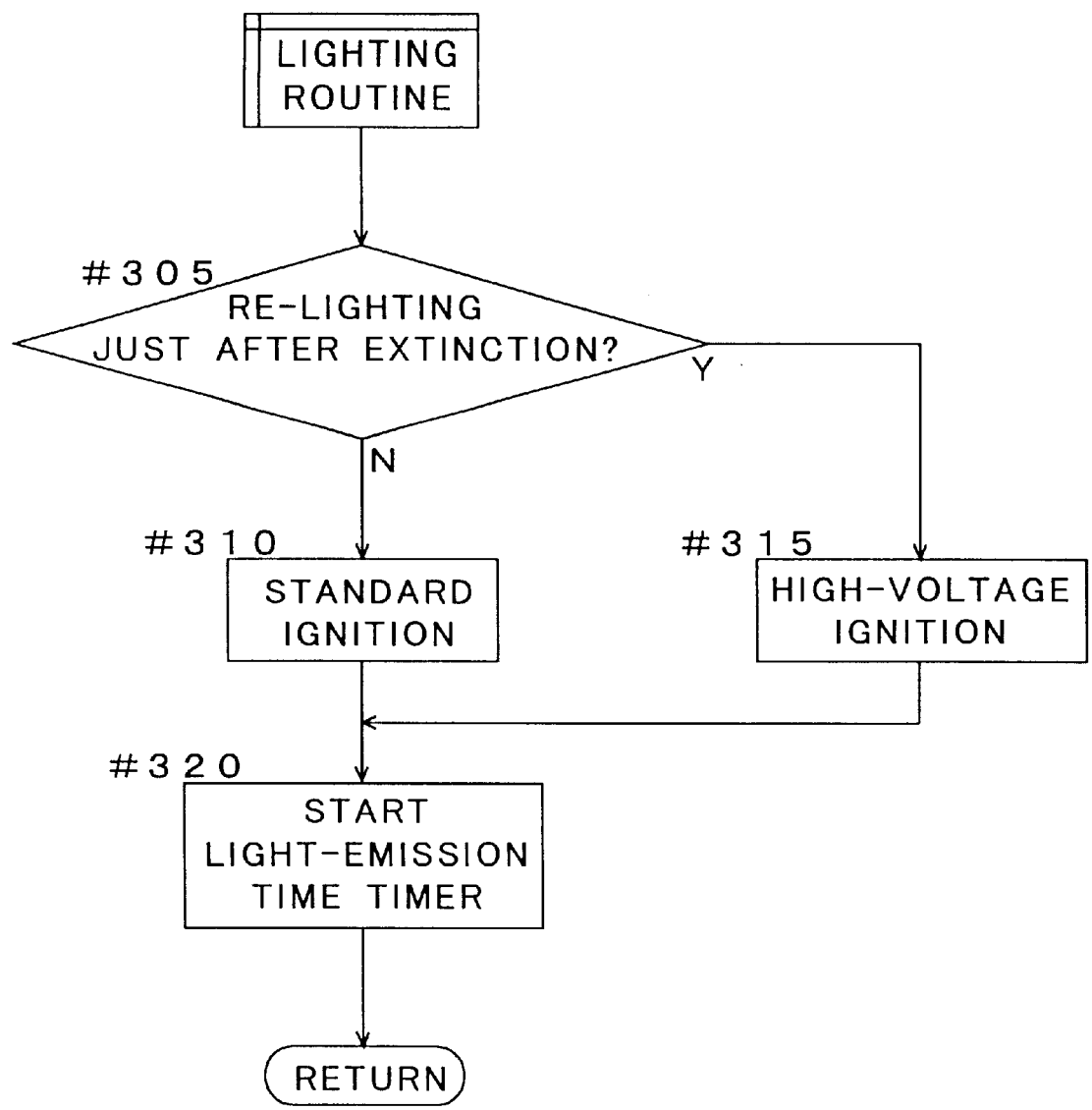
FIG. 45 is a flow chart showing the flow of operations performed to light the lamp in the projector of the fifteenth embodiment.

FIG. 45 is a flow chart showing the flow of operations performed as a lighting routine in step #120 in FIG. 43. First, on the basis of the temperature of the lamp 281 at the lit position A as detected by the temperature sensor 262, whether the lamp is about to be re-lit immediately after extinction or not is checked (step #305). If the detected temperature is equal to or lower than the predetermined temperature, i.e. if the lamp is about to be re-lit not immediately after extinction, standard ignition is performed by making the lighting circuit 261 apply a low ignition voltage to the lamp 281 (#310). By contrast, if the detected temperature is higher than the predetermined temperature, i.e. if the lamp is about to be re-lit immediately after extinction, high-voltage ignition is performed by making the lighting circuit 261 apply a high ignition voltage to the lamp 281 (#315). Then, to measure the light-emission time that is needed to calculate the remaining life, the timer 271c is started (#320), and then the flow returns to the main routine shown in FIG. 43.

Figure 46:
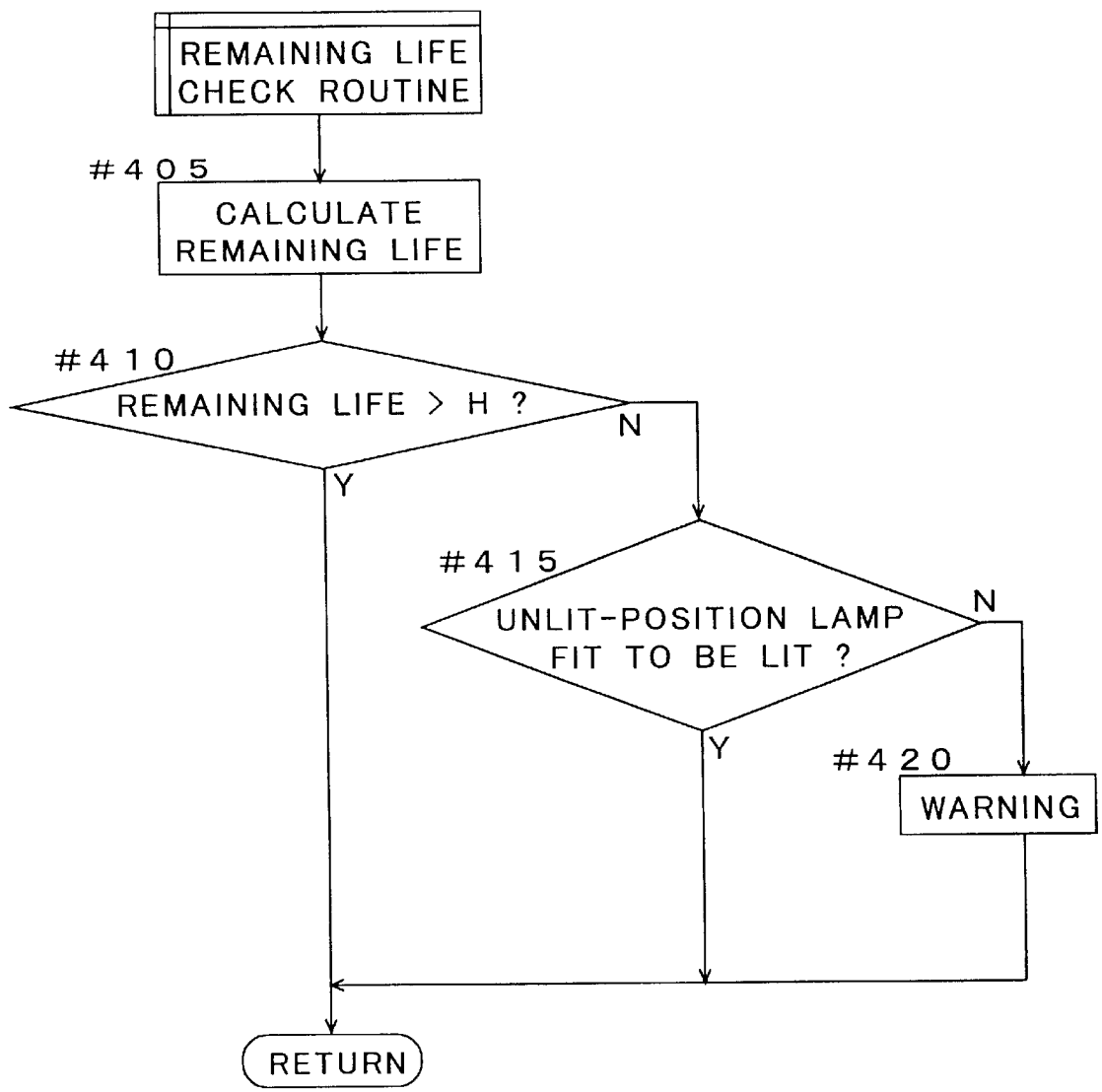
FIG. 46 is a flow chart showing the flow of operations performed to calculate the remaining life of the lamp and to request replacement of the lamp unit in the projector of the fifteenth embodiment.

FIG. 46 is a flow chart showing the flow of operations performed as a routine for calculating the remaining life of the lamp 281 and for requesting replacement of the lamp unit 280 in step #135 in FIG. 43. First, the time measured by the timer 271c started in step #120 (step #320 in FIG. 45) is subtracted from the remaining life read out in step #110 in FIG. 43 (step #205 in FIG. 44) in order to calculate the remaining life of the lamp 281 that is positioned at the lit position A and that is being lit (step #405). Next, whether the calculated remaining life is longer than a predetermined period H or not is checked (#410), and, if so, the flow returns to the main routine shown in FIG. 43.

If the remaining life is equal to or shorter than the predetermined period H, then whether the mount portion 221 at the unlit position B is fit to be lit or not is checked (#415). If the mount portion 221 at the unlit position B is fit to be lit, the flow returns to the main routine shown in FIG. 43; if not, a message as noted previously is displayed to prompt the user to fit a lamp unit 280 with a lamp 281 having a remaining life in the mount portion 221 at the unlit position B (#420), and then the flow returns to the main routine shown in FIG. 43.

This message needs to be displayed only for a short time that is sufficient to allow the user to read the message, for example for several seconds, and thus causes almost no error in the remaining life written to the memory 285 in step #145 in FIG. 43. In a case where a more accurate remaining life needs to be written to the memory 285, the only thing to do additionally is to subtract the duration for which this message is kept displayed from the remaining life calculated in step #405.

As described above, in the projector 201 of this embodiment, the remaining life of a lamp is stored in the lamp unit incorporating the lamp so that only a lamp having a remaining life will be lit, and, in addition, replacement of a lamp is achieved by replacing the entire lamp unit incorporating the lamp to prevent the user from directly touching the lamp. This almost eliminates the risk of lamp bursting. Moreover, replacement is allowed only of a lamp positioned at an unlit position, a hot lamp is not allowed to be moved to an unlit position, and the driving of a lamp moving mechanism is inhibited when a door for lamp replacement is open. Thus, there is no risk of the user suffering an injury such as a skin burn.

In addition, the brightness of the displayed image can be adjusted in accordance with ambient conditions, and the white balance is adjusted in accordance with the brightness of the displayed image. This makes it possible to display images with brightness appropriate for comfortable image viewing, with natural hues, and with less electric power consumption. Moreover, application of a high ignition voltage is possible, and image display can be restarted easily even immediately after ending of image display. Furthermore, when to replace the lamp can be predicted, and thus a message prompting lamp replacement can be displayed timely, helping the user prepare a spare lamp on an appropriate occasion.

Having these features, the projector 201 achieves exceptional safety, superb quality of the displayed image, and excellent user-friendliness with low electric power consumption, and is therefore suitable as a home-use television monitor. The projector may be additionally provided with a sensor for detecting ambient brightness so that the brightness of the displayed image will be adjusted in accordance with ambient brightness. This helps achieve a further reduction in electric power consumption. Also in that case, the white balance is adjusted in accordance with the brightness of the displayed image.

<Sixteenth Embodiment>

Figure 47:
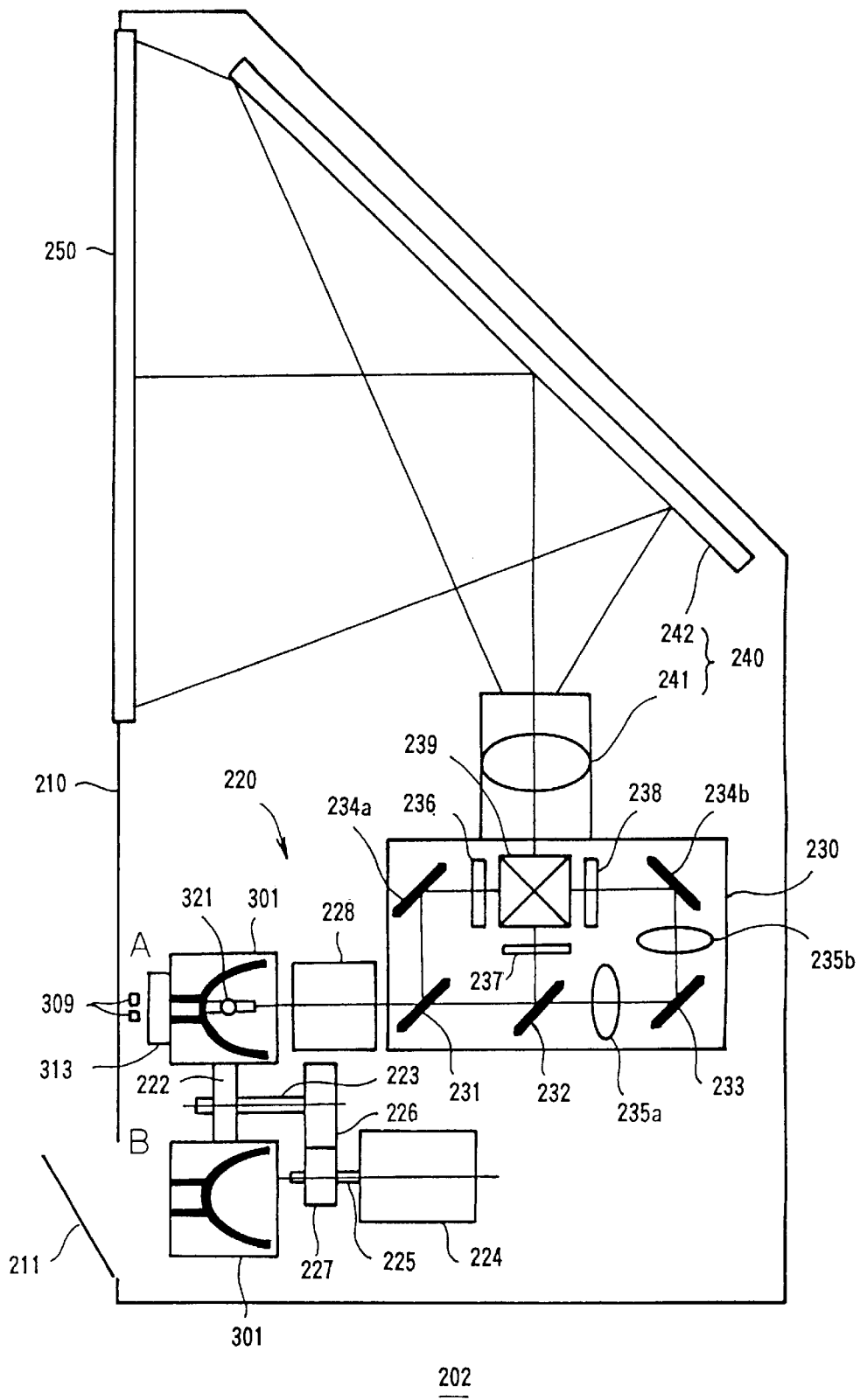
FIG. 47 is a diagram schematically showing the construction of the projector of a sixteenth embodiment of the present invention.

FIG. 47 schematically shows the overall construction of the projector 202 of a sixteenth embodiment of the present invention. Like the projector 201 of the fifteenth embodiment, the projector 202 of this embodiment is also built as a back-surface-projection-type television monitor. The projector 202 has almost the same construction and performs almost the same control operations as the projector 201, and therefore such components that function in the same or corresponding manner in both embodiments are identified with the same reference numerals and symbols without repeating overlapping descriptions.

Figure 48:
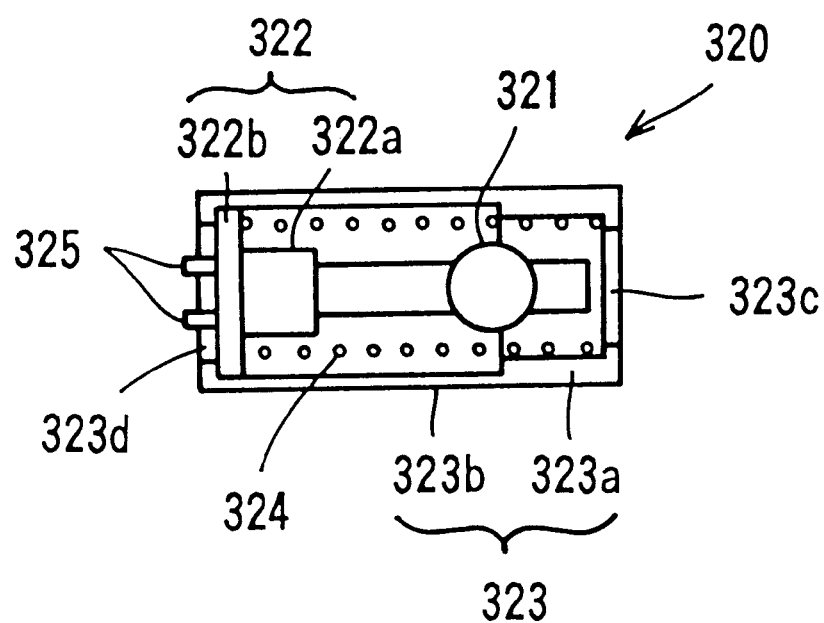
FIG. 48 is a diagram showing, in a sectional view, the construction of the lamp unit employed in the projector of the sixteenth embodiment.

Also in the projector 202, a replaceable lamp 321 is used as a light source, and replacement of the lamp 321 is achieved not by replacing the lamp 321 alone but by replacing the lamp unit that incorporates the lamp 321. The lamp unit employed in the projector 302 is of a different type from the lamp unit 280 employed in the projector 201. FIG. 48 shows the construction of the lamp unit 320 employed in the projector 202.

The lamp unit 320 is composed of a metal-halide lamp 321, a holder 322 for holding the lamp 321, a housing 323 for housing the lamp 321 and the holder 322, and a coil spring 324. The holder 322 has a rear portion 322b having the shape of a thick disk and a front portion 322a having the shape of a cylinder of a diameter smaller than the rear portion 322b. The holder 322 has the lamp 321 firmly fitted on the front-end surface thereof, and has terminals 325, which are connected to the electrodes of the lamp 321, provided on the rear-end surface thereof.

The housing 323 is made of a material having high thermal conductivity and is formed in the shape of a hollow cylinder having circular openings 323c and 323d at front and rear ends thereof respectively. The housing 323 has different inner diameters in a front portion 323a and a rear portion 323b thereof. The inner diameter of the rear portion 323b of the housing 323 is slightly larger than the diameter of the rear portion 322b of the holder 322. The inner diameter of the front portion 323a of the housing 323 is a little smaller than the inner diameter of the rear portion 323b thereof, making the front portion 323a thicker than the rear portion 323b. The diameters of the openings 323c and 323d at the front and rear ends are smaller than the inner diameters of the front and rear portions 323a and 323b respectively.

The circumferential surface of the rear portion 322b of the holder 322 slides over the inner surface of the rear portion 323b of the housing 323. The holder 322 is slidable between a rearmost position in which the rear portion 322b makes contact with the rim of the opening 323d of the housing 323 and a foremost position in which the rear portion 322b makes contact with the rear end of the front portion 323a of the housing 323. When the holder 322 is in the rearmost position, the lamp 321 is housed fully inside the housing 323; as the holder 322 is moved to the foremost position, the lamp 321 comes out of the housing 323 through the opening 323c so as to be exposed.

The coil spring 324 has a winding diameter slightly smaller than the inner diameter of the front portion 323a of the housing 323. The coil spring 324 is housed inside the housing 323 in a somewhat compressed state, with one end kept in contact with the rear portion 322b of the holder 322 and the other end kept in contact with the rim of the opening 323c at the front end of the housing 323. The lamp 321 can move freely inside the coil 324 without making contact with the coil. The coil spring 324, arranged in this way, loads the holder 322 with a force that tends to move the holder rearward; accordingly, the holder 322 remains in the rearmost position unless a force is applied thereto externally.

In the manufacturing process of the lamp unit 320, the front and rear portions 323a and 323b of the housing 323 are joined together after the holder 322 having the lamp 321 firmly fitted thereon and the coil spring 324 have been placed inside them.

Figure 49:
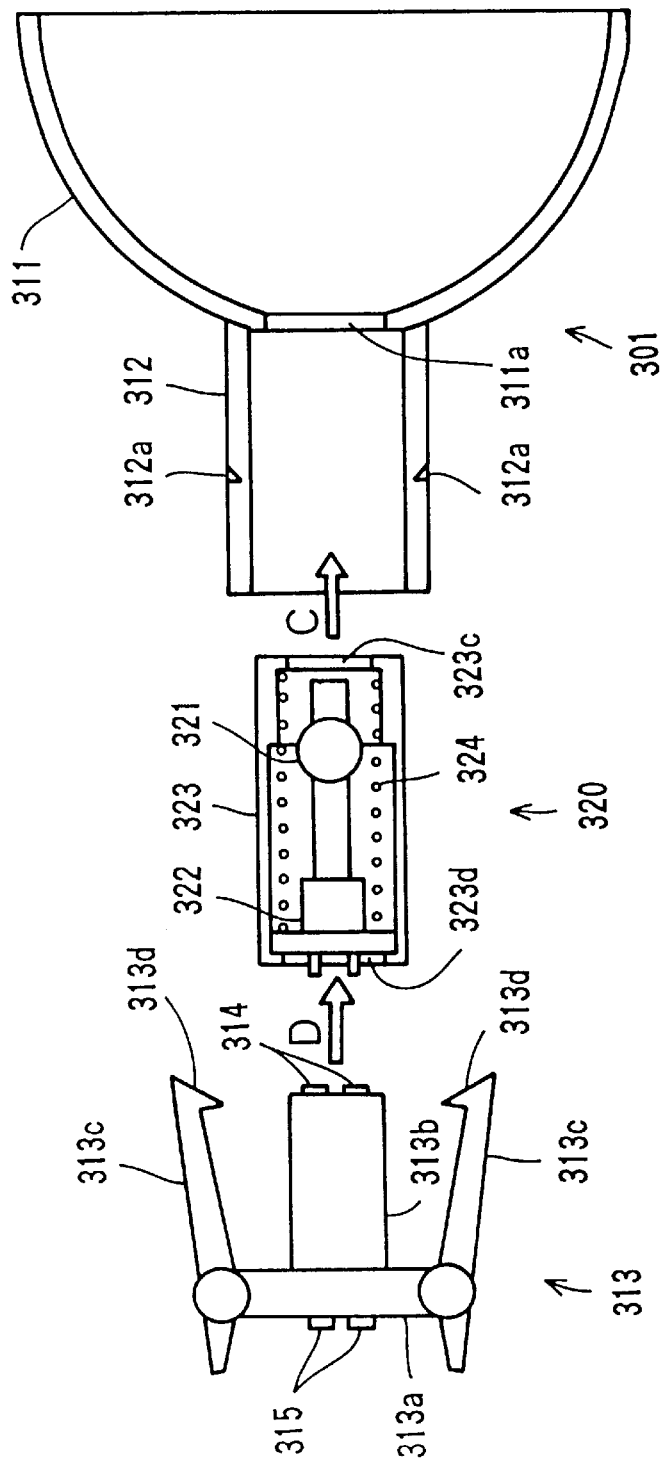
FIG. 49 is a diagram showing, in a sectional view, the construction of the mount portion of the projector of the sixteenth embodiment and how the lamp unit is fitted therein.
Figure 50:
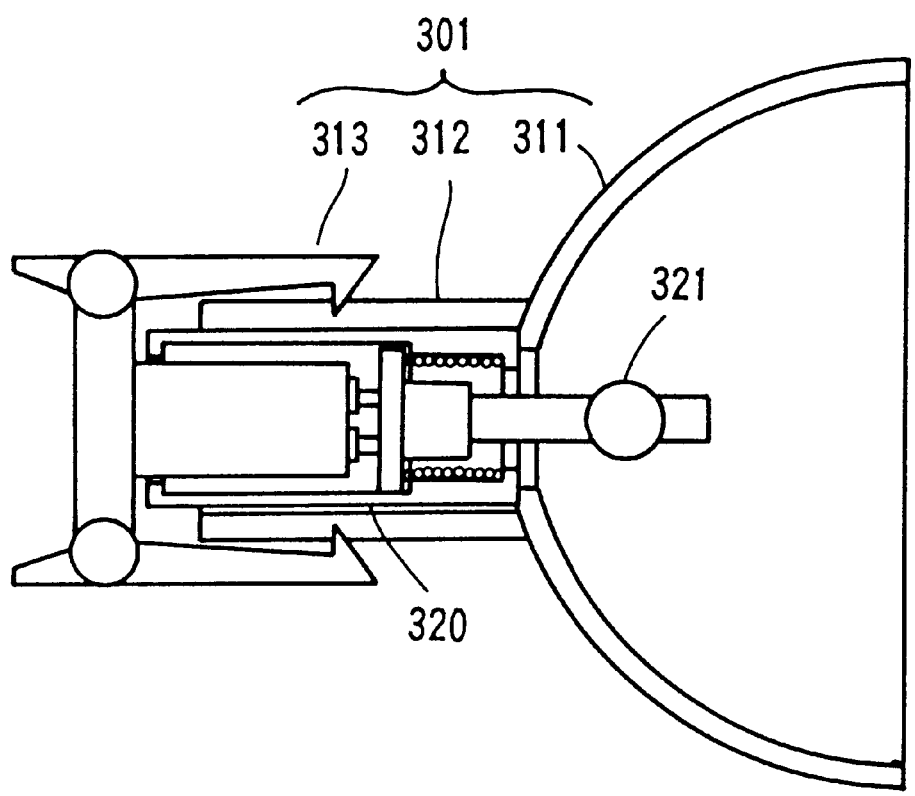
FIG. 50 is a diagram showing a section of the mount portion of the projector of the sixteenth embodiment, with the lamp unit fitted therein.

FIG. 49 shows the construction of a mount portion 301 and how the lamp unit 320 is fitted in the mount portion 301, and FIG. 50 shows the mount portion 301 with the lamp unit 320 fitted therein. The mount portion 301 is composed of a total-reflection mirror (reflector) 311 having the shape of a paraboloid, a housing cylinder 312 for housing the lamp unit 320, and a stopper 313 for fixing the lamp unit 320 housed in the housing cylinder 312.

The housing cylinder 312 is made of a material having high thermal conductivity and is formed in the shape of a hollow cylinder. The housing cylinder 312 is fixed on the outer surface around the vertex of the reflector 311 so as to be coaxial with the axis of the reflector 311. The housing cylinder 312 is shorter than the housing 323, and the inner diameter of the housing cylinder 312 is slightly greater than the outer diameter of the housing 323. At the vertex of the reflector 311, where the housing cylinder 312 is fixed, a circular opening 311a of a diameter a little smaller than the inner diameter of the housing cylinder 312 is formed.

The stopper 313 is composed of a base portion 313a having a disk-like shape, a prop portion 313b protruding vertically from the base portion 313a and having a cylindrical shape, and two arm portions 313c fitted at the edge of the base portion 313a. The prop portion 313b has a diameter a little smaller than the opening 323d of the housing 323 of the lamp unit 320, and is thus allowed through the opening 323d into the housing 323. On the front-end surface of the prop portion 313b, terminals 314 are provided that make contact with the terminals 325 provided on the holder 322 of the lamp unit 320. On the rear-end surface of the base portion 313a, terminals 315 are provided that are connected to the terminals 314.

The two arm portions 313c are arranged symmetrically with respect to the prop portion 313b, and are fitted to the base portion 313a so as to be inclinable between an open state in which their front-end portions are apart from each other and a closed state in which their front-end portions are closer to each other. The fitting portions of the arm portions 313c, at which they are fitted to the base portion 313a, are situated near the rear-end portions of the arm portions 313c. In these fitting portions, springs (not shown) are provided that load the arm portions 313c with a force that tends to bring them into the closed state. When the user pinches the rear-end portions of the two arm portions 313c between his fingers, the front-end portions thereof are brought into the open state. The arm portions 313c have, on their front-end portions, claws 313d formed so as to point inward. These claws 313d engage with grooves 312a formed on the outer circumferential surface of the housing cylinder 312.

The lamp unit 320 is fitted in the mount portion 301 in the following manner. First, as indicated by an arrow C in FIG. 49, the lamp unit 320 is inserted into the housing cylinder 312 from the rear-end side thereof, i.e. from the side opposite to the reflector 311. When the front-end surface of the housing 323 of the lamp unit 320 makes contact with the rim of the opening 311a of the reflector 311, the lamp unit 320 stops with the rear-end portion of the lamp unit sticking out.

Next, the front-end portions of the arm portions 313c of the stopper 313 are brought into the open state by pinching the rear-end portions thereof, and the terminals 314 are put into contact with the terminals 325 of the lamp unit 320. Then, as indicated by an arrow D, the stopper 313 is pressed forward so that the prop portion 313b will be inserted into the housing 323. As a result, the holder 322 moves forward, and the coil spring 324, which loads the holder 322 with a force, is compressed. On the other hand, the lamp 321 comes out of the housing 323 through the opening 323c so as to be exposed inside the reflector 311. When the claws 313d of the stopper 313 reach the grooves 312a of the housing cylinder 312, the rear-end portions of the arm portions 313c are released so that the front-end portions thereof are brought into the closed state, and thus the claws 313d engage with the grooves 312a. As a result, the stopper 313 is fixed to the housing cylinder 312, and simultaneously the lamp unit 320 is fixed inside the housing cylinder 312. This state is shown in FIG. 50.

Now, the holder 322 is loaded with a force that tends to move the holder rearward by the compressed coil spring 324, and the terminals 325 provided thereon are kept in contact with the terminals 314. This prevents the holder 322 from moving rearward, and thus, as shown in FIG. 50, the holder 322 is kept in a fixed position near the foremost position. The dimensions such as the length in the front-to-rear direction of the holder 322, the lengths of the prop portion 313b and the arm portions 313c of the stopper 313, and the positions in the front-to-rear direction of the grooves 312a of the housing cylinder 312 are so determined that, when the holder 322 is located in this fixed position, the lamp 321 is located at the focal point of the reflector 311. Thus, simply by fitting the lamp unit 320 in the manner described above, it is possible to place the lamp 321 at the focal point of the reflector 311.

The previously-described relationship between the outer diameter of the housing 323 of the lamp unit 320 and the inner diameter of the housing cylinder 312 of the mount portion 301 allows the whole inner circumferential surface of the housing cylinder 312 to be kept in contact with the outer circumferential surface of the housing 323. Accordingly, the lamp unit 320 is held stably, and heat conducts easily from the housing 323 to the housing cylinder 312.

The lamp unit 320 is removed from the mount portion 301 as follows. The rear-end portions of the arm portions 313c of the stopper 313 are pinched so that the claws 313d will disengage from the grooves 312a, and then, following the force with which the stopper 313 is loaded by the coil spring 324 through the holder 322, the stopper 313 is moved rearward. When the holder 322 stops at the rearmost position, the lamp 321 is housed back inside the housing 323.

In this way, there is no possibility of the user touching the lamp 321 either in fitting the lamp unit 320 in the mount portion 301 or in removing the lamp unit 320 from the mount portion 301. Moreover, when the lamp unit 320 is not fitted in the mount portion 301, the lamp 321 is kept inside the housing 323 so as not to be exposed, and therefore, unless the user puts his finger into the housing 323 through the opening 323c on purpose, there is no possibility of the user touching the lamp 312. This helps prevent the lamp 312 from being stained with seburn, and thereby prevent lamp bursting that may result therefrom.

As described previously, fitting and removal of the lamp unit 320 are performed when the mount portion 301 is at the unlit position B. As shown in FIG. 47, at the lit position A, the terminals 309 for supplying electric power to the lamp 321 are provided, and, when the motor 24 is driven so that the mount portion 301 at the unlit position B will be moved to the lit position A, the terminals 315 of the stopper 313 are automatically put into contact with the terminals 309. In this state, electric power can be supplied from the terminals 309 via the terminals 315, the terminals 314, and the terminals 325 to the lamp 321, and thus the lamp 321 can be lit. Though not shown, a plate for heat dissipation is provided at the lit position A, and, when the mount portion 301 is moved to the lit position A, the outer circumferential surface of the housing cylinder 312 thereof is automatically put into close contact with the heat dissipation plate.

When the lamp 321 is lit, the lamp is located outside the housing 323, and therefore the heat produced by the lamp 321 does not conduct easily to the holder 322 or the housing 323. In addition, since the housing 323 and the housing cylinder 312 of the mount portion 301 are both made of a material having high thermal conduction, and are kept in contact with each other over a large area, the heat present in the holder 322 and the housing 323 conducts to the heat dissipation plate so as to be dissipated efficiently. This helps cool the lamp unit 320 rapidly after extinction. Moreover, since there is no possibility of the user directly touching the lamp 321, even if the lamp unit 320 is removed immediately after extinction, there is no risk of the user suffering a skin burn.

As described above, the projector 202 almost eliminates the risk of a skin burn or lamp bursting, and thus can be used safely as a home-use television monitor. Moreover, even if the lamp 321 of the lamp unit 320 at the lit position A, while being lit to display images, becomes unable to be lit, it is possible to move the spare lamp unit 320 at the unlit position B to the lit position A and light the same lamp. Thus, it is possible to restart image display immediately. In addition, it is possible to replace immediately the lamp unit 320 that has been moved from the lit position A to the unlit position B. This helps prevent failure to fit a new lamp unit 320, and thereby enhance user-friendliness.

Obviously, many modifications and variations of the present invention are possible in light of the above teachings. It is therefore to be understood that within the scope of the appended claims, the invention may be practiced other than as specifically described.

What is claimed is:

1. A holding mechanism for holding a light source in a projector, comprising:
    a data reader for reading data related to the light source from the light source;
    a holding member for holding the light source; and
    an adjustment mechanism for adjusting a position of the light source by moving the holding member.
2. A holding mechanism as claimed in claim 1,
    wherein the adjustment mechanism adjusts the position of the light source on a basis of the data read by the data reader.
3. A holding mechanism as claimed in claim 1,
    wherein the holding member is made capable of holding light sources of different shapes by being formed substantially in a V-like shape so as to hold the light source as if pinching it.
4. A holding mechanism as claimed in claim 1,
    wherein the holding member is made capable of holding light sources of different shapes by being provided with a member that has a recessed portion formed thereon and that is so arranged as to hold the light source as if pinching it.
5. A light source for use in an image projection apparatus, comprising:
    a light-emitting portion;
    a held portion that is held by the image projection apparatus when the light source is fitted in a predetermined position in the image projection apparatus; and
    data holding means for holding position-related data so as to allow a center of the light-emitting portion to be located at a previously specified position when the light source is fitted in the predetermined position.
6. A light source as claimed in claim 5,
    wherein the data holding means is a member provided on the held portion so as to be used for positioning.
7. A light source as claimed in claim 5,
    wherein the data holding means is a data storage medium on which data related to a position of the light-emitting portion are stored.
8. A light source as claimed in claim 5, further comprising:
    a reflector arranged around the light-emitting portion,
    wherein the light source forms a single unit together with the reflector.
9. A projection-type image display apparatus, comprising:
    a lamp output varying device for varying intensity of light output from a lamp;
    a modulation device for performing modulation on the light output from the lamp in accordance with color components of an image; and
    a controller for varying how the modulation device performs modulation in accordance with the intensity of the light output from the lamp so as to keep a white balance of a displayed image substantially constant irrespective of the intensity of the light output from the lamp.
10. A projection-type image display apparatus as claimed in claim 9,
    wherein the controller makes relatively smaller a proportion of a red component of the image when the intensity of the light output from the lamp is high.
11. A projection-type image display apparatus as claimed in claim 9,
    wherein the controller makes relatively larger a proportion of a red component of the image when the intensity of the light output from the lamp is low.
12. A projection-type image display apparatus as claimed in claim 9, further comprising:
    an operation section for receiving from a user an instruction for setting hues of the displayed image.
13. A projector comprising:
    a light source;
    a reflector arranged around the light source;
    an image display device for performing spatial modulation on illumination light emitted from the light source on a basis of an image signal so as to form an optical image; and
    a projection optical system for projecting the optical image on a projection screen,
    wherein the light source is interchangeable with a light source of a different type, and
    wherein the projector is further provided with:
    an input section for inputting data in accordance with what type of light source is currently fitted; and
    a controller for performing a predetermined operation on a basis of the input data.
14. A projector as claimed in claim 13,
    wherein interchanging of the light source is achieved without interchanging of the reflector for reflecting the illumination light emitted from the light source.
15. A projector as claimed in claim 13,
    wherein the light source forms a single unit together with the reflector for reflecting the illumination light emitted from the light source, and
    wherein interchanging of the light source is achieved by interchanging of the unit.
16. A projector as claimed in claim 13, further comprising:
    an adjustment mechanism for adjusting a position of the light source,
    wherein the controller adjusts the position of the light source through the adjustment mechanism in accordance with the input data.
17. A projector as claimed in claim 13,
    wherein the controller controls how the image display device performs modulation of the illumination light in accordance with the input data.
18. A projector as claimed in claim 17,
    wherein the controller adjusts hues of a displayed image by controlling how the image display device performs modulation of the illumination light.
19. A projector for projecting an image by using light from a light source, comprising:
    a holding member for holding the light source;
    input means for inputting data in accordance with what type of light source is currently fitted; and
    an adjustment mechanism for adjusting a position of the light source by moving the holding member,
    wherein the adjustment mechanism adjusts the position of the light source on a basis of the input data.

20. A projector as claimed in claim 19, further comprising:
   a controller for controlling hues of the projected image in accordance with the input data.

21. A projector as claimed in claim 19,
   wherein the holding member is made capable of holding light sources of different shapes by being formed substantially in a V-like shape so as to hold the light source as if pinching it.

22. A projector as claimed in claim 19,
   wherein the holding member is made capable of holding light sources of different shapes by being provided with a member that has a recessed portion formed thereon and that is so arranged as to hold the light source as if pinching it.

\* \* \* \* \*